United States Patent
Pandey et al.

(10) Patent No.: US 9,521,058 B2
(45) Date of Patent: *Dec. 13, 2016

(54) MULTI-WIRE SIGNALING WITH MATCHED PROPAGATION DELAY AMONG WIRE PAIRS

(71) Applicant: QUALCOMM Incorporated, San Diego, CA (US)

(72) Inventors: Shree Krishna Pandey, San Diego, CA (US); Arun Chandra Kundu, San Diego, CA (US); George Alan Wiley, San Diego, CA (US); Chulkyu Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/097,027

(22) Filed: Apr. 12, 2016

(65) Prior Publication Data

US 2016/0226734 A1    Aug. 4, 2016

Related U.S. Application Data

(63) Continuation-in-part of application No. 14/315,142, filed on Jun. 25, 2014, now Pat. No. 9,319,218.

(51) Int. Cl.

| | | |
|---|---|---|
| *H04L 25/02* | (2006.01) |
| *H04L 12/26* | (2006.01) |
| *H04L 7/00* | (2006.01) |
| *H04B 3/00* | (2006.01) |
| *H04B 3/462* | (2015.01) |
| *H04B 3/54* | (2006.01) |

(52) U.S. Cl.
CPC .............. *H04L 43/087* (2013.01); *H04B 3/00* (2013.01); *H04B 3/462* (2013.01); *H04B 3/542* (2013.01); *H04L 7/0041* (2013.01); *H04L 25/0264* (2013.01)

(58) Field of Classification Search
None
See application file for complete search history.

(56) References Cited

U.S. PATENT DOCUMENTS

| | | |
|---|---|---|
| 5,214,318 A | 5/1993 | Nakanishi et al. |
| 6,005,895 A | 12/1999 | Perino et al. |

(Continued)

OTHER PUBLICATIONS

International Search Report and Written Opinion—PCT/US2015/037132—ISA/EPO—Sep. 16, 2015.

(Continued)

*Primary Examiner* — Jean B Corrielus
(74) *Attorney, Agent, or Firm* — Loza & Loza, LLP

(57) ABSTRACT

In a multi-wire channel that includes at least three wires, each unique wire pair of the multi-wire channel has approximately the same signal propagation time. In this way, jitter can be mitigated in the multi-wire channel for signaling where, for a given data transfer, a differential signal is transmitting on a particular pair of the wires and every other wire is floating. In some implementations, matching of the signal propagation times involves providing additional delay for at least one of the wires. The additional delay is provided using passive signal delay techniques and/or active signal delay techniques.

30 Claims, 41 Drawing Sheets

(56) References Cited

U.S. PATENT DOCUMENTS

| | | | |
|---|---|---|---|
| 6,031,847 A * | 2/2000 | Collins | H04L 7/10 370/508 |
| 6,680,636 B1 | 1/2004 | Parry et al. | |
| 6,801,071 B1 | 10/2004 | Shizuki | |
| 7,020,792 B2 | 3/2006 | Hall | |
| 7,859,356 B2 | 12/2010 | Pandey | |
| 8,064,535 B2 | 11/2011 | Wiley et al. | |
| 8,472,551 B2 | 6/2013 | Wiley et al. | |
| 8,654,771 B1 * | 2/2014 | Singh | H04W 28/0247 370/328 |
| 2002/0031199 A1 | 3/2002 | Rolston et al. | |
| 2002/0093702 A1 * | 7/2002 | Schrodinger | H04L 25/14 398/175 |
| 2002/0174313 A1 * | 11/2002 | Kuhn | G06F 13/161 711/167 |
| 2003/0102933 A1 | 6/2003 | Partanen | |
| 2003/0200475 A1 | 10/2003 | Komoto | |
| 2004/0127088 A1 | 7/2004 | Yuan | |
| 2005/0024109 A1 * | 2/2005 | Amin | H04L 7/0004 327/161 |
| 2005/0286424 A1 | 12/2005 | Peeters et al. | |
| 2007/0102528 A1 | 5/2007 | Inotani | |
| 2008/0205439 A1 | 8/2008 | Li et al. | |
| 2010/0153792 A1 * | 6/2010 | Jang | G11C 29/02 714/700 |
| 2013/0215991 A1 | 8/2013 | Wiley | |
| 2013/0241759 A1 | 9/2013 | Wiley et al. | |
| 2013/0339507 A1 | 12/2013 | Wiley | |
| 2014/0003543 A1 | 1/2014 | Wiley et al. | |
| 2014/0003549 A1 | 1/2014 | Won et al. | |
| 2014/0112401 A1 | 4/2014 | Wiley et al. | |
| 2014/0153665 A1 | 6/2014 | Wiley et al. | |
| 2015/0012718 A1 | 1/2015 | Gupta et al. | |
| 2015/0033098 A1 * | 1/2015 | Chui | H04L 1/0045 714/776 |
| 2015/0381340 A1 | 12/2015 | Pandey et al. | |

OTHER PUBLICATIONS

Lee J., et al., "Propagation velocity equalizer circuit on multi microstrip transmission line structure," Proceedings of the 5th European Conference on Antennas and Propagation (EUCAP), Apr. 2011, pp. 2328-2330.

* cited by examiner

MULTI-WIRE SIGNALING WITH MATCHED PROPAGATION DELAY AMONG WIRE PAIRS

CLAIM OF PRIORITY UNDER 35 U.S.C. §120

The present application for patent is a continuation-in-part of U.S. Non-Provisional application Ser. No. 14/315,142 entitled "MULTI-WIRE SIGNALING WITH MATCHED PROPAGATION DELAY AMONG WIRE PAIRS" filed on Jun. 25, 2014, now U.S. Pat. No. 9,319,218, which is assigned to the assignee hereof and hereby expressly incorporated by reference herein.

TECHNICAL FIELD

The following relates generally to electrical signaling and, more specifically, but not exclusively, to multi-wire signaling.

BACKGROUND

In some electronic systems, signaling between electrical components flows through wires, sometimes referred to as traces, conductors, or electrical paths, on or within printed circuit boards (PCBs), integrated circuits (ICs), or other structures of the electronic system. Conventionally, a signal is carried over a single wire or, for a differential signal, a pair of wires.

Recently, multi-wire signaling schemes (i.e., signaling over more than two wires) have been proposed. For example, C-PHY is a mobile device communication interface for the Mobile Industry Processor Interface (MIPI) Alliance Specification. C-PHY uses a three phase channel (referred to as a "trio") to transmit data. That is, in contrast with conventional physical interfaces (PHYs) that use a single wire or a differential wire pair for a given channel, a C-PHY channel employs three wires (also referred to as "lanes"). For a given data transmission (e.g., of a bit or symbol), two of the wires are used (active) while the third wire is in a high impedance state (e.g., floating). Over a series of data transmissions, different pairs of the three wires are used to transmit the data.

Multi-wire signaling may be subject to signal transmission issues such as jitter. Jitter is the undesired deviation from true periodicity of an assumed periodic signal in data transmission. For example, over a series of symbol transmissions, there may be timing skew between the symbols when they are received at a receiver. This skew manifests itself as jitter. In view of the above, a need exists for improved circuit techniques for addressing jitter or other similar transmission issues in wire-based signaling.

BRIEF SUMMARY OF SOME EXAMPLES

The following summarizes some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a summary form as a prelude to the more detailed description that is presented later.

Various aspects of the disclosure provide for multi-wire signaling where each unique wire pair of the n-wires of a multi-wire channel has approximately the same signal propagation time (e.g., within a threshold margin). Here, "n" is three or more.

In accordance with some aspects of the disclosure, matched signal propagation times for different wire pairs are employed in multi-wire signaling where different wire pairs are used for different data transmissions. In such a multi-wire configuration, the distance between one pair of wires can be different from the distance between another pair of wires. Thus, a differential signal on one wire pair may travel at a different velocity than a differential signal on the other wire pair, resulting in jitter at the receiver. However, by matching the signal propagation time for each wire pair in accordance with the teachings herein, signal jitter that could otherwise result from this unequal spacing between wire pairs is mitigated.

The disclosure relates in some aspects to providing additional delay for one or more of the wires of a multi-wire channel. For example, for a multi-wire channel employing three wires that are routed side-by-side, additional delay is provided for the outer wires to balance the signal propagation times for the three unique wire pairs of this channel.

In some implementations, additional delay is provided for a wire by adapting the physical properties for the wire. For example, the wire can have a longer length or shorter length than the other wires. Other physical properties that could be adapted to provide the desired delay include wire width, wire thickness, dielectric constant, and distance to ground plane.

In some implementations, additional delay is added for a wire by incorporating a delay element into the signaling path. For example, a delay element could be added along the path (e.g., along a wire of a PCB or integrated circuit) or in an I/O circuit (e.g., driver or receiver). Such a delay element can be passive (e.g., a wire of a specified length) or active (e.g., employing transistors).

In implementations that employ an active delay element, the delay can be dynamically adjusted based on initial design criteria and/or based on one or more operating factors. These operating factors can include calibration feedback, signal frequency, signal rise time, signal fall times, or path length.

In an aspect of the disclosure, an apparatus for multi-signaling is provided. The apparatus includes a plurality of wires comprising at least one middle wire, a first outer wire located adjacent to one side of the at least one middle wire, and a second outer wire located adjacent to another side of the at least one middle wire. The at least one middle wire may include at least two middle wires. The apparatus further includes at least one delay element coupled to at least one of the plurality of wires. The at least one delay element may include a delay element coupled to at least one of the first outer wire or the second outer wire. The at least one delay element provides an amount of signal delay such that a signal propagation time associated with the at least one middle wire is less than a signal propagation time associated with at least one of the first outer wire or the second outer wire and signal propagation times associated with wire pairs of the plurality of wires are equal to one another within a margin of error.

The apparatus also includes a driver circuit coupled to the plurality of wires and configured to, for a particular data transfer, drive a particular one of the wire pairs of the plurality of wires, whereby every other wire of the plurality of wires is in a high impedance state, wherein the driver circuit embodies the at least one delay element. The apparatus further includes a receiver circuit coupled to the plurality of wires and configured to decode information for a particular data transfer based on a particular one of the wire pairs of the plurality of wires being driven, and every other wire of the plurality of wires being in a high impedance state. The receiver circuit includes at least one differential receiver and the at least one delay element is coupled to an output of the at least one differential receiver.

In an aspect of the disclosure, the at least one delay element may be a passive delay structure or an active delay device. In another aspect of the disclosure, the at least one delay element may include a wire of a defined length such that an overall length of the at least one middle wire is shorter than a length of the first outer wire and the second outer wire. In a further aspect of the disclosure, the at least one delay element includes a programmable delay device. The apparatus may further include a delay controller to generate at least one control signal to control a delay of the at least one delay element.

In a further aspect of the disclosure, a method for multi-wire signaling includes determining signal propagation times associated with wire pairs of a plurality of wires. The plurality of wires includes at least one middle wire, a first outer wire located adjacent to one side of the at least one middle wire, and a second outer wire located adjacent to another side of the at least one middle wire. The method further includes specifying a delay for at least one delay element coupled to at least one of the plurality of wires, wherein the at least one delay element provides an amount of signal delay such that a signal propagation time associated with the at least one middle wire is less than a signal propagation time associated with at least one of the first outer wire or the second outer wire and the signal propagation times associated with the wire pairs of the plurality of wires are equal to one another within a margin of error. The method also includes driving a particular one of the wire pairs of the plurality of wires for a particular data transfer, whereby every other wire of the plurality of wires is in a high impedance state, and decoding information for a particular data transfer based on a particular one of the wire pairs of the plurality of wires being driven, and every other wire of the plurality of wires being in a high impedance state.

In another aspect of the disclosure, an apparatus for multi-wire signaling includes a communication interface circuit and a processing circuit. The processing circuit is configured to, via the communication interface circuit, determine signal propagation times associated with wire pairs of a plurality of wires, wherein the plurality of wires includes at least one middle wire, a first outer wire located adjacent to one side of the at least one middle wire, and a second outer wire located adjacent to another side of the at least one middle wire. The processing circuit is further configured to specify a delay for at least one delay element coupled to at least one of the plurality of wires, wherein the at least one delay element provides an amount of signal delay such that a signal propagation time associated with the at least one middle wire is less than a signal propagation time associated with at least one of the first outer wire or the second outer wire and the signal propagation times associated with the wire pairs of the plurality of wires are equal to one another within a margin of error. The processing circuit is also configured to drive a particular one of the wire pairs of the plurality of wires for a particular data transfer, whereby every other wire of the plurality of wires is in a high impedance state, and decode information for a particular data transfer based on a particular one of the wire pairs of the plurality of wires being driven, and every other wire of the plurality of wires being in a high impedance state.

In a further aspect of the disclosure, an apparatus for multi-wire signaling includes means for determining signal propagation times associated with wire pairs of a plurality of wires, the plurality of wires comprising at least one middle wire, a first outer wire located adjacent to one side of the at least one middle wire, and a second outer wire located adjacent to another side of the at least one middle wire. The apparatus further includes means for specifying a delay for at least one delay element coupled to at least one of the plurality of wires, wherein the at least one delay element provides an amount of signal delay such that a signal propagation time associated with the at least one middle wire is less than a signal propagation time associated with at least one of the first outer wire or the second outer wire and the signal propagation times associated with the wire pairs of the plurality of wires are equal to one another within a margin of error. The apparatus also includes means for driving a particular one of the wire pairs of the plurality of wires for a particular data transfer, whereby every other wire of the plurality of wires is in a high impedance state, and means for decoding information for a particular data transfer based on a particular one of the wire pairs of the plurality of wires being driven, and every other wire of the plurality of wires being in a high impedance state.

These and other aspects of the disclosure will become more fully understood upon a review of the detailed description, which follows. Other aspects, features, and implementations of the disclosure will become apparent to those of ordinary skill in the art, upon reviewing the following description of specific, exemplary implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while exemplary implementations may be discussed below as device, system, or method implementations it should be understood that such exemplary implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

For purposes of illustration, various aspects of the disclosure will be discussed in the context of a multi-wire channel that employs three wires. However, the teachings herein are also applicable to multi-wire channels that have more than three wires. For convenience, a multi-wire channel may be referred to herein as an n-wire channel, where n represents three or more.

Exemplary Description of Multi-Wire Signaling

Figure 1:
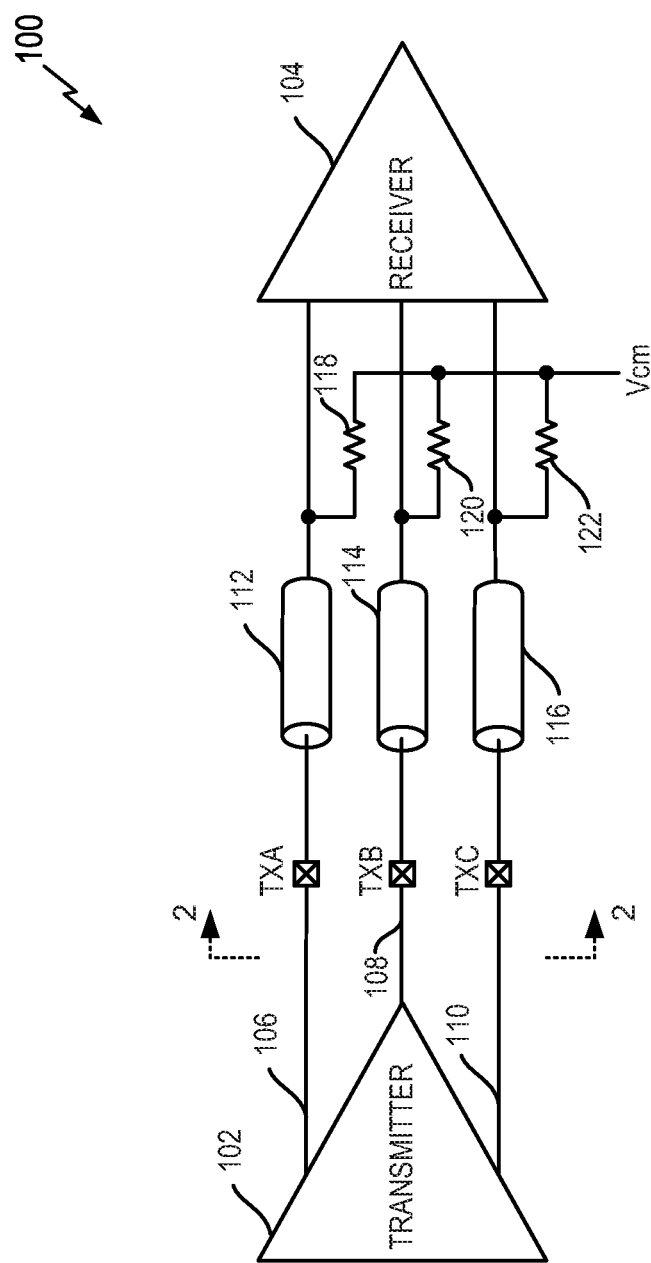
FIG. 1 is a circuit diagram illustrating an example of a three-wire channel.

FIG. 1 illustrates one example of a multi-wire channel 100. In this example, a transmitter 102 sends data to a receiver 104 via a first wire 106, a second wire 108, and a third wire 110. The characteristic impedance of each of the first, second, and third wires 106, 108, and 110 is represented by a first characteristic impedance 112, a second characteristic impedance 114, and a third characteristic impedance 116, respectively.

The first, second, and third wires 106, 108, and 110 are each terminated at the receiver 104 by a first termination resistor 118, a second termination resistor 120, and a third termination resistor 122, respectively, coupled to a common mode voltage Vcm.

Conventionally, the signal propagation time of a wire is calculated based on the length of the wire and other characteristics associated with the wire. For example, the characteristic impedance and the termination resistance of a wire affects the signal propagation times of signals traveling through the wire to some extent. For differential transmissions, precise system timing is maintained by ensuring that the signal propagation times of each wire of the wire pair are equal. In this way, both rails of the differential signal will be received at the receiver at the same time, thereby enabling the receiver to sample a received symbol over a relatively wide timing window.

In contrast, in a multi-wire channel, the conventional approach of ensuring that the signal propagation times for all wires of a channel are equal leads to less than optimal signaling. This issue will be described in detail with further reference to FIG. 1 and reference to FIGS. 2 and 3.

In a three-wire channel, for a given data transfer (e.g., of a symbol or bit), the transmitter drives two of the wires and leaves the remaining wire in a high impedance state (e.g., floating). For the next data transfer, the transmitter again drives two of the wires and leaves the remaining wire in a high impedance state. However, the pair of wires used for any subsequent data transfer may be different from or the same as the pair of wires used for a previous data transfer. Through the use of such a multi-wire signaling scheme, improved data rates and/or transmission quality may be achieved as compared to a channel that employs a single wire or a differential pair.

Using the designations A, B, and C to refer to the first wire 106, the second wire 108, and the third wire 110 of FIG. 1, a given transmission over the channel 100 can involve wire pair A-B being driven, wire pair B-C being driven, or wire pair A-C being driven. As discussed in more detail below in conjunction with FIGS. 32 and 33, the transmitter 102 can encode data to be transmitted based on which wire pair is used for a given data transfer and any changes in the wire pair used from one data transfer to the next. For example, a transfer over wire pair A-B followed by a transfer over wire pair B-C can represent a certain value (e.g., binary 01). The receiver 104, in turn, is configured to properly interpret signals encoded in this manner and thereby decode the original data that was transmitted.

In practice, the different wire pairs A-B, B-C, and A-C may have different transmission characteristics. For example, the signal propagation time of one wire pair may be different from the signal propagation time of another wire pair. This difference may be due, at least in part, to the physical properties of the wires.

Figure 2:
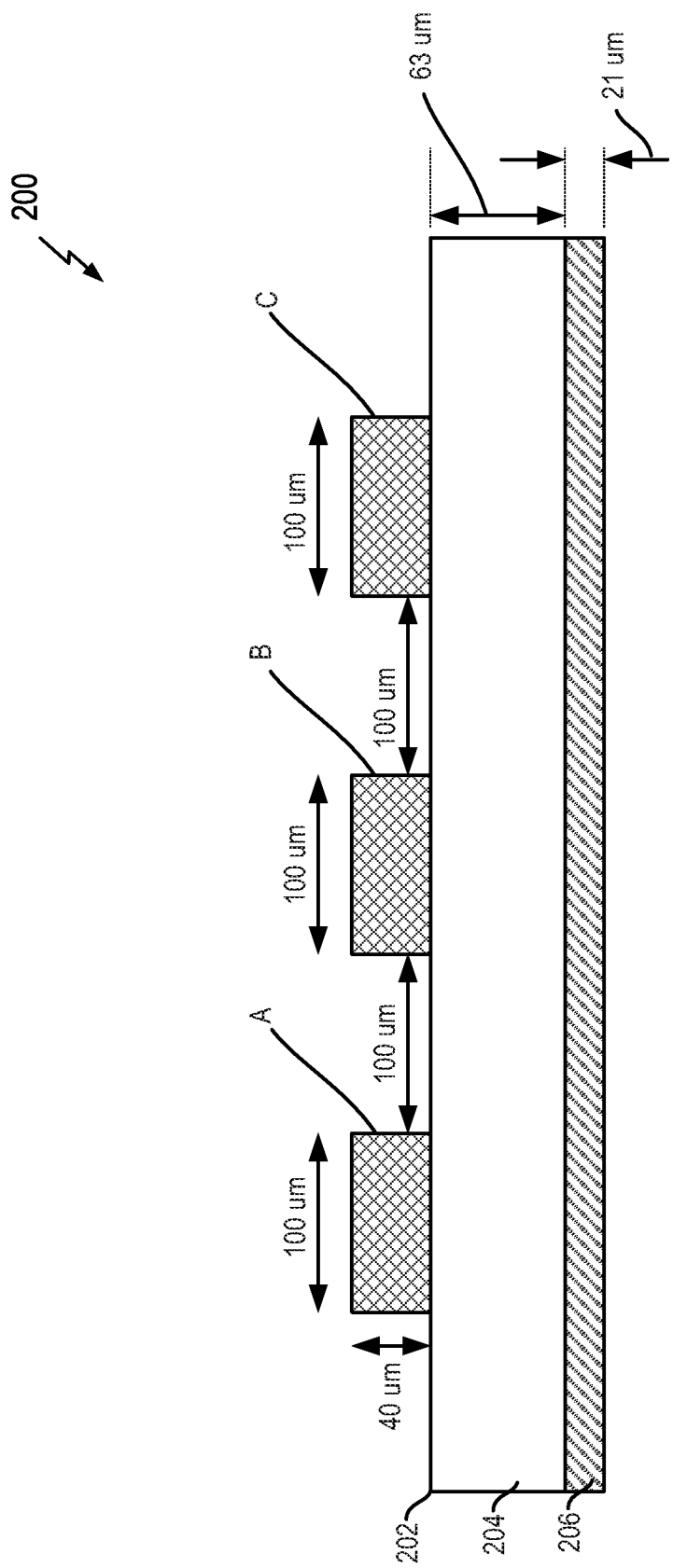
FIG. 2 is a diagram illustrating an example of wire spacing for a three-wire channel.

FIG. 2 illustrates a side sectional view 200 of three wires, again designated simply as A, B, and C, implemented on a substrate 202. The substrate 202 includes a dielectric material 204 having a thickness of 63 micrometers (um) and a ground plane 206 having a thickness of 21 um. Each wire is 100 um wide and 40 um thick. Different dimensions may be employed in different implementations.

In some implementations, the wires A, B, and C are conductive paths on a printed circuit board (PCB) and run parallel with one another (into the page in the example of FIG. 2). Thus, the view of FIG. 2 correlates, in some aspects, to the view 2-2 of FIG. 1 (although FIG. 1 is simply in the form a block diagram, and not an actual circuit). The wires A, B, and C can be implemented in other ways in other implementations. For example, in some implementations, the wires A, B, and C are conductive paths on an integrated circuit (IC) die.

As indicated in FIG. 2, the distance from the wire A to the wire B is 100 um. Similarly, the distance from the wire B to the wire C is 100 um. However, the distance from the wire A to the wire C is 300 um. Since the signal propagation time of a differential signal traveling over a wire pair depends, at least in part, on the distance between the wires, a differential signal traveling over the wire pair A-B has a different (i.e., shorter) signal propagation time than a differential signal traveling over the wire pair A-C.

In more detail, an approximation for the signal propagation time (or delay) through a transmission line (e.g., wire A, wire B, or wire C) may be determined by the following formula: Delay=$\sqrt{(L_{self}-L_{mutual})*(C_{self}+C_{mutual})}$, wherein $L_{self}$ is an inductance of a current line, $L_{mutual}$ is a mutual inductance between the current line and a neighboring line paired with the current line in a wire pair, $C_{self}$ is a capacitance of the current line, and $C_{mutual}$ is a mutual capacitance between the current line and the neighboring line in the wire pair. The terms may be dependent on geometry and the nature of the excitation on the current line as well as neighboring lines.

In an aspect of the disclosure, a value of $L_{self}$ is roughly equal for all lines (e.g., wire A, wire B, and wire C). However, $L_{mutual}$ may have a larger value when transmitting a differential signal over a wire pair including an inner line (e.g., wire B) because of the closer spacing between the inner line and either of the outer lines (e.g., either wire A or wire C), and hence, higher mutual coupling. Thus, the value of $(L_{self}-L_{mutual})$ may be smaller when transmitting the differential signal over the wire pair including the inner line. Similarly, a value of $C_{self}$ is roughly equal for all lines (e.g., wire A, wire B, and wire C). However, $C_{mutual}$ may have a larger value when transmitting the differential signal over the wire pair including the inner line (e.g., wire B) because of the closer spacing between the inner line and either of the outer lines (e.g., either wire A or wire C). Thus, the value of $(C_{self}+C_{mutual})$ may be larger when transmitting the differential signal over the wire pair including the inner line.

As noted above, the delay of a current line is determined by the square root of the product of two terms $(L_{self}-L_{mutual})$ and $(C_{self}+C_{mutual})$. With respect to the inner line (e.g., wire B), a first term $(L_{self}-L_{mutual})$ is smaller in value while a second term $(C_{self}+C_{mutual})$ is larger in value. Depending on the transmission line configuration, the product of the two terms, and hence, the value of the delay on the inner line may vary (can be larger or smaller than the delay value of an outer line). In an aspect of the disclosure, a product of the two terms for the inner line (e.g., wire B) is ensured to match a product of the two terms for an outer line (e.g., wire A or wire C).

In some examples, the signal propagation time (or delay) through the inner line is smaller in value. This may be attributed to the inner line having a first term $(L_{self}-L_{mutual})$ that is smaller in value that overcomes the inner line having a second term ($C_{self}+C_{mutual}$) that is higher in value. In an aspect of the disclosure, the delay through the inner line being smaller in value may be compensated for by increasing the length (or increasing the delay) of the inner line so that the capacitance and inductance, and consequently the delay, of the inner line increases. An exact amount of the length (or delay) to be added may be determined by electromagnetic simulation on the specific geometry of the transmission lines.

In other examples, the signal propagation time (or delay) through the inner line is larger in value. This may be attributed to the inner line having a second term ($C_{self}+C_{mutual}$) that is higher in value that overcomes a first term ($L_{self}-L_{mutual}$) that is smaller in value. In an aspect of the disclosure, the delay through the inner line being larger in value may be compensated for by decreasing the length (or decreasing the delay) of the inner line so that the capacitance and inductance, and consequently the delay, of the inner line decreases. An exact amount of the length (or delay) to be subtracted may be determined by electromagnetic simulation on the specific geometry of the transmission lines.

Keeping in mind that different wire pairs are used over a series of data transfers in a multi-wire channel, the symbols (or bits) transmitted over different wire pairs may arrive at the receiver at different times, relative to the receive clock. In other words, signals transmitted via a conventional multi-wire channel may be subject to jitter. Referring to FIG. 2, a differential signal on the wire pair A-C will travel at a slower velocity than a differential signal on the wire pair A-B. Consequently, at the receiver, there will be timing skew between the signals transmitted on the different pairs. Over a series of data transmissions using the different wire pairs, this skew manifests itself as jitter.

Figure 3:
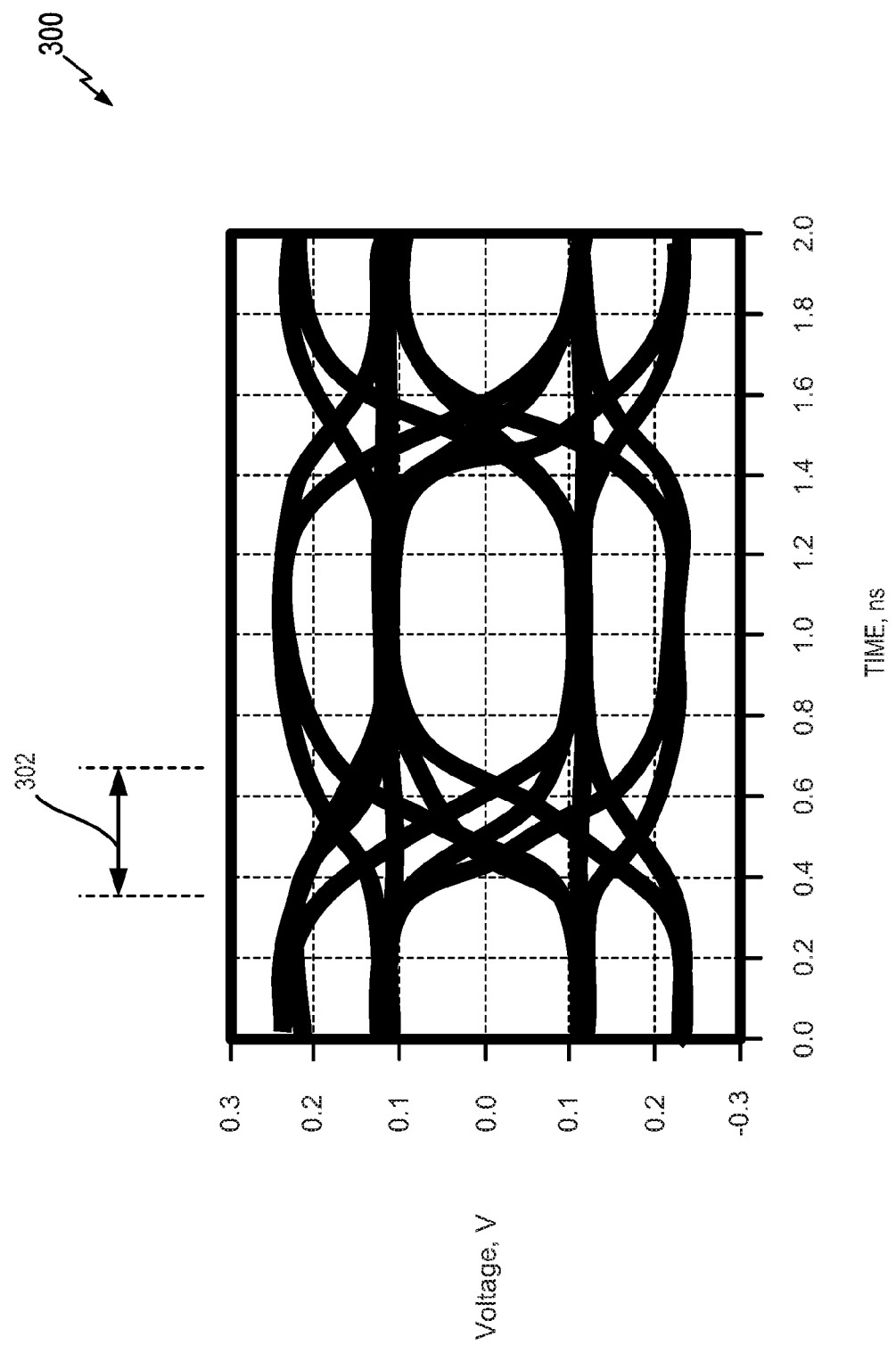
FIG. 3 is an eye diagram illustrating an example of jitter in a conventional multi-wire channel.

FIG. 3 illustrates, in a simplified manner, an example of an eye pattern 300 (also known as an eye diagram) corresponding to a simulation for a 3-wire channel based on the configuration of FIG. 2. The simulation is further based on a 10 inch long microstrip module, with a dielectric constant (Er) of 3.7, a tangent delta (tan D) of 0.02, a data rate of 1 Gigabit per second (Gbps), a rise/fall time of 100 ps (20%-80%), a voltage amplitude of 250 millivolts (mV), pad capacitance (Cpad) of 2 picoFarads (pF), and a common capacitance of 15 pF (see FIG. 30).

In the eye pattern 300, it may be seen that some of the transitions from one voltage level to another occur later than others. The width 302 of these transitions, collectively, is indicative of the jitter. For example, in this case, the jitter may be on the order of 160 picoseconds (ps).

In general, it is desirable to reduce the amount of jitter present in a communication system. By reducing jitter, timing margins for the system can be improved since symbols can be sampled over a wider window of time when jitter is low as opposed to when jitter is high.

The disclosure relates in some aspects to mitigating jitter and related timing issues in multi-wire signaling. Jitter is mitigated by ensuring that each unique wire pair of the n-wires in an n-wire channel has approximately the same signal propagation time within a threshold margin (e.g., within a margin of error).

In some aspects, this is achieved by adding delay to at least one of the wires. For example, in a 3-wire system, jitter can be reduced by incorporating additional delay (i.e., positive delay) on the center wire of the trio. Thus, to make the signal propagation time of each wire pair approximately equal (e.g., the propagation delay is the same for the wire pairs A-B, B-C, and A-C), the signal propagation time of the individual wires is made unequal (e.g., by adding delay to one of more of the individual wires).

Figure 4:
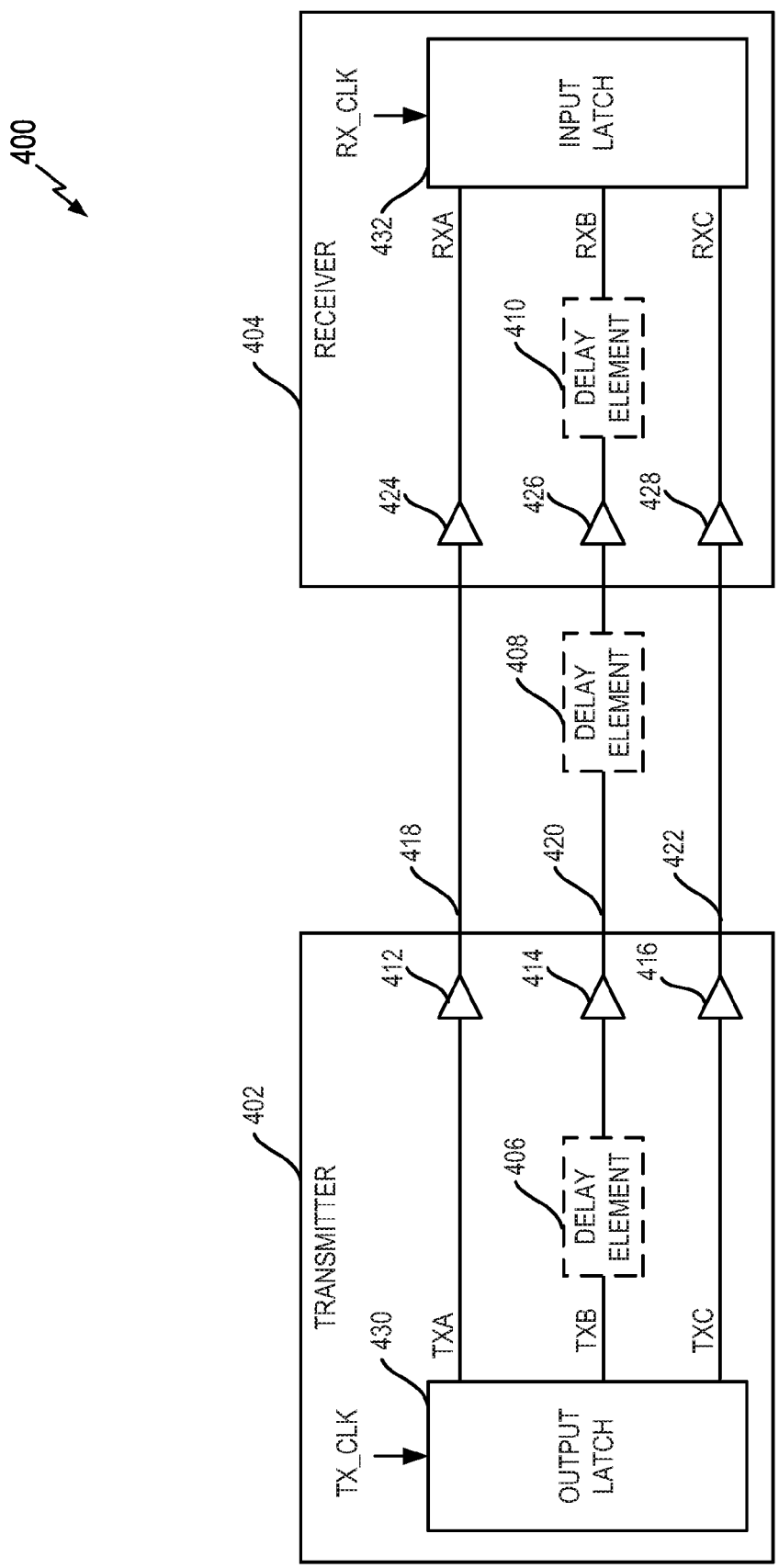
FIG. 4 is a block diagram illustrating an example of a delay element for a three-wire channel in accordance with some aspects of the disclosure.

In general, delay may be added anywhere along a wire to achieve the desired balancing of the signal propagation times between wire pairs. For example, FIG. 4 illustrates a communication system 400 including three-wire transmitter 402 and a three-wire receiver 404 where a first delay element 406 can be incorporated into the transmitter 402, a second delay element 408 can be incorporated into the communication medium between the transmitter 402 and the receiver 404, or a third delay element 410 can be incorporated into the receiver 404. Here, the dashed boxes for the first through third delay elements 406-410 represent that each delay element is optional. That is, one or more of the first through third delay elements 406-410 could be used in a given implementation.

In FIG. 4, the three wires driven by the transmitter 402 are designated as TXA, TXB, and TXC (e.g., corresponding to the wires A, B, and C, of FIG. 2). Similarly, the three wires over which signals are received by the receiver 404 are designated as RXA, RXB, and RXC (e.g., again corresponding to the wires A, B, and C, of FIG. 2).

In implementations that employ the first delay element 406, signals carried by the middle wire TXB are delayed by the delay element 406. The signal carried by the wire TXA, the delayed signal carried by the wire TXB, and the signal carried by the wire TXC are coupled to a first driver 412, a second driver 414, and a third driver 416, respectively, that drive a first wire 418, a second wire 420, and a third wire 422 of an external bus.

In implementations that employ the second delay element 408, signals carried by the second wire 420 are delayed by the delay element 408. The signal carried by the first wire 418, the delayed signal carried by the second wire 420, and the signal carried by the third wire 422 are coupled to a first receiver circuit 424, a second receiver circuit 426, and a third receiver circuit 428, respectively, of the receiver.

In implementations that employ the third delay element 410, signals output by the second receiver circuit 426 are delayed by the delay element 410. Thus, the signal driven by the first receiver circuit 424, the delayed signal driven by the second receiver circuit 426, and the signal driven by the third receiver circuit 428 are coupled to an input latch 432 of the receiver 404.

In the example of FIG. 4, the signal propagation time of interest for a given wire corresponds to the time that a signal on the wire is clocked out of an output latch 430 at the transmitter 402 (according to a transmit clock TX_CLK) to the time the signal is clocked into the input latch 432 at the receiver 404 (according to a receive clock RX_CLK). Thus, in this case, a delay element can be incorporated anywhere along the path of a wire between the output latch 430 and the input latch 432. The delay element may be a stand-alone component or embodied in another component. As an example of the latter case, a delay element can be embodied in an input/output (I/O) circuit such as a driver or receiver circuit.

Figure 5:
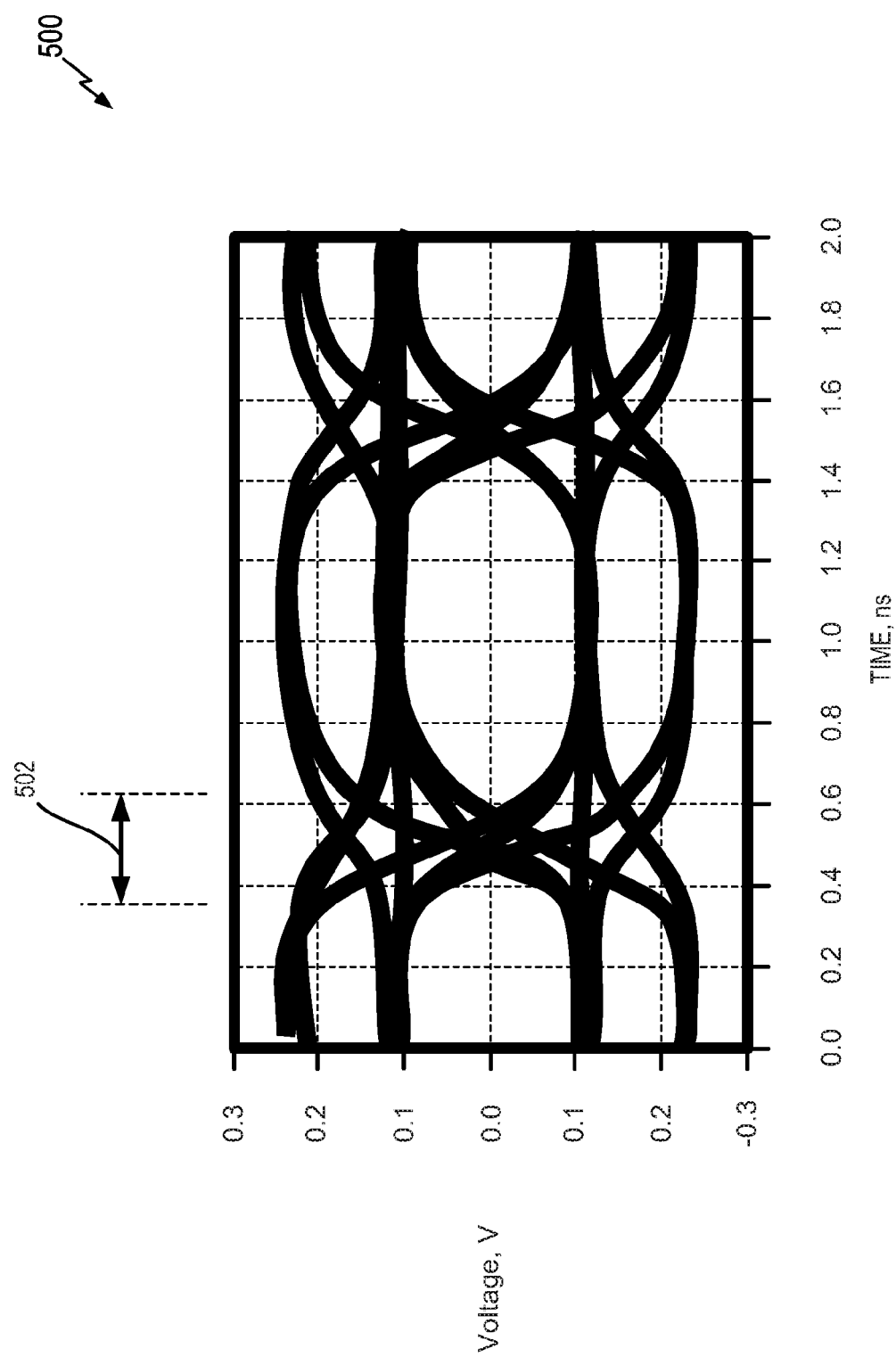
FIG. 5 is an eye diagram illustrating an example of jitter in a multi-wire channel in accordance with some aspects of the disclosure.

FIG. 5 illustrates, in a simplified manner, an example of an eye pattern 500 corresponding to a simulation for a 3-wire channel where a 40 ps delay had been added to the center wire (e.g., by adding 4 to 5 millimeters of the length of the wire B of FIG. 2). The other parameters for the simulation are the same as for the simulation of FIG. 3 that does not incorporate this delay. Here, it may be seen that the jitter has been reduced as a result of increasing the delay on the center wire. For example, in this case, the width of the jitter 502 may be on the order of 135 picoseconds (ps), a decrease of 25 ps (approximately 16%).

Table 1 lists several examples of the jitter that results when other delay values are used in the simulation. As indicated, the delay of 40 ps results in the lowest jitter in this scenario.

TABLE 1

| Data rate (Gbps) | RT/FT (20%-80%) (ps) | Delay on Center wire (ps) | Total jitter (ps) | Eye height (mV) |
|---|---|---|---|---|
| 1 | 100 | 0 | 160 | 194 |
| 1 | 100 | +20 | 160 | 194 |
| 1 | 100 | +40 | 135 | 194 |
| 1 | 100 | +60 | 140 | 194 |
| 1 | 100 | +80 | 145 | 194 |
| 1 | 100 | +100 | 220 | 194 |

A delay element may take different forms in different implementations. For example, some implementations employ passive delay elements, while other implementations employ active delay elements.

Examples of passive delay elements include, without limitation, a wire of a defined length and a delay line in the form of a coil of wire of a defined length. A passive delay line also may include capacitors, inductors, or other passive components. In some implementations, a delay element consists of a wire segment that is incorporated into the path of a wire to increase the length of the wire.

Thus, in some implementations, delay is provided for a wire by defining the physical properties of the wire (e.g., during the design stage). For example, one wire can be configured to have a longer length than another wire. Other physical properties that could be adapted to provide a desired delay include the width of the wire, the thickness of the wire, a dielectric constant of a dielectric upon which the wire rests, and the distance from the wire to a ground plane.

Examples of active delay elements include, without limitation, fixed delay lines that include active circuitry (e.g., transistors) and programmable delay devices. Thus, in some implementations, a delay element may be adjustable so that the delay imparted on a wire can be changed in the face of changes in operating conditions.

In implementations that employ an active delay element, the delay can be dynamically adjusted based on initial design criteria and/or based on one or more operating factors. These operating factors may include, without limitation, calibration feedback, signal frequency, signal rise/fall times, or path length.

Figure 6:
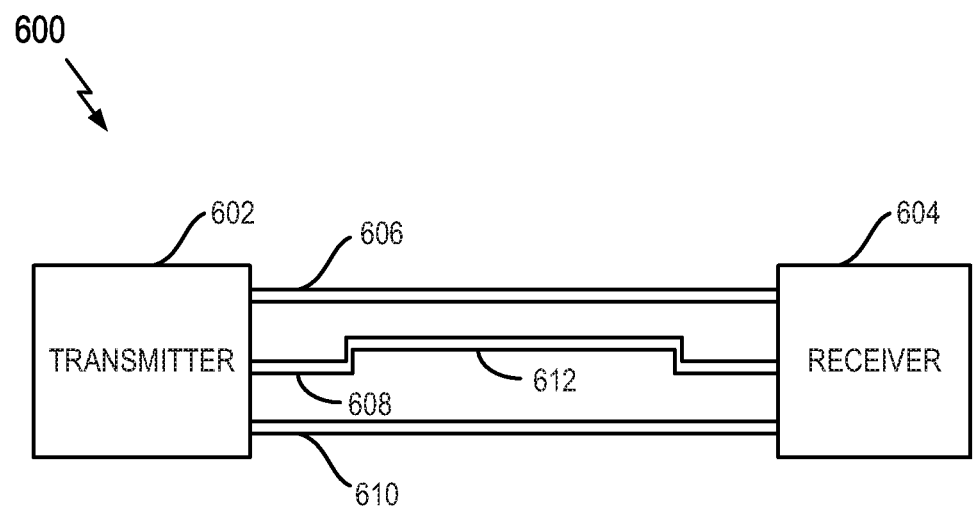
FIG. 6 is a diagram illustrating an example of a passive delay element in accordance with some aspects of the disclosure.

FIG. 6 illustrates an example of a multi-wire system 600 that incorporates a passive delay element. A transmitter 602 communicates with a receiver 604 via a first wire 606, a second wire 608, and a third wire 610. The second wire 608 has been configured with a wire segment 612 to increase the overall length of the second wire 608. Thus, the wire segment 612 is a form of passive delay element since the additional length imparts delay on the second wire 608. That is, incorporation of the wire segment 612 increases the overall signal transmission time from one end of the second wire 608 to the other end.

Figure 7:
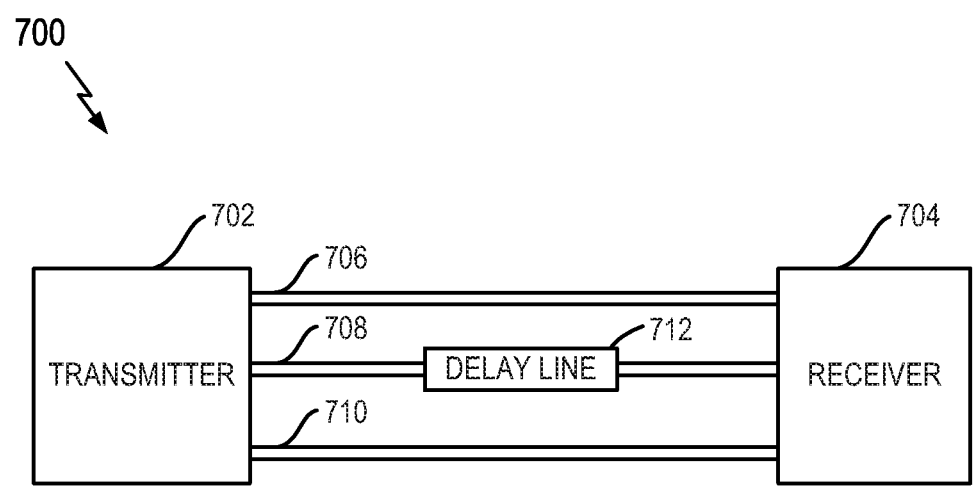
FIG. 7 is a diagram illustrating an example of a delay line deployed in accordance with some aspects of the disclosure.

FIG. 7 illustrates an example of a multi-wire system 700 that incorporates a delay line. A transmitter 702 communicates with a receiver 704 via a first wire 706, a second wire 708, and a third wire 710. A delay line 712 is in-line with the second wire 708. The delay line 712 may be passive or active, and imparts additional delay on the second wire 708. Accordingly, incorporation of the delay line 712 increases the overall signal transmission time from one end of the second wire 708 to the other end.

Figure 8:
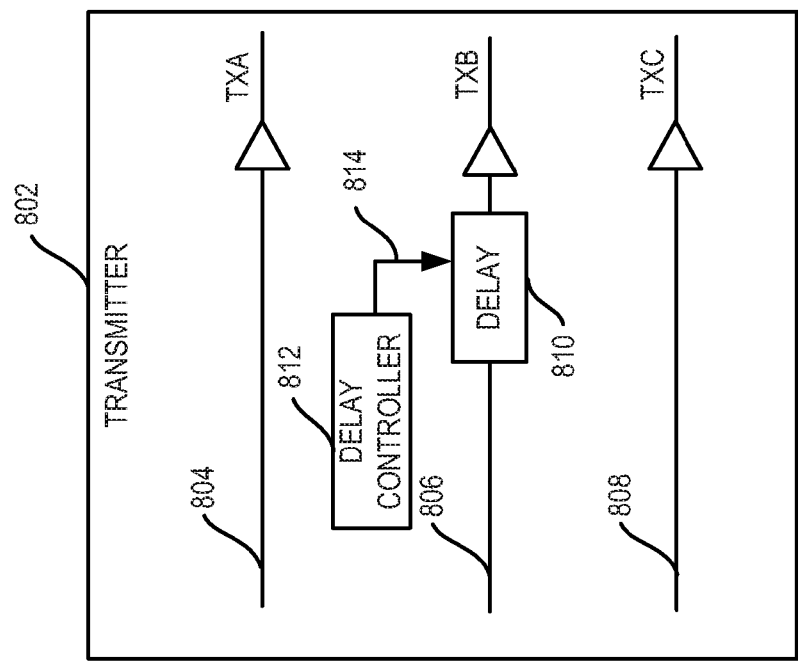
FIG. 8 is a block diagram illustrating an example of a transmitter including an active delay element in accordance with some aspects of the disclosure.

FIG. 8 illustrates an example of a multi-wire transmitter 802 that incorporates a controllable delay element. The transmitter 802 transmits data via a first wire 804, a second wire 806, and a third wire 808. A delay circuit 810 is in-line with the second wire 806. A delay controller 812 generates a control signal 814 that controls the amount of delay imparted on a signal passing through the delay circuit 810. An example of how the delay controller 812 can generate the control signal 814 is described below in conjunction with FIG. 11.

Figure 9:
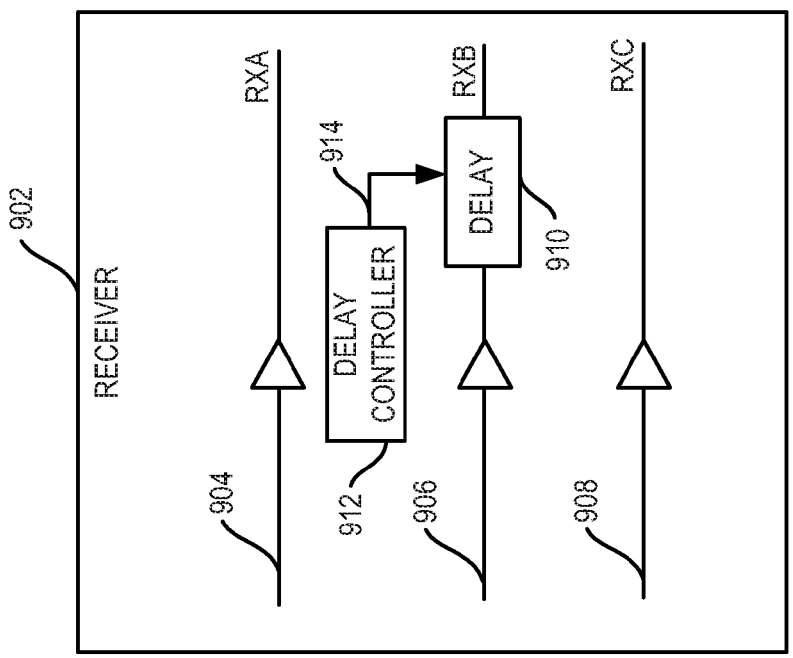
FIG. 9 is a block diagram illustrating an example of a receiver including a passive delay element in accordance with some aspects of the disclosure.

FIG. 9 illustrates an example of a multi-wire receiver 902 that incorporates a controllable delay element. The receiver 902 receives data via a first wire 904, a second wire 906, and a third wire 908. A delay circuit 910 is in-line with the second wire 906. A delay controller 912 generates a control signal 914 that controls the amount of delay imparted on a signal passing through the delay circuit 910. An example of how the delay controller 912 can generate the control signal 914 is described below in conjunction with FIG. 11.

Figure 10:
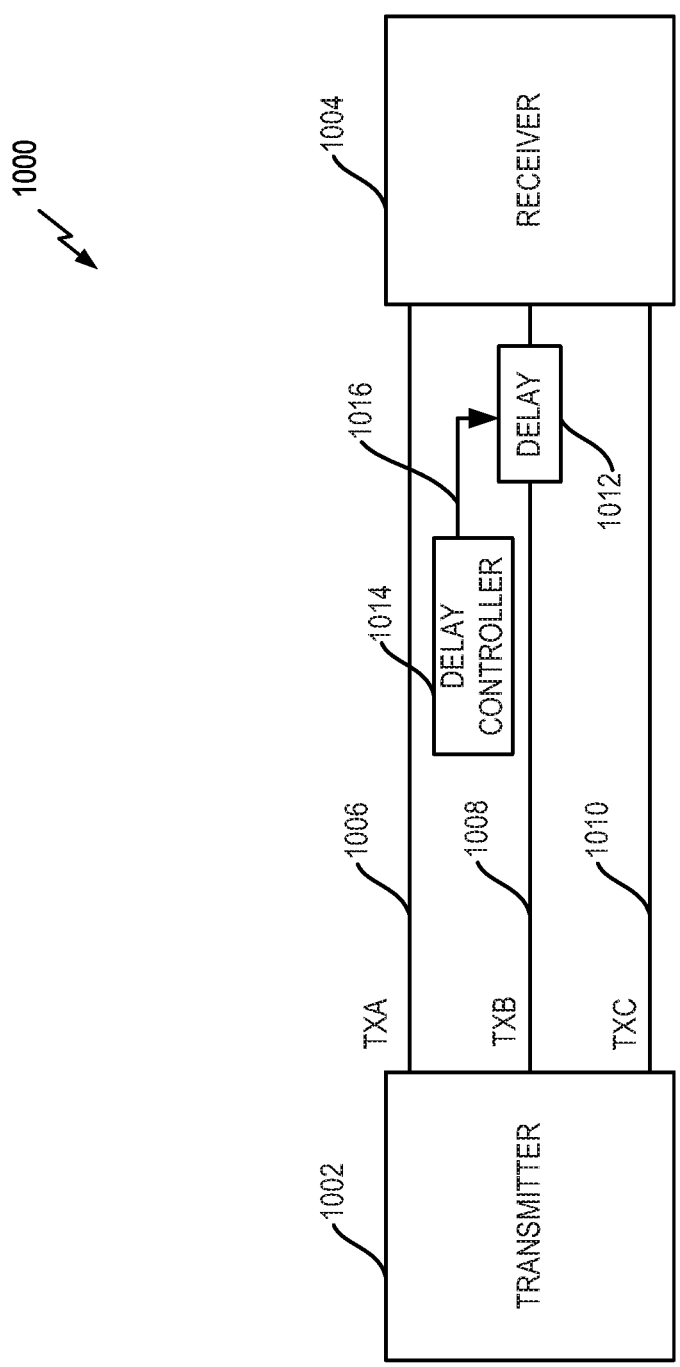
FIG. 10 is a block diagram illustrating an example of an active delay element deployed in accordance with some aspects of the disclosure.

FIG. 10 illustrates an example of a multi-wire communication system 1000 that incorporates a controllable delay element along the wire path between a transmitter 1002 and a receiver 1004. The transmitter 1002 transmits data to the receiver 1004 via a first wire 1006, a second wire 1008, and a third wire 1010. A delay circuit 1012 is in-line with the second wire 1008. A delay controller 1014 generates a control signal 1016 that controls the amount of delay imparted on a signal passing through the delay circuit 1012. An example of how the delay controller 1014 can generate the control signal 1016 will now be described with reference to FIG. 11.

Figure 11:
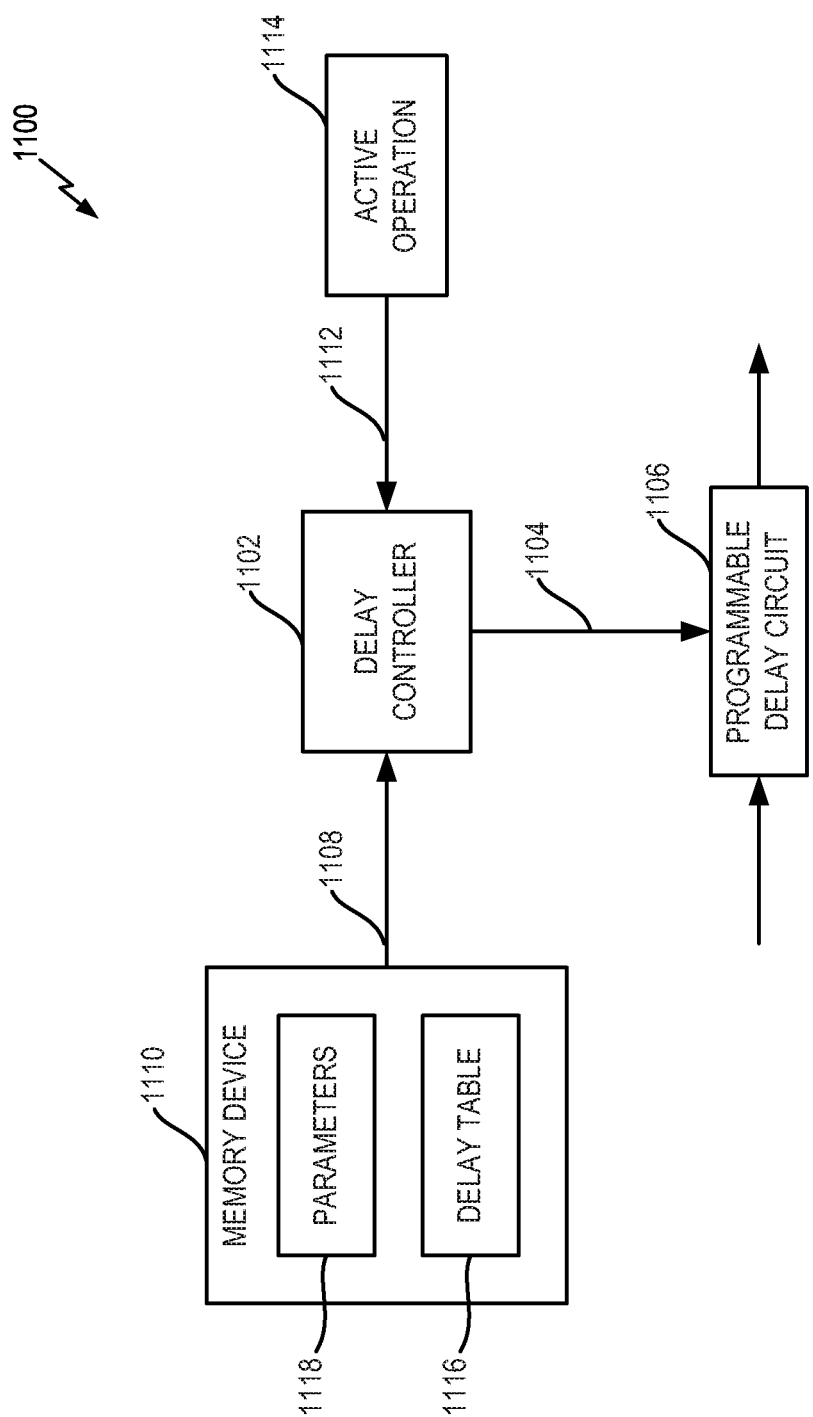
FIG. 11 is a block diagram illustrating an example of delay controller in accordance with some aspects of the disclosure.

FIG. 11 illustrates a delay control system 1100 where a delay controller 1102 generates at least one control signal 1104 to control a programmable delay circuit 1106. As indicated, the delay controller 1102 can generate the at least one control signal 1104 based on information 1108 that the delay controller 1102 retrieves from a memory device 1110 or based on information 1112 that the delay controller 1102 retrieves from an active operation 1114. In other implementations, the delay controller 1102 can receive information from other sources.

The memory device 1110 includes a delay table 1116 having a list of delay values (or indications thereof) to be used by the programmable delay circuit 1106 during certain operating conditions. For example, the delay table 1116 can list the delay values to be used for particular data transfer rates, PVT (process, voltage and temperature) conditions, wire lengths, signal propagation times, applications, and so on. The delay table 1116 can be generated, for example, based on empirical studies or based on simulations that identify the optimal delay for each corresponding condition. Accordingly, for a given operating condition or configuration, the delay controller 1102 can select the appropriate delay value from the delay table 1116.

In some aspects, the applications referred to above relate to the type of peer device (e.g., a memory device, a processor, an I/O device, etc.) that is receiving or transmitting data over a multi-wire channel. Here, different applications may correspond to different operating conditions (e.g., data rates, signal propagation times, or wire lengths) that affect how the delay is to be set. Other types of applications could be used to specify desired delay values in other implementations.

The memory device 1110 includes parameters 1118 to be used by the delay controller 1102 to determine a delay value. For example, the parameters 1118 can list the current data transfer rates, PVT (process, voltage and temperature) conditions, wire lengths, signal propagation times, applications, and so on for a multi-wire system that is controlled by the delay controller 1102. In this case, for a given operating condition or configuration, the delay controller 1102 can determine (e.g., calculate using a designated algorithm) the appropriate delay value to be used based on the parameters 1118. The parameters 1118 can be stored in the memory device 1110, for example, during system initialization in the case of static parameters (e.g., wire length) or during active operations in the case of dynamic parameters. As an example of the latter case, a component (e.g., a sensor, a processing circuit, a timing controller, etc.) of a multi-wire system controlled by the delay controller 1102 can generate the parameters 1118 (e.g., current data rate, temperature, etc.) and store the parameters 1118 in the memory device 1110.

In some implementations, an active operation 1114 directly sends the information 1112 about a current operating condition to the delay controller 1102. For example, a component (e.g., a sensor, a processing circuit, a timing controller, etc.) of a multi-wire system controlled by the delay controller 1102 can generate an indication of an operating condition (e.g., current data rate, temperature, etc.) and send the indication to the delay controller 1102. As discussed above, the delay controller 1102 can then determine an appropriate delay value to be used given the current operating conditions.

Figure 12:
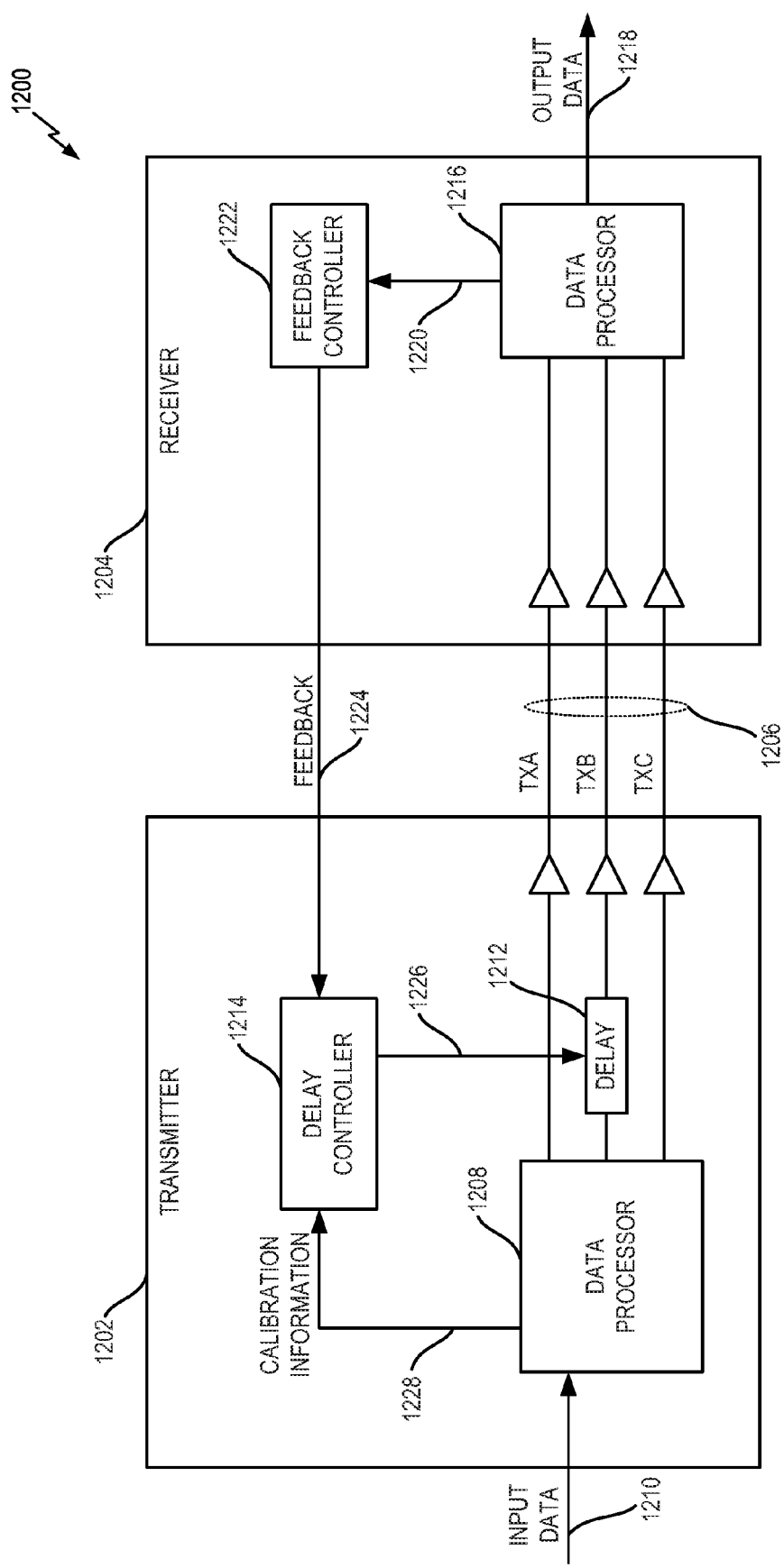
FIG. 12 is a block diagram illustrating an example of delay calibration in accordance with some aspects of the disclosure.

A calibration mechanism can also be employed to determine a delay value. FIG. 12 illustrates a communication system 1200 where a transmitter 1202 sends data to a receiver 1204 via a multi-wire channel 1206. A data processor 1208 processes input data 1210 to generate data transmitted via the multi-wire channel 1206. As discussed herein, one of the wires includes a delay element 1212 that is controlled by a delay controller 1214.

At the receiver 1204, a data processor 1216 processes data received via the multi-wire channel 1206 to provide output data 1218. In addition, the data processor 1216 provides information 1220 relating to the received data (e.g., the data itself or some characteristic of the data) to a feedback controller 1222. Based on the information 1220, the feedback controller 1222 sends feedback 1224 to the delay controller 1214 that the delay controller 1214 uses to generate a control signal 1226 for controlling the delay element 1212.

In some implementations, the feedback controller 1222 provides a loopback function. For example, during a calibration operation, the data processor 1208 may send a series of patterns over the multi-wire channel 1206. Through the use of appropriate patterns, the signal propagation times on the multi-wire channel 1206 can be estimated. For example, patterns sent a relatively high rate may be received with more errors if the jitter associated with the corresponding received signal is high. Consequently, the delay controller 1214 can compare the data that was received by the receiver 1204 (as fed back through the feedback 1224) with the data sent by the transmitter 1202 to determine the error rate. To this end, the data processor 1208 can send calibration information 1228 (e.g., calibration data patterns) to the delay controller 1214. The delay controller 1214 can then adjust the delay value during the calibration operation to determine the delay value that results in the lowest error rate.

Figure 13:
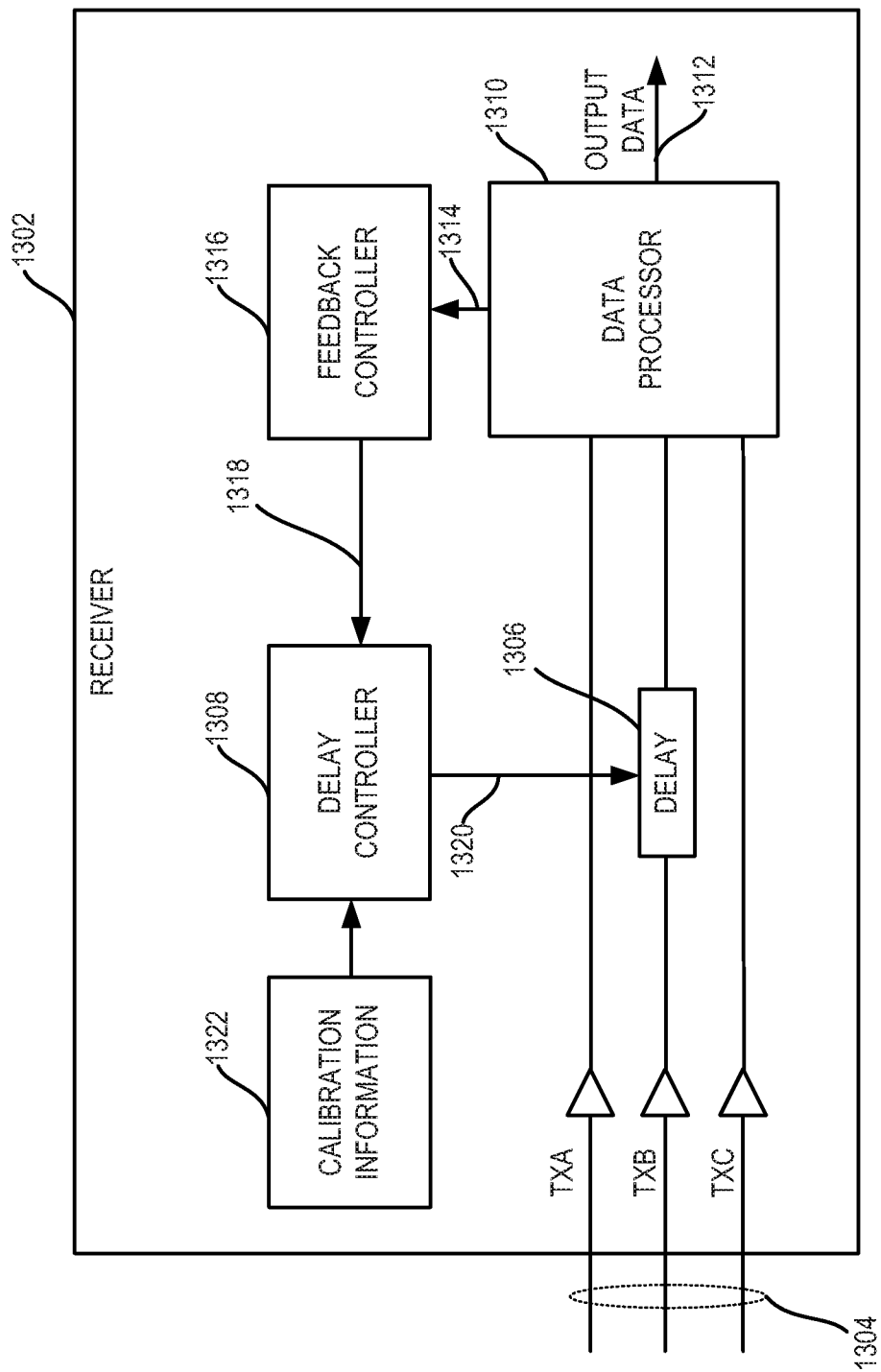
FIG. 13 is a block diagram illustrating another example of delay calibration in accordance with some aspects of the disclosure.

A calibration scheme also can be employed at a receiver. FIG. 13 illustrates a receiver 1302 that receives data via a multi-wire channel 1304. As discussed herein, one of the wires includes a delay element 1306 that is controlled by a delay controller 1308. A data processor 1310 processes the received data to provide output data 1312. In addition, the data processor 1310 provides information 1314 relating to the received data (e.g., the data itself or some characteristic of the data) to a feedback controller 1316. Based on the information 1314, the feedback controller 1316 sends feedback 1318 to the delay controller 1308 that the delay controller 1308 uses to generate a control signal 1320 for controlling the delay element 1306.

In some implementations, the feedback controller 1316 provides a loopback function. Thus, during a calibration operation, a transmitter (not shown) may send a series of patterns over the multi-wire channel 1304. In this case, corresponding calibration information 1322 (e.g., the data patterns) may have been previously provided to the receiver 1302. Consequently, the delay controller 1308 can compare the data that was received by the receiver 1302 (as fed back through the feedback 1318) with the calibration information 1322. Again, the delay controller 1308 can adjust the delay value during the calibration operation to determine the delay value that results in the lowest error rate.

Figure 15:
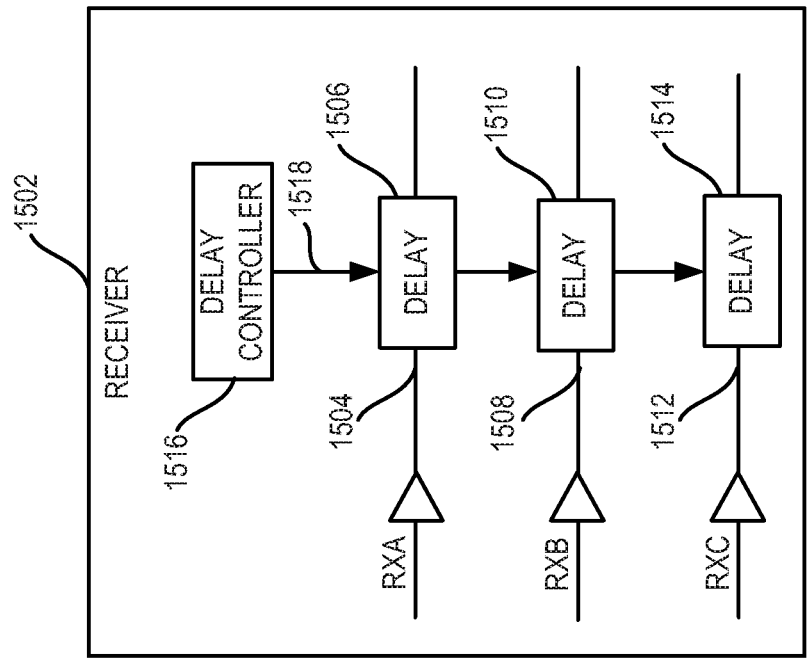
FIG. 15 is a block diagram illustrating another example of delay elements for a three-wire channel in accordance with some aspects of the disclosure.
Figure 14:
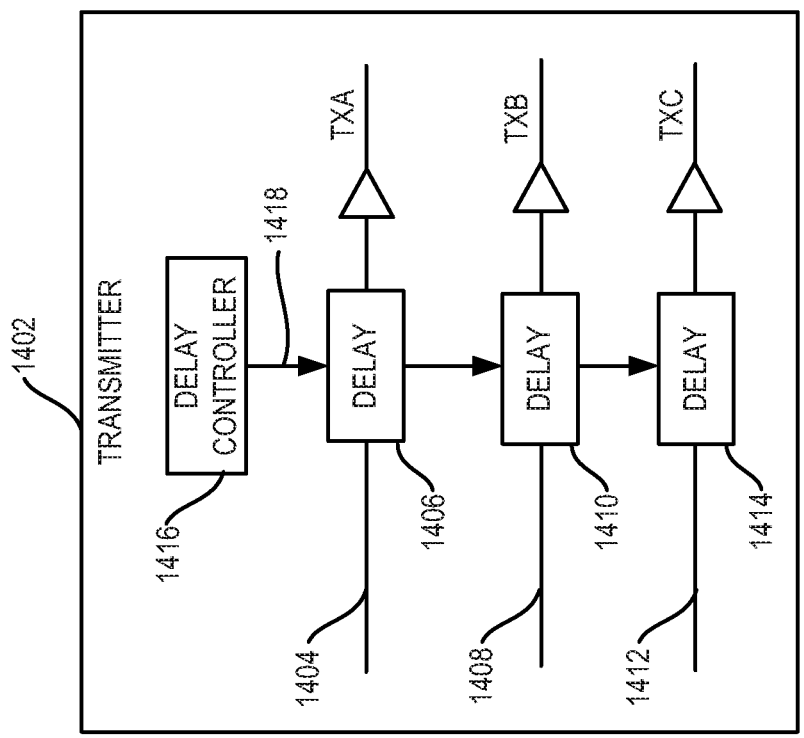
FIG. 14 is a block diagram illustrating an example of delay elements for a three-wire channel in accordance with some aspects of the disclosure.

In the previous figures, delay is illustrated as being imparted on a single wire. In practice, delay may be imparted on multiple wires. For example, different delays may be imparted on different wires so that one or more of the wires has a longer signal propagation time as compared to at least one other one of the wires. In this way, the signal propagation times of each of the corresponding wire pairs can be matched in accordance with the teachings herein. FIGS. 14 and 15 illustrate a transmitter 1402 and a receiver 1502, respectively, each of which employs multiple delay elements.

In FIG. 14, signals on a first wire 1404 are delayed by a first delay element 1406, signals on a second wire 1408 are delayed by a second delay element 1410, and signals on a third wire 1412 are delayed by a third delay element 1414. In this case, a delay controller 1416 generates several control signals 1418 that individually control the delay in a given one of the first, second, or third delay elements 1406, 1410, or 1414.

In FIG. 15, signals on a first wire 1504 are delayed by a first delay element 1506, signals on a second wire 1508 are delayed by a second delay element 1510, and signals on a third wire 1512 are delayed by a third delay element 1514. In this case, a delay controller 1516 generates several control signals 1518 that individually control the delay in a given one of the first, second, or third delay elements 1506, 1510, or 1514.

Figure 16:
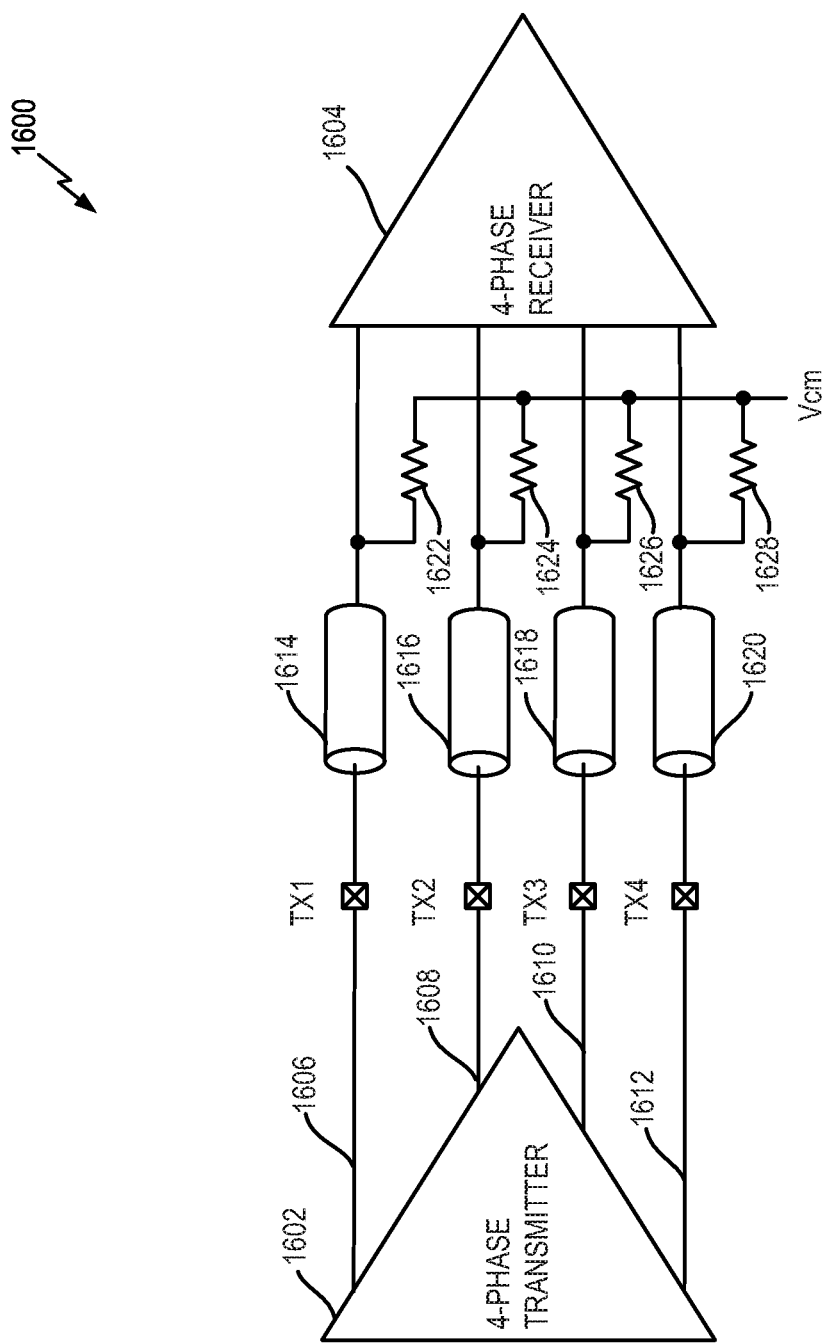
FIG. 16 is a circuit diagram illustrating an example of a four-wire channel.

As mentioned above, the teachings herein are applicable to multi-wire channels that employ more than three wires. FIG. 16 illustrates an example of a four-wire channel 1600. A transmitter 1602 sends data to a receiver 1604 via a first wire 1606, a second wire 1608, a third wire 1610, and a fourth wire 1612. The characteristic impedance of each of the first, second, third, and fourth wires 1606, 1608, 1610, and 1612 is represented by a first characteristic impedance 1614, a second characteristic impedance 1616, and a third characteristic impedance 1618, and a fourth characteristic impedance 1620, respectively. The first, second, third, and fourth wires 1606, 1608, 1610, and 1612 are each terminated at the receiver 1604 by a first termination resistor 1622, a second termination resistor 1624, a third termination resistor 1626, and a fourth termination resistor 1628, respectively, coupled to a common mode voltage Vcm.

In a four-wire channel, for a given data transfer (e.g., of a symbol or bit), the transmitter drives two of the wires and leaves the remaining two wires in a high impedance state (e.g., floating). For the next data transfer, the transmitter again drives two of the wires and leaves the remaining wires in a high impedance state. As with a three-wire channel, the pair of wires used for any subsequent data transfer may be different from or the same as the pair of wires used for a previous data transfer.

Using the designations A, B, C, and D to refer to the first wire 1606, the second wire 1608, the third wire 1610, and the fourth wire 1612, a given transmission over the channel 1600 can involve wire pair A-B being driven, wire pair A-C being driven, wire pair A-D being driven, wire pair B-C being driven, wire pair B-D being driven, or wire pair C-D being driven. Thus, due to the larger number of potential combinations, it may be seen that more information can be transmitted over a four-wire channel as compared to a three-wire channel.

Again, however, the different wire pairs may have different transmission characteristics. For example, the signal propagation time of one wire pair may be different from the signal propagation time of another wire pair due to the different distances that may exist between the corresponding wires for each of the wire pairs. For example, it should be appreciated that for four wires routed in parallel on a substrate, the wire pair consisting of the two outer wires will be even further apart than in the three-wire example of FIG. 2. Thus, jitter may be even more pronounced in this case.

Figure 17:
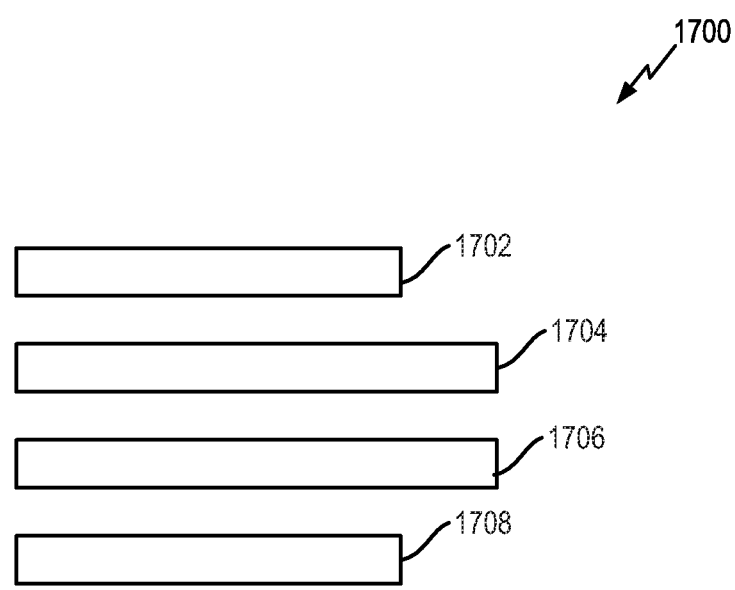
FIG. 17 is a diagram illustrating an example of wire lengths for a four-wire channel.

FIG. 17 illustrates, in a simplified manner, a circuit 1700 that includes four wires (e.g., transmission lines) 1702, 1704, 1706, and 1708. As shown in this single layer example, the two center wires 1704 and 1706 are of the same length, but longer than the two outer wires 1702 and 1708. By adding delay to the center wires 1704 and 1706 in this manner, the signal propagation times of each of the six unique wire pairs in the circuit 1700 can be matched in accordance with the teachings herein. It should be appreciated that in other implementations delay can be added to the center wires 1704 and 1706 using one or more of the other techniques described herein (e.g., active delay elements, changing other physical characteristics of the wires, using multiple layers, and so on).

Figure 18:
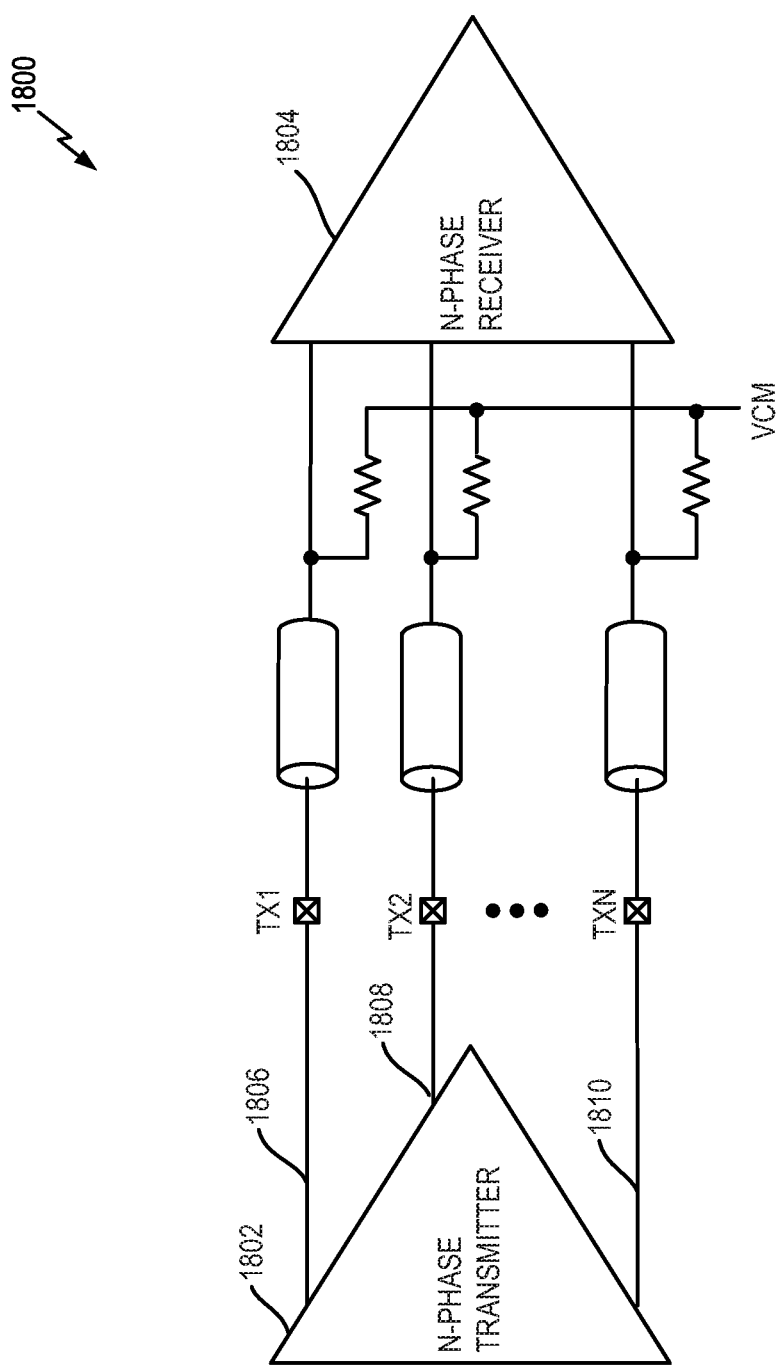
FIG. 18 is a circuit diagram illustrating an example of an n-wire channel.

It should be appreciated that jitter issues exists for the general n-wire scenario, where "n" is three or more. FIG. 18 illustrates an example of an n-wire channel 1800. A transmitter 1802 sends data to a receiver 1804 via a first wire 1806, a second wire 1808, and any other wires up to an n-th wire 1810.

In the n-wire channel 1800, for a given data transfer (e.g., of a symbol or bit), the transmitter 1802 drives two of the wires and leaves the remaining wires in a high impedance state (e.g., floating). The pair of wires used for any subsequent data transfer may be different from or the same as the pair of wires used for a previous data transfer. Again, the signal propagation time of one wire pair may be different from the signal propagation time of another wire pair due to the different distances that may exist between the corresponding wires for each of the wire pairs. Thus, jitter may be a significant issue in an n-wire channel.

Figure 19:
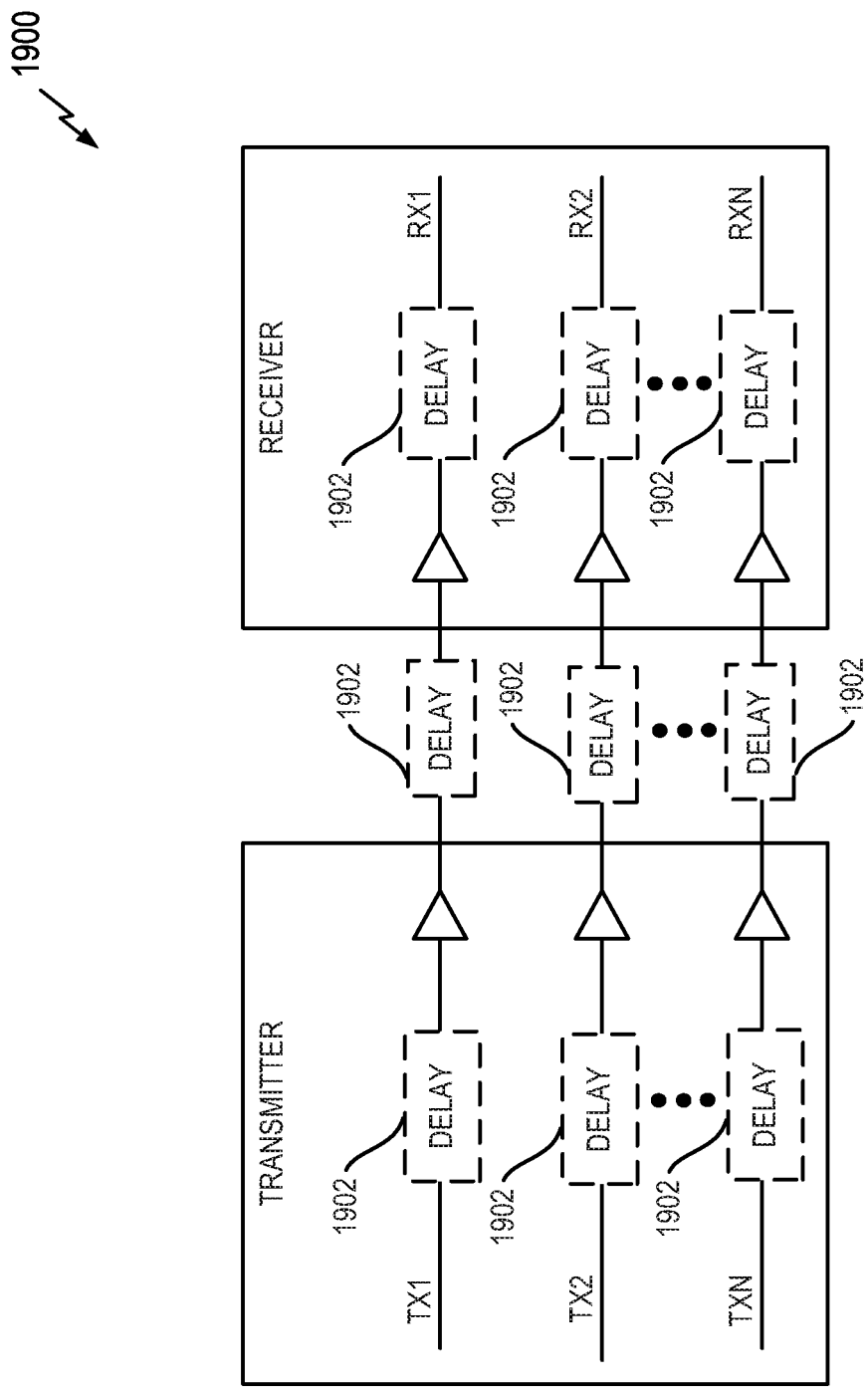
FIG. 19 is a block diagram illustrating an example of delay elements for an n-wire channel in accordance with some aspects of the disclosure.

The techniques described herein can be generally extended to the n-channel scenario. As illustrated in the communication system 1900 of FIG. 19, a delay element 1902 can be incorporated into any of the n-wires, at any appropriate location along each wire. By adding delay to one or more wires, the signal propagation times for each wire pair can be matched. For example, in the absence of an empirical model that precisely describes which wire should be delay and the extent of that delay (e.g., for higher orders of "n") a trial and error algorithm or a regression-based algorithm may be employed to identify these parameters.

Figure 20:
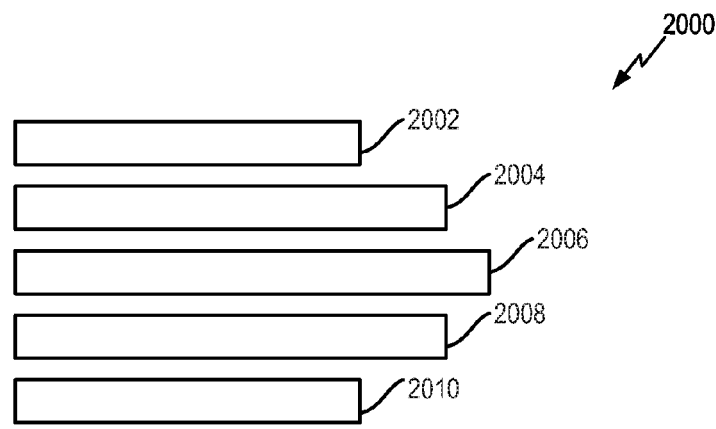
FIG. 20 is a diagram illustrating a first example of wire lengths for a five-wire channel.
Figure 21:
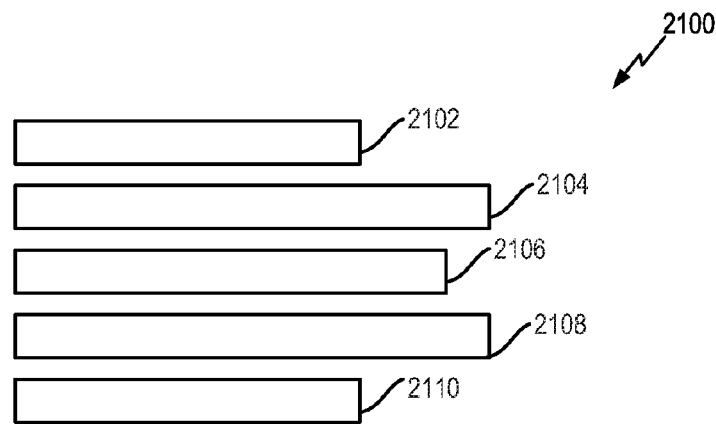
FIG. 21 is a diagram illustrating a second example of wire lengths for a five-wire channel.
Figure 22:
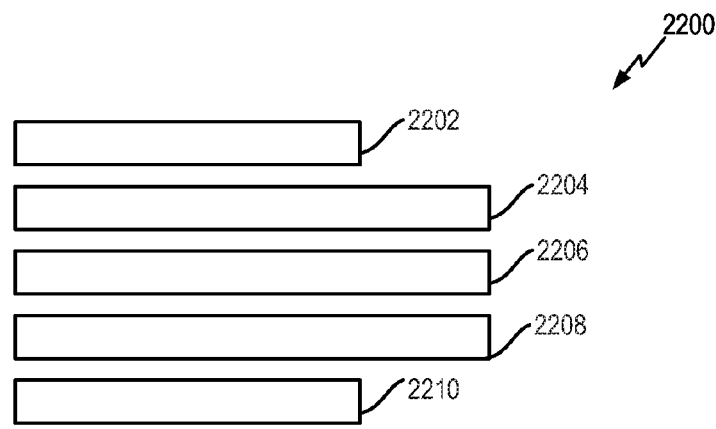
FIG. 22 is a diagram illustrating a third example of wire lengths for a five-wire channel.

FIGS. 20-22 illustrate simplified examples of circuits 2000-2200, respectively, that include five wires (e.g., transmission lines). For the five wire scenario utilizing a single layer, the center three wires are longer than the outer two wires. By adding delay to the center wires in this manner, the signal propagation times of each of the unique wire pairs in a given one of the circuits 2000-2200 can be matched in accordance with the teachings herein. The exact amount by which the center wires are made longer can be determined, for example, by simulation. It should be appreciated that in other implementations delay can be added to the center wires using one or more of the other techniques described herein (e.g., active delay elements, changing other physical characteristics of the wires, using multiple layers, and so on). FIGS. 20-22 illustrate three different examples with different relative lengths added to the center wires.

The circuit 2000 of FIG. 20 includes wires 2002, 2004, 2006, 2008, and 2010. The center wires 2004, 2006, and 2008 are longer than the two outer wires 2002 and 2010. In this case, the center wires 2004 and 2008 are of the same length, but the center wire 2006 has a different length. The two outer wires 2002 and 2010 have the same length.

The circuit 2100 of FIG. 21 includes wires 2102, 2104, 2106, 2108, and 2110. The center wires 2104, 2106, and 2108 are longer than the two outer wires 2102 and 2110. In this case, the center wires 2104 and 2108 are of the same length, but the center wire 2106 has a different length. The two outer wires 2102 and 2110 have the same length.

The circuit 2200 of FIG. 22 includes wires 2202, 2204, 2206, 2208, and 2210. The center wires 2204, 2206, and 2208 are longer than the two outer wires 2202 and 2210. In this case, all of the center wires 2204, 2206, and 2208 are of the same length. The two outer wires 2202 and 2210 have the same length.

As mentioned above, a variety of characteristics may be adjusted to control the signal propagation time associated with wire pairs in a multi-wire channel. FIGS. 23-26 illustrate several of these characteristics.

Figure 23:
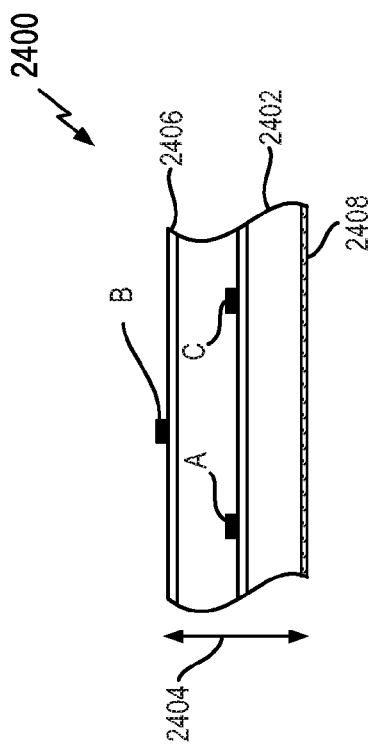
FIG. 23 is a cross-sectional view of a first example circuit for improving signal propagation timing in accordance with some aspects of the disclosure.

FIG. 23 illustrates that the jitter issue described herein may be mitigated by ensuring that all wires are equidistance from each other. FIG. 23 depicts a side sectional view 2300 of three wires, designated A, B, and C, implemented on different layers of a substrate 2302. Specifically, the first wire A and the third wire C are on a first layer 2304 and the second wire B is on a second layer 2306. As represented by the lines 2308, each wire is equidistance to the other wires.

In practice, routing all wires in the precise manner of FIG. 23 at the circuit design stage may be difficult due to routing constraints. However, such an approach may be employed for at least for a portion of a wire path, whereby the other techniques described herein are used to add any additional delay that may be desired. Advantageously, such a combined approach may reduce the amount of delay that needs to be added to a wire since the timing skews on wires that are at least partially balanced can be expected to be lower.

Figure 24:
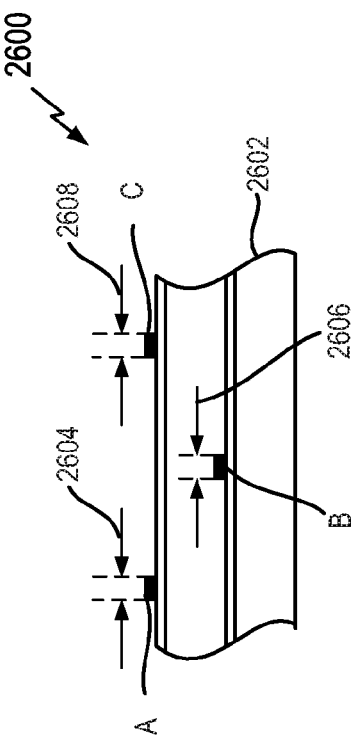
FIG. 24 is a cross-sectional view of a second example circuit for improving signal propagation timing in accordance with some aspects of the disclosure.

FIG. 24 illustrates a side sectional view 2400 of three wires, designated A, B, and C, implemented on a substrate 2402. The signal propagation time associated with a wire depends at least in part on the distance of the wire to a ground plane. Accordingly, at the circuit design stage, the distance 2404 of a metal layer 2406 (and, hence, the wires on that layer) to a ground plane 2408 may be controlled to add delay to any wires (the wire B in this example) on the metal layer 2406. Furthermore, the other techniques described herein may be used in conjunction with the technique of FIG. 24 to add any additional delay that may be desired.

Figure 25:
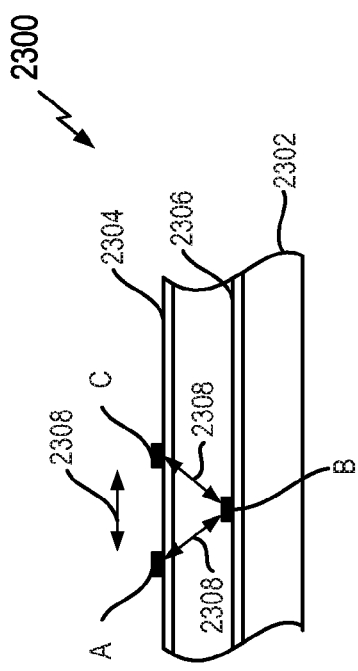
FIG. 25 is a cross-sectional view of a third example circuit for improving signal propagation timing in accordance with some aspects of the disclosure.

FIG. 25 illustrates a side sectional view 2500 of three wires, designated A, B, and C, implemented on a substrate 2502. The signal propagation time associated with a wire depends at least in part on the thickness of the wire. Accordingly, at the circuit design stage, any one of a thickness 2504 of the first wire A, a thickness 2506 of the second wire B, or a thickness 2508 of the third wire C may be controlled to add delay to the corresponding wire. Furthermore, the other techniques described herein may be used in conjunction with the technique of FIG. 25 to add any additional delay that may be desired.

Figure 26:
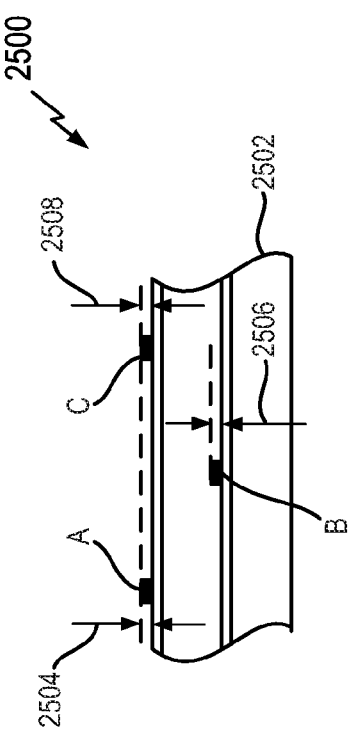
FIG. 26 is a cross-sectional view of a fourth example circuit for improving signal propagation timing in accordance with some aspects of the disclosure.

FIG. 26 illustrates a side sectional view 2600 of three wires, designated A, B, and C, implemented on a substrate 2602. The signal propagation time associated with a wire depends at least in part on the width of the wire. Accordingly, at the circuit design stage, any one of a width 2604 of the first wire A, a width 2606 of the second wire B, or a width 2608 of the third wire C may be controlled to add delay to the corresponding wire. Furthermore, the other techniques described herein may be used in conjunction with the technique of FIG. 26 to add any additional delay that may be desired.

The signal propagation time associated with a set of wires also depends at least in part on the spacing between the wires. Accordingly, the spacing between two or more wires may be controlled to add delay to a given wire. Furthermore, the other techniques described herein may be used in conjunction with wire spacing to add any additional delay that may be desired.

Figure 27:
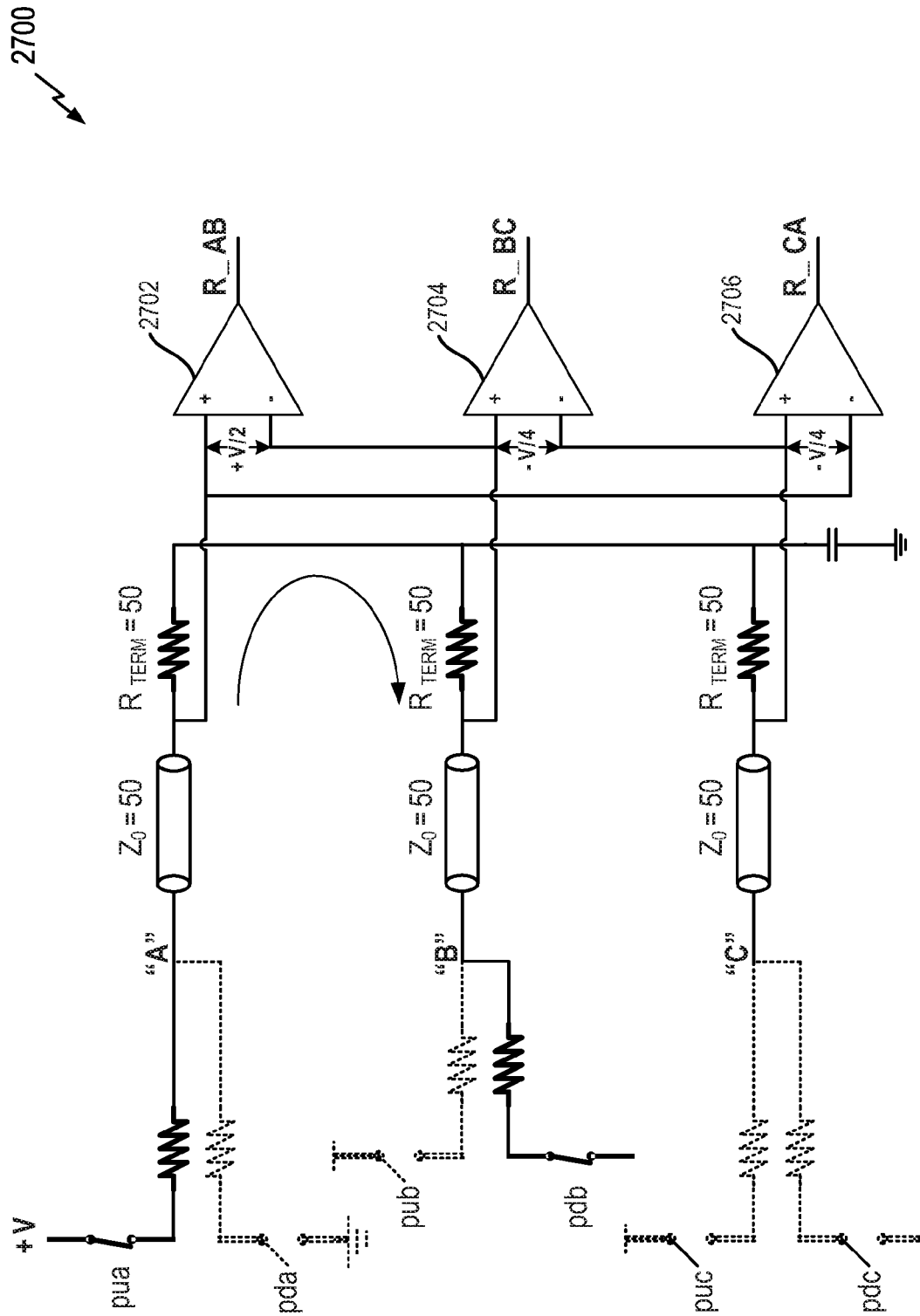
FIG. 27 is a circuit diagram illustrating an example of a three-wire channel.
Figure 28:
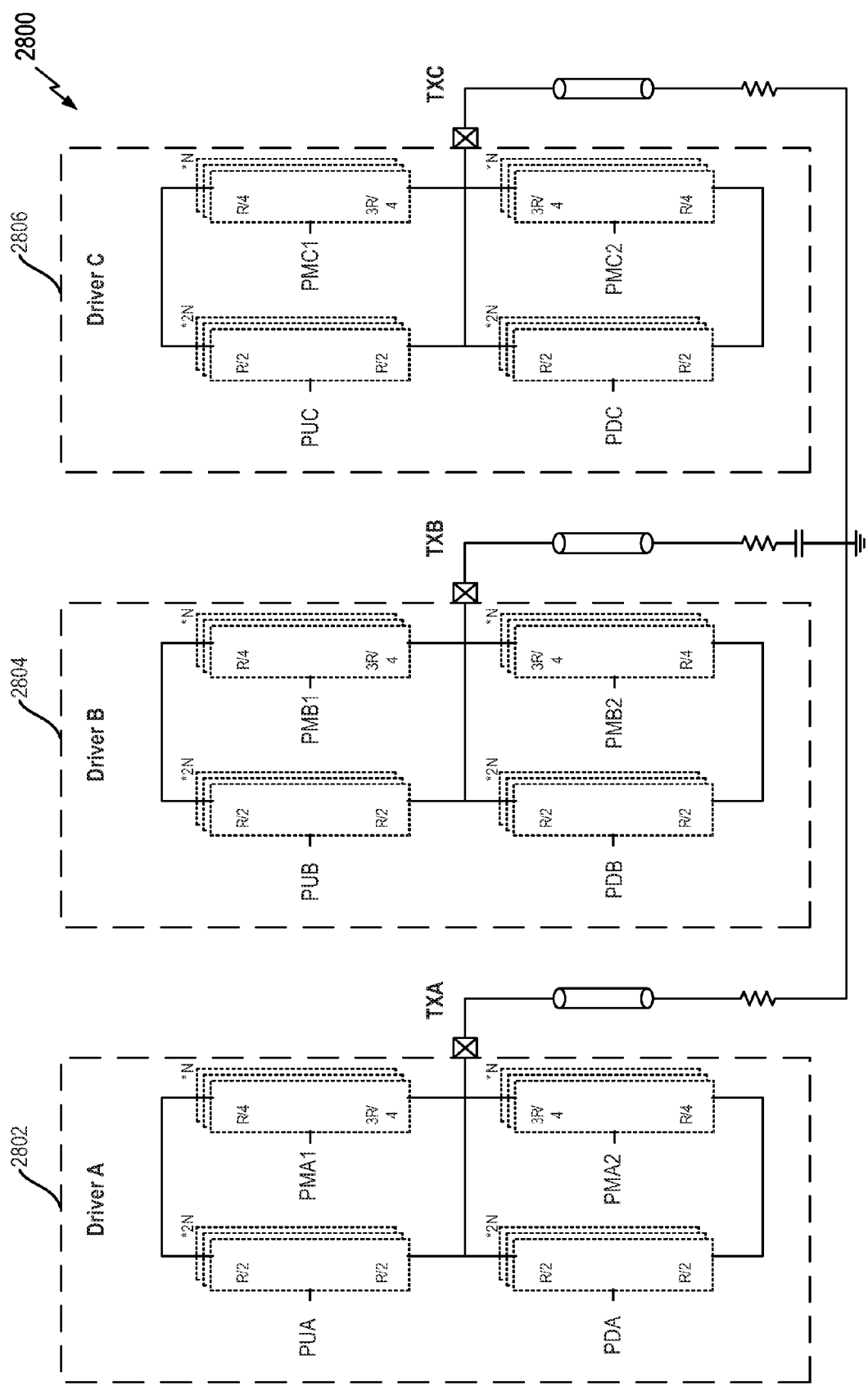
FIG. 28 is a circuit diagram illustrating an example of a driver circuit for a three-wire channel.
Figure 29:
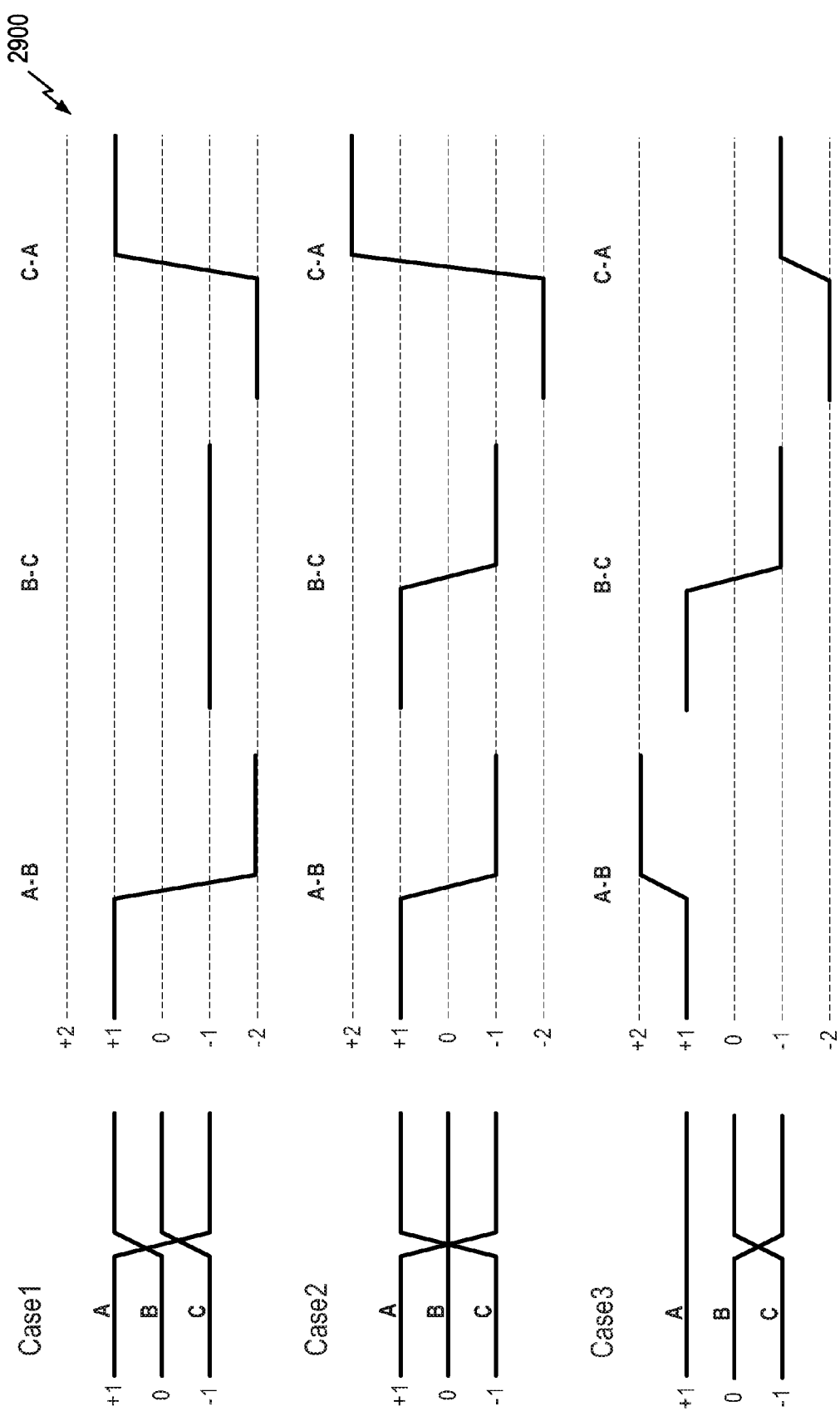
FIG. 29 is a diagram illustrating an example of signaling for a three-wire channel.

Referring now to FIGS. 27-29, additional details of multi-wire signaling will be described in the context of a three-wire channel (e.g., for C-PHY).

FIG. 27 illustrates a system 2700 that uses a trio of wires designated A, B, and C. Through the use of pull-up (pu) switches and pull-down (pd) switches, for each symbol to be transmitted, two of the wires are driven to opposite levels while the third wire is terminated to a mid-level. Specifically, the switches pua and pda are used to pull up or pull down, respectively, the wire A. The switches pub and pdb are used to pull up or pull down, respectively, the wire B. The switches puc and pdc are used to pull up or pull down, respectively, the wire C.

At a receiver, three OP amps are coupled to the wires A, B, and C to decode the received symbol information. A first OP amp 2702 generates a signal R_AB indicative of the difference between the wires A and B. A second OP amp 2704 generates a signal R_BC indicative of the difference between the wires B and C. A third OP amp 2706 generates a signal R_CA indicative of the difference between the wires C and A.

In FIG. 27, the signal propagation times of interest corresponds to the wire path from the switches to the inputs of the OP amps. Thus, a delay element as taught herein may be incorporated into any section of these paths.

A more detailed driver circuit 2800 is shown in FIG. 28. In general, the pull-up control signals (PUA, PUB, and PUC) correspond to the pull-up control signals (pua, pub, and puc) of FIG. 27. Similarly, the pull-down control signals (PDA, PDB, and PDC) generally correspond to the pull-down control signals (pda, pdb, and pdc) of FIG. 27.

In some aspects, the driver circuit 2800 is similar to a conventional self-series terminated (SST) driver. Compared to the system 2700 of FIG. 27, an extra series resistor branch (controlled by control signals PM[A,B,C]) is added to maintain the mid-level wire output impedance at 50 ohms. Irrespective of the impedance of any switch MOSFETs, R/2N is set equal to 50 ohm for impedance matching.

FIG. 29 illustrates three examples of waveforms generated by the system 2700. The left-hand waveforms correspond to the signals driven on the wires A, B, and C for the three cases. The right-hand waveforms correspond to the outputs of the OP amps 2702-2706 for each of the three cases.

Exemplary Operating Environment

The use of such a signaling scheme will be described in more detail in conjunction with the system-level description provided in FIGS. 30-36.

Figure 30:
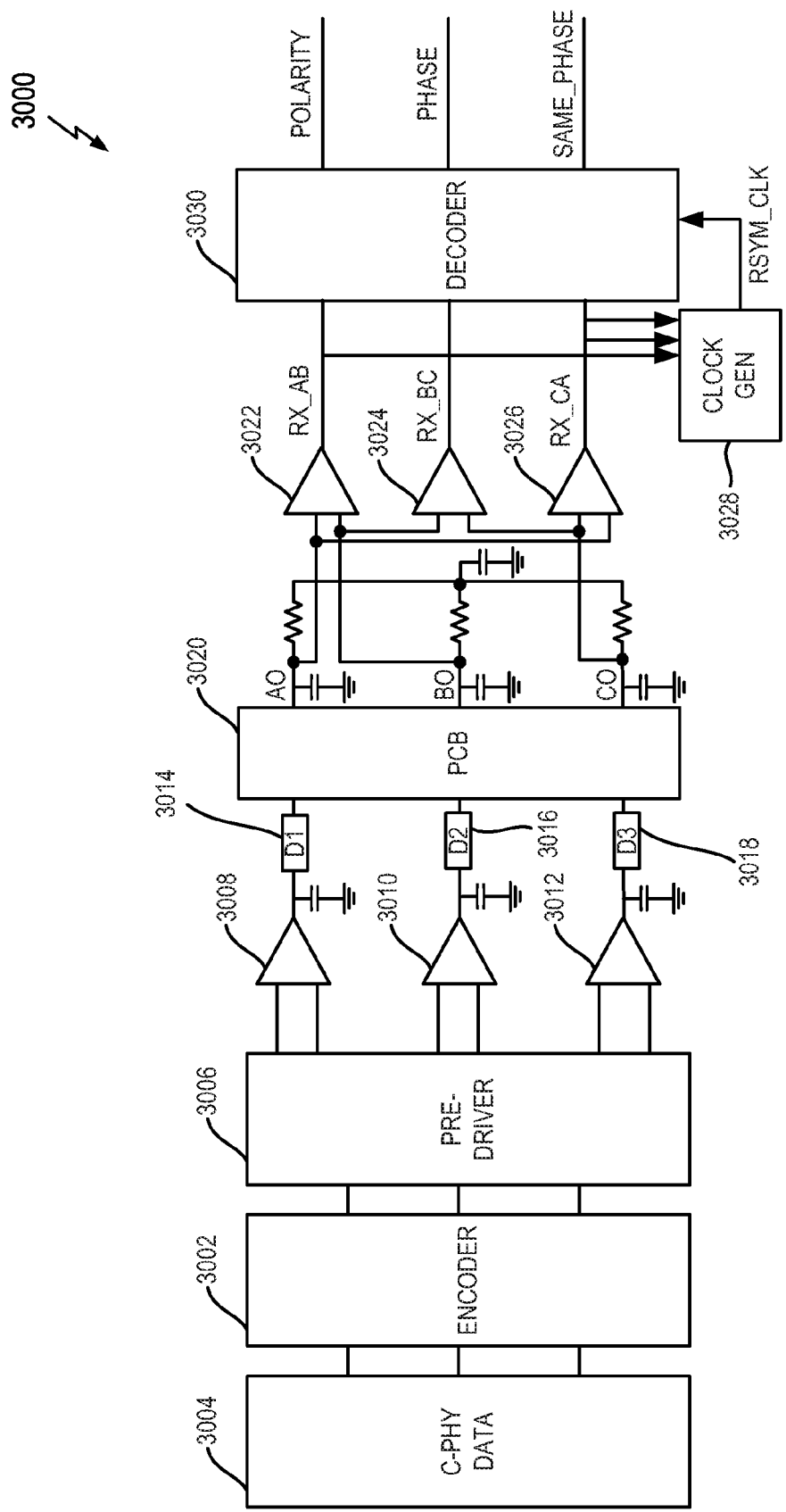
FIG. 30 is a block diagram illustrating a system employing a three-wire channel.
Figure 31:
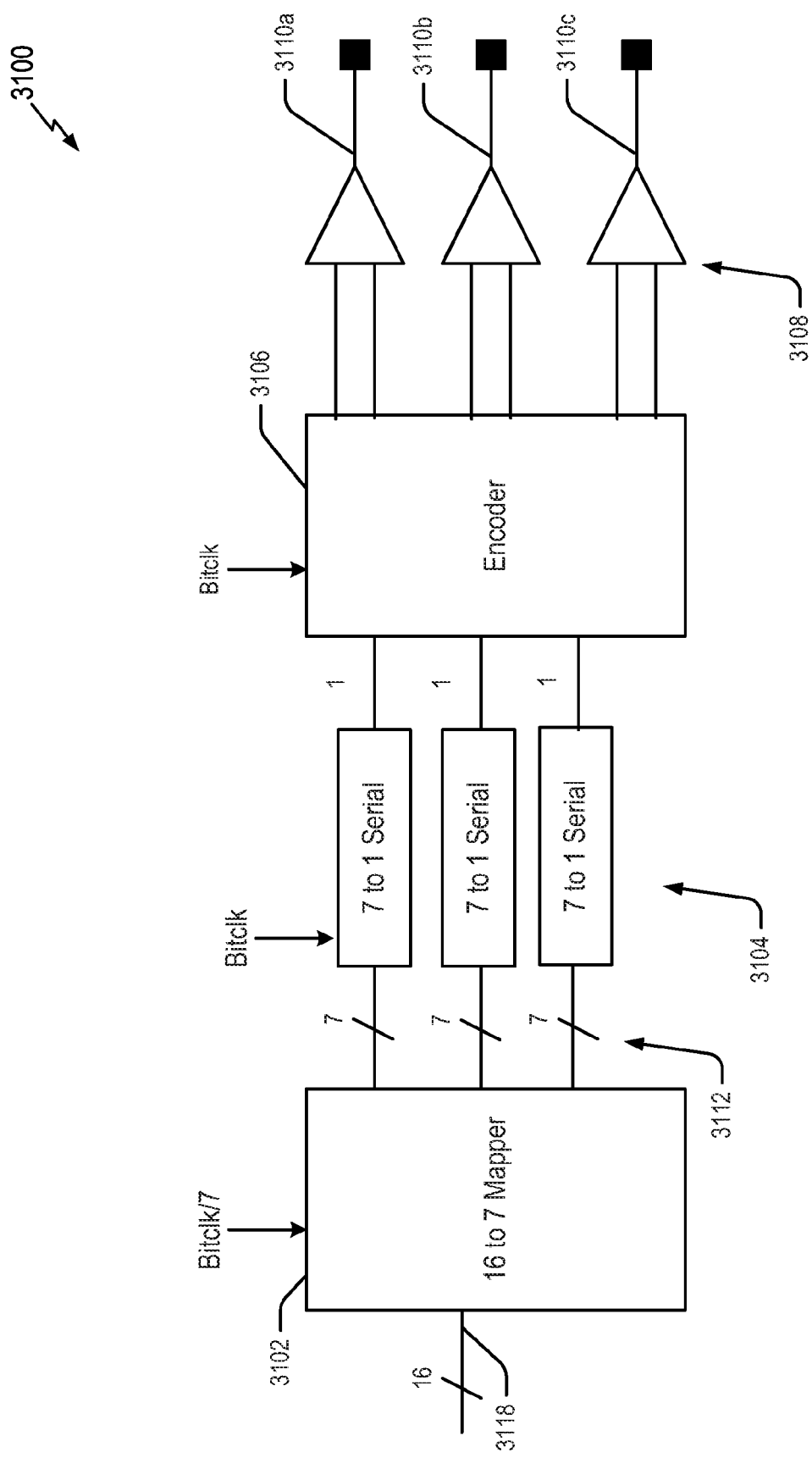
FIG. 31 is a block diagram illustrating an example of an N-Phase polarity data encoder.
Figure 34:
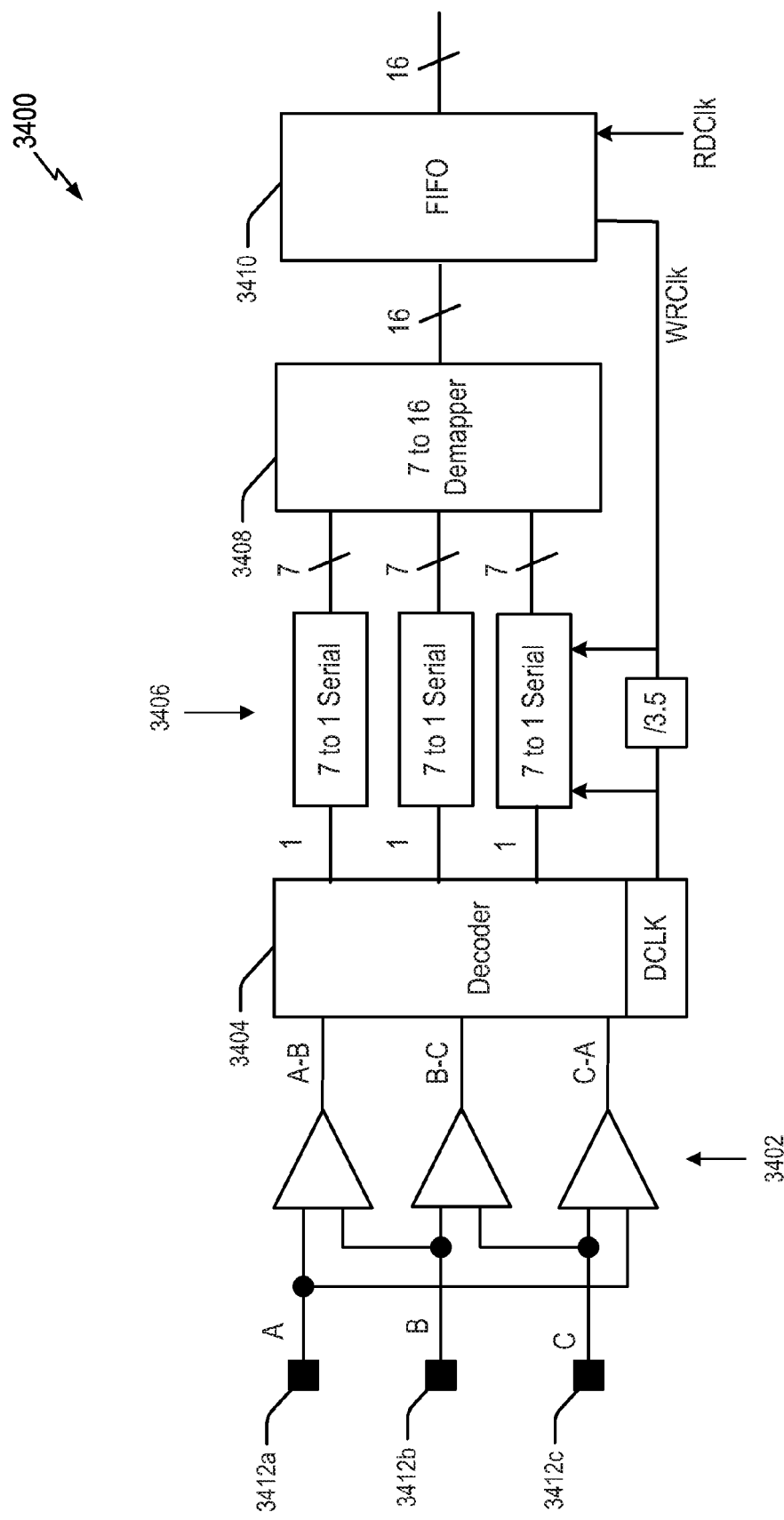
FIG. 34 is a block diagram illustrating a three-Phase polarity data decoder.

In FIG. 30, a system 3000 illustrates transmitter components, channel components, and receiver components associated with a sample implementation of a three-wire channel. An encoder 3002 encodes C-PHY data 3004 and sends the encoded data to a pre-driver 3006. The pre-driven signals are driven onto an external bus by driver I/O circuits 3008, 3010, and 3012. Corresponding pad capacitances (Cp) are indicated for each wire of the external bus. Delays D1 3014, D2 3016, and D3 3018 correspond to propagation delay times for wires A, B, and C, respectively, of the three-wire channel. An additional PCB delay 3020 corresponding to the delay imparted on the wires A, B, and C implemented in a PCB is also represented. At the receive section, corresponding pad capacitances (Cp) are again indicated for each wire of the bus, as well as the termination resistors and common capacitance (Ccomm) for the termination circuit. Drivers 3022, 3024, and 3026 correspond to the respective OP amps 2702, 2704, and 2706 of FIG. 27. A clock generator 3028 derives a clock signal RSYM_CLK from the signals output by the drivers 3022, 3024, and 3026. A decoder 3030 then generates signals (POLARITY, PHASE, AND SAME_PHASE) corresponding to the C-PHY data transmitted by the transmit side. FIGS. 31 and 34 illustrate example of a transmit side and a receive side, respectively, of the system 3000 in more detail.

FIGS. 31-34 describe multi-Phase data encoding and decoding methods involving a plurality of wires (i.e., M wires). The M wires typically include three or more wires. The M wires may include conductive traces on a circuit board or within a conductive layer of a semiconductor integrated circuit (IC) device. The M wires may be divided into a plurality of transmission groups, each group encoding a portion of a block of data to be transmitted. An N-Phase encoding scheme is defined in which bits of data are encoded in Phase transitions and polarity changes on the M wires. In one example, an N-Phase encoding scheme for a 3-wire system may include three Phase states and two polarities, providing 6 states and 5 possible transitions from each state. Deterministic voltage and/or current changes may be detected and decoded to extract data from the M wires. Decoding does not rely on independent wires, or pairs of wires and timing information can be derived directly from Phase and/or polarity transitions in the M wires. N-Phase polarity data transfer can be applied to any signaling interface, such as electrical, optical and radio frequency (RF) interfaces, for example.

FIG. 31 is a diagram 3100 illustrating an example of an A-wire, N-Phase polarity encoding transmitter configured for M=3 and N=3. The example of 3-wire, 3-Phase encoding is selected solely for the purpose of simplifying descriptions of certain aspects of this disclosure. The principles and techniques disclosed for 3-wire, 3-Phase encoders can be applied in other configurations of M-wire, N-Phase polarity encoders.

When N-Phase polarity encoding is used, connectors such as signal wires 3110a, 3110b and 3110c on an M-wire bus may be undriven, driven positive, or driven negative. An undriven signal wire 3110a, 3110b or 3110c may be in a high-impedance state. An undriven signal wire 3110a, 3110b or 3110c may be driven to a voltage level that lies substantially halfway between the positive and negative voltage levels provided on driven signal wires. An undriven signal wire 3110a, 3110b or 3110c may have no current flowing through it. In the example illustrated in FIG. 31, each signal wire 3110a, 3110b and 3110c may be in one of three states (denoted as +1, −1, and 0) using drivers 3108. In one example, drivers 3108 may include unit-level current-mode drivers. In another example, drivers 3108 may drive opposite polarity voltages on two signal wires 3110a and 3110b while the third signal wire 3110c is at high impedance and/or pulled to ground. For each transmitted symbol interval, at least one signal is in the undriven (0) state, while the number of signals driven positive (+1 state) is equal to the number of signals driven negative (−1 state), such that the sum of current flowing to the receiver is always zero. For each pair of consecutive symbol transmission intervals, at least one signal wire 3110a, 3110b or 3110c has a different state in the two symbol transmission intervals.

In the example depicted in FIG. 31, 16-bit data 3118 is input to a mapper 3102, which maps the input data 3118 to 7 symbols 3112 for transmitting sequentially over the signal wires 3110a, 3110b and 3110c. The 7 symbols 3112 may be serialized, using parallel-to-serial converters 3104 for example. An M-wire, N-Phase encoder 3106 receives 7 symbols 3112 produced by the mapper one symbol at a time and computes the state of each signal wire 3110a, 3110b and 3110c for each symbol interval. The encoder 3106 selects the states of the signal wires 3110a, 3110b and 3110c based on the input symbol and the previous states of signal wires 3110a, 3110b and 3110c.

The use of M-wire, N-Phase encoding permits a number of bits to be encoded in a plurality of symbols where the bits per symbol is not an integer. In the simple example of a 3-wire system, there are 3 available combinations of 2 wires that may be driven simultaneously, and 2 possible combinations of polarity on the pair of simultaneously driven wires, yielding 6 possible states. Since each transition occurs from a current state, 5 of the 6 states are available at every transition. The state of at least one wire is required to change at each transition. With 5 states, $\log_2(5) \approx 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encodes five states has $5^7$ (78,125) permutations. Accordingly, the 7 symbols may be used to encode the $2^{16}$ (65,536) permutations of 16 bits.

Figure 32:
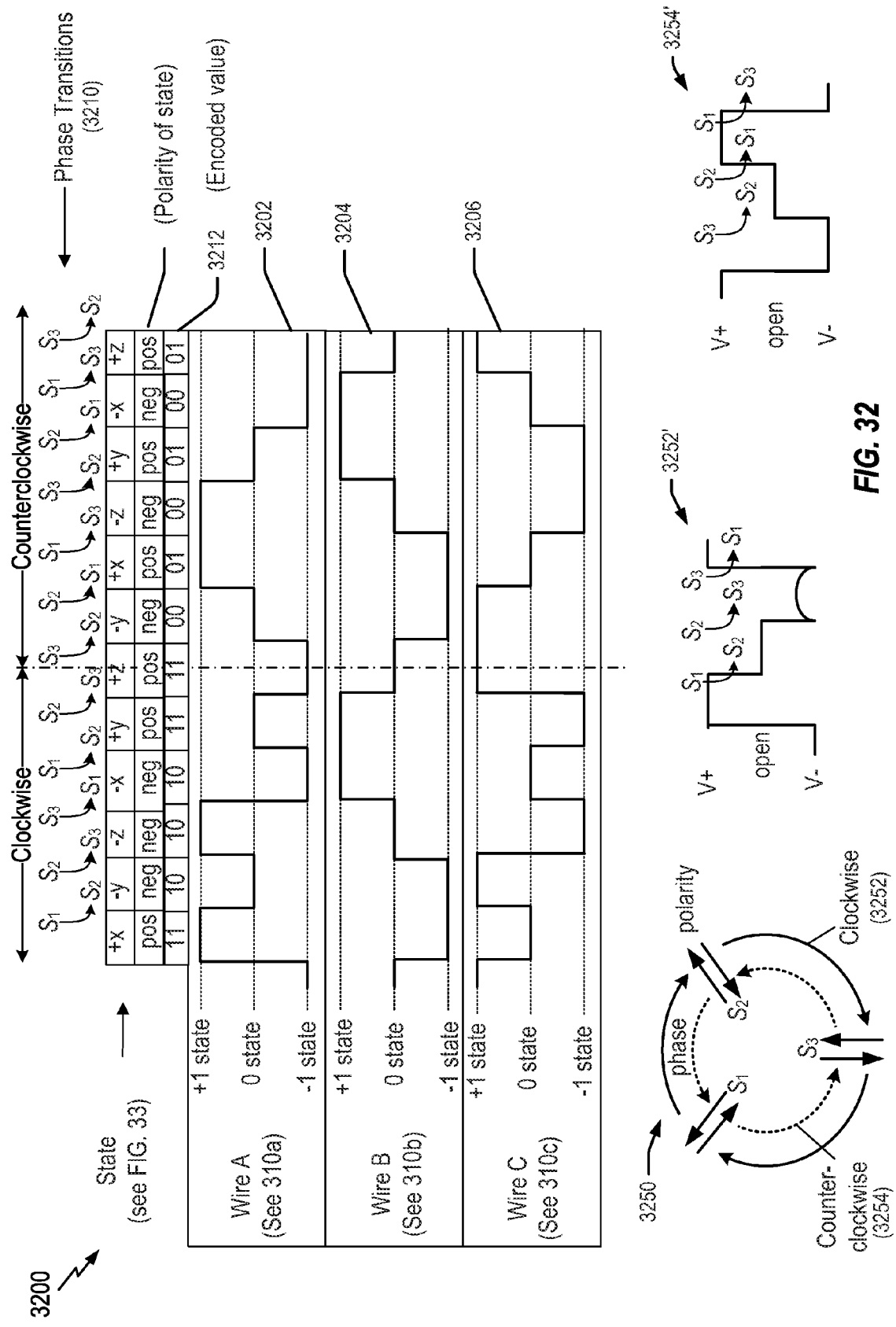
FIG. 32 is a diagram illustrating signaling in an N-Phase polarity encoded interface.

FIG. 32 illustrates an example of signaling 3200 employing a 3-Phase modulation data-encoding scheme based on the circular state transition diagram 3250. According to the data-encoding scheme, a 3-Phase signal may rotate in two directions and may be transmitted on three wires 3110a, 3110b and 3110c. Each of the three signals is independently driven on the wires 3110a, 3110b, 3110c. Each of the three signals includes the 3-Phase signal, with each signal on each wire 3110a, 3110b and 3110c being 120 degrees out of Phase relative to the signals on the other two wires 3110a, 3110b and 3110c. At any point in time, each of the three wires 3110a, 3110b, 3110c is in a different one of the states {+1, 0, −1}. At any point in time, each of the three wires 3110a, 3110b, 3110c in a 3-wire system is in a different state than the other two wires. When more than three wires are used, two or more pairs of wires may be in the same state. The illustrated encoding scheme also encodes information in the polarity of the two wires 3110a, 3110b and/or 3110c that are actively driven to the +1 and −1 states. Polarity is indicated at 3208 for the sequence of states depicted.

At any Phase state in the illustrated three-wire example, exactly two of the wires 3110a, 3110b, 3110c carry a signal which is effectively a differential signal for that Phase state, while the third wire 3110a, 3110b or 3110c is undriven. The Phase state for each wire 3110a, 3110b, 3110c may be determined by voltage difference between the wire 3110a, 3110b or 3110c and at least one other wire 3110a, 3110b and/or 3110c, or by the direction of current flow, or lack of current flow, in the wire 3110a, 3110b or 3110c. As shown in the state transition diagram 3250, three Phase states ($S_1$, $S_2$ and $S_3$) are defined. A signal may flow clockwise from Phase state $S_1$ to Phase state $S_2$, Phase state $S_2$ to Phase state $S_3$, and/or Phase state $S_3$ to Phase state $S_1$ and the signal may flow counter-clockwise from Phase state $S_1$ to Phase state $S_3$, Phase state $S_3$ to Phase state $S_2$, and/or Phase state $S_2$ to Phase state $S_1$. For other values of N, transitions between the N states may optionally be defined according to a corresponding state diagram to obtain circular rotation between state transitions.

In the example of a three-wire, 3-Phase communications link, clockwise rotations ($S_1$ to $S_2$), ($S_2$ to $S_3$), and/or ($S_3$ to $S_1$) at a state transition may be used to encode a logic 1, while counter-clockwise rotations ($S_1$ to $S_3$), ($S_3$ to $S_2$), and/or ($S_2$ to $S_1$) at the state transition may be used to encode a logic 0. Accordingly a bit may be encoded at each transition by controlling whether the signal is "rotating" clockwise or counter-clockwise. For example, a logic 1 may be encoded when the three wires 3110a, 3110b, 3110c transition from Phase state $S_1$ to Phase state $S_2$ and a logic 0 may be encoded when the three wires 3110a, 3110b, 3110c transition from Phase state $S_1$ to Phase state $S_3$. In the simple three-wire example depicted, direction of rotation may be easily determined based on which of the three wires 3110a, 3110b, 3110c is undriven before and after the transition.

Information may also be encoded in the polarity of the driven wires 3110a, 3110b, 3110c or direction of current flow between two wires 3110a, 3110b, 3110c. Signals 3202, 3204, and 3206 illustrate voltage levels applied to wires 3110a, 3110b, 3110c, respectively at each Phase state in a three-wire, 3-Phase link. At any time, a first wire 3110a, 3110b, 3110c is coupled to a positive voltage (+V, for example), a second wire 3110a, 3110b, 3110c is coupled to a negative voltage (−V, for example), while the third wire 3110a, 3110b, 3110c may be open-circuited or otherwise undriven. As such, one polarity encoding state may be determined by the current flow between the first and second wires 3110a, 3110b, 3110c or the voltage polarities of the first and second wires 3110a, 3110b, 3110c. In some embodiments, two bits of data may be encoded at each Phase transition 3210. A decoder may determine the direction of signal Phase rotation to obtain the first bit, and the second bit may be determined based on the polarity difference between two of the signals 3202, 3204 and 3206. The decoder having determined direction of rotation can determine the current Phase state and the polarity of the voltage applied between the two active wires 3110a, 3110b and/or 3110c, or the direction of current flow through the two active wires 3110a, 3110b and/or 3110c.

In the example of the three-wire, 3-Phase link described herein, one bit of data may be encoded in the rotation, or Phase change in the three-wire, 3-Phase link, and an additional bit may be encoded in the polarity of two driven wires. Certain embodiments, encode more than two bits in each transition of a three-wire, 3-Phase encoding system by allowing transition to any of the possible states from a current state. Given three rotational Phases and two polarities for each Phase, 6 states are defined, such that 5 states are available from any current state. Accordingly, there may be $\log_2(5) \cong 2.32$ bits per symbol (transition) and the mapper may accept a 16-bit word and convert it to 7 symbols.

Figure 33:
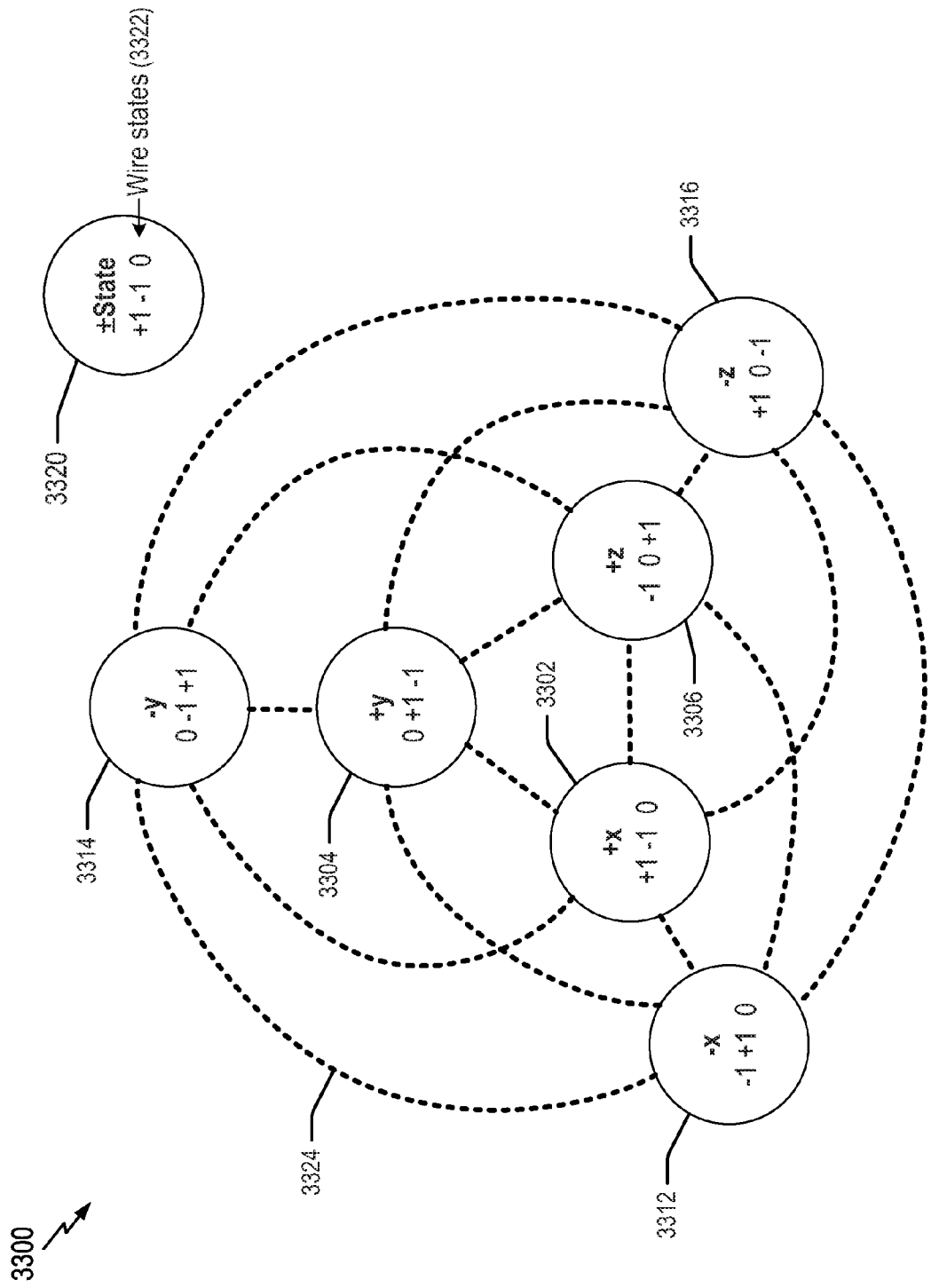
FIG. 33 is a state diagram illustrating state transitions in the example of a three-wire, three-Phase communication link.

FIG. 33 is a state diagram 3300 illustrating 6 states and 30 possible state transitions in the example of a 3-wire, 3-Phase communication link. FIG. 33 expands on the state transition diagram 3250 in FIG. 32 by depicting all possible states 3302, 3304, 3306, 3312, 3314 and 3316. These states 3302, 3304, 3306, 3312, 3314 and 3316 include positive polarity and negative polarity versions of the Phase states $S_1$, $S_2$ and $S_3$ illustrated in the Phase transition diagram 3250 of FIG. 32. For clarity, the set of Phase/polarity states are labeled alphabetically and includes {+x, −x, +y, −y, +z, −z} where, for example, +x and −x represent states with the same Phase state but different polarity. As shown in the model state element 3320, each state 3302, 3304, 3306, 3312, 3314 and 3316 in the state diagram 3300 includes a field 3322 showing the voltage state of signals 3202, 3204 and 3206, which are transmitted on wires 3110a, 3110b and 3110c, respectively. For example, in state 3302 (+x) signal 3202=+1, signal 3204=−1 and signal 3206=0. Also shown in FIG. 33 are the 5 possible transition paths between the states 3302, 3304, 3306, 3312, 3314 and 3316, including by way of example, the transition path 3324 between −x state 3312 and −y state 3314.

FIG. 34 is a block schematic drawing 3400 illustrating an example of a receiver in a 3-Phase PHY. Comparators 3402 and decoder 3404 are configured to provide a digital representation of the state of each of three transmission lines 3412a, 3412b and 3412c, as well as the change in the state of the three transmission lines compared to the state transmitted in the previous symbol period. As can be seen from the illustrated example, the voltage of each transmission line 3412a, 3412b or 3412c may be compared to the voltages of the other two transmission lines 3412a, 3412b and/or 3412c to determine the state of each transmission line 3412a, 3412b or 3412c, such that the occurrence of a transition may be detected and decoded by the decoder 3404 based on the outputs of the comparators 3402. Seven consecutive states are assembled by serial to parallel convertors 3406, which produce sets of 7 symbols to be processed by demapper 3408 to obtain 16 bits of data that may be buffered in the FIFO 3410.

Figure 35:
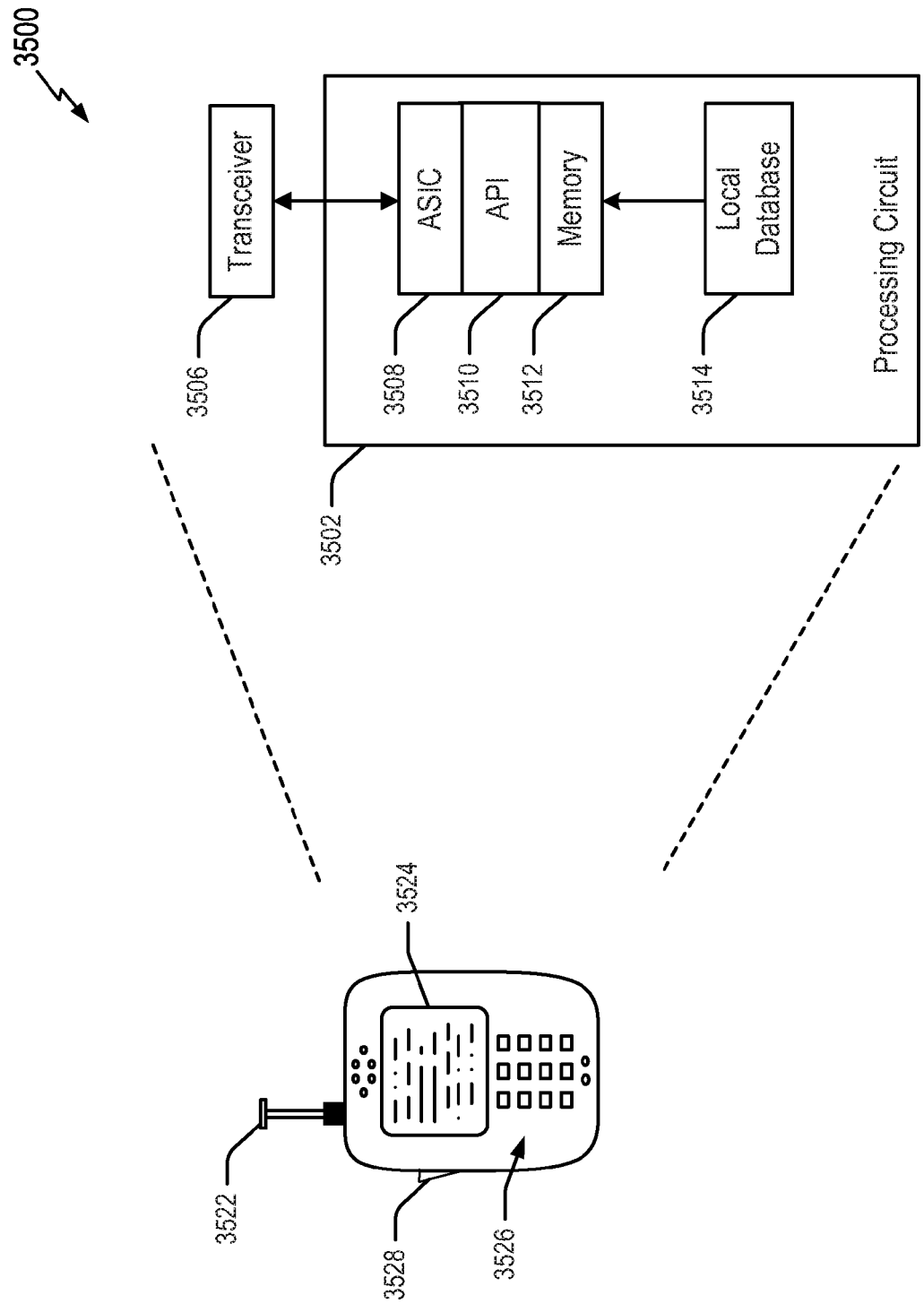
FIG. 35 is a diagram illustrating an apparatus that employs an N-Phase polarity encoded data link between devices within the apparatus in which one or more aspects of the disclosure may find application.

Certain aspects may be applicable to communications links deployed between electronic components, which may include subcomponents of devices such as telephones, mobile computing devices, appliances, automobile electronics, avionics systems, etc. Referring to FIG. 35, for example, an apparatus 3500 employing M-wire, N-Phase encoding may include a processing circuit 3502 that is configured to control operation of the apparatus 3500. The processing circuit 3502 may access and execute software applications and control logic circuits and other devices within the apparatus 3500. In one example, the apparatus 3500 may include a communication device that communicates through an RF communications transceiver 3506 with a radio access network (RAN), a core access network, the Internet and/or another network. The communications transceiver 3506 may be operably coupled to a processing circuit 3502. The processing circuit 3502 may include one or more IC devices, such as an application specific IC (ASIC) 3508. The ASIC 3508 may include one or more processing devices, logic circuits, and so on. The processing circuit 3502 may include and/or be coupled to processor readable storage 3512 that may maintain instructions and data may be executed by processing circuit 3502. The processing circuit 3502 may be controlled by one or more of an operating system and an application programming interface (API) 3510 layer that supports and enables execution of software modules residing in the storage 3512 of the device. The storage 3512 may include read-only memory (ROM) or random-access memory (RAM), electrically erasable programmable read-only memory (EEPROM), a flash memory device, or any memory device that can be used in processing systems and computing platforms. The processing circuit 3502 may include and/or access a local database 3514 that can maintain operational parameters and other information used to configure and operate the apparatus 3500. The local database 3514 may be implemented using one or more of a database module or server, flash memory, magnetic media, EEPROM, optical media, tape, soft or hard disk, or the like. The processing circuit may also be operably coupled to external devices such as an antenna 3522, a display 3524, operator controls, such as a button 3528 and a keypad 3526, among other components.

Figure 36:
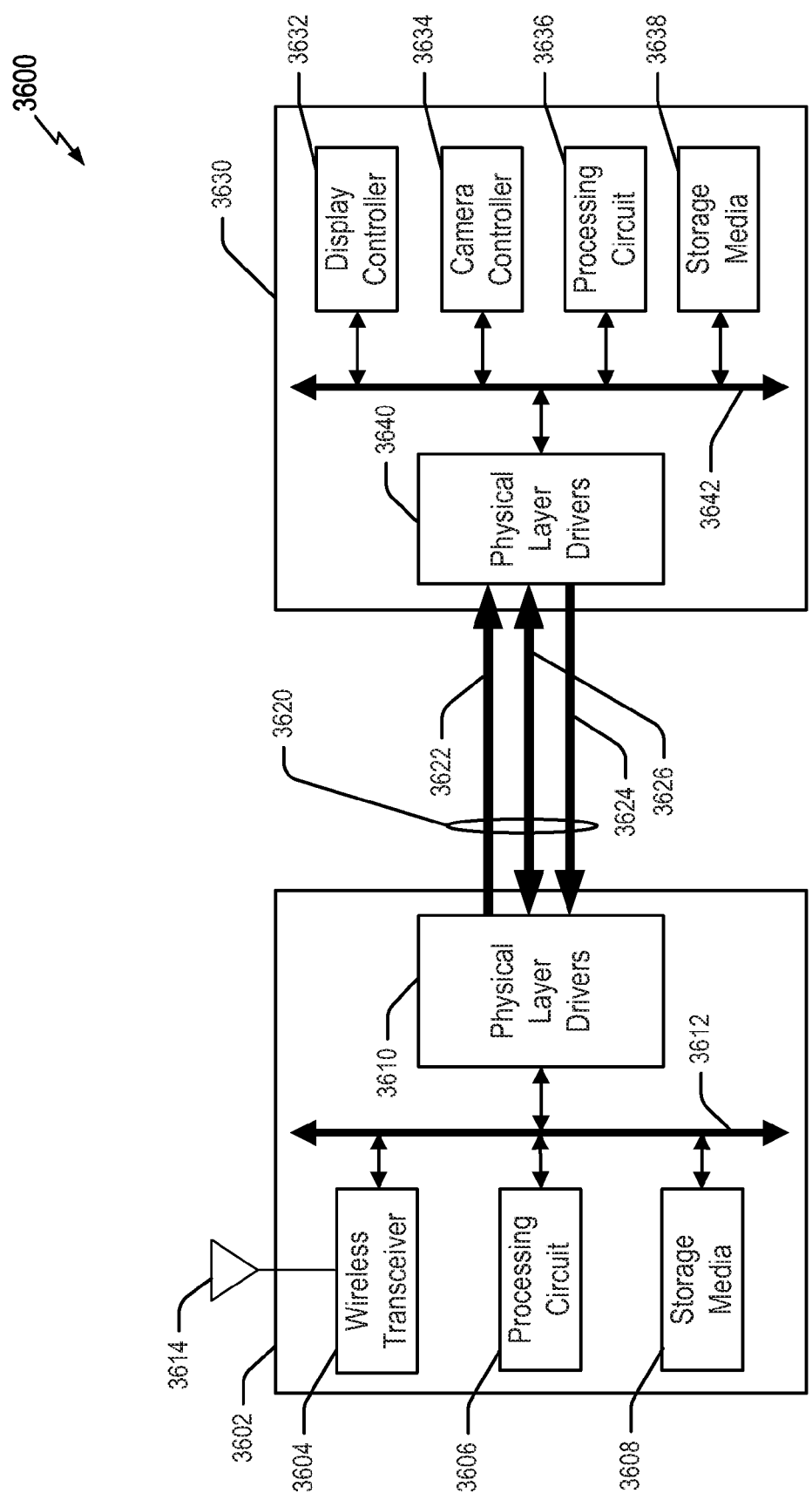
FIG. 36 is a block diagram illustrating a system architecture for an apparatus employing an N-Phase polarity encoded data link in which one or more aspects of the disclosure may find application.

FIG. 36 is a block schematic illustrating certain aspects of an apparatus 3600 such as a mobile device, a mobile telephone, a mobile computing system, a notebook computer, a tablet computing device, a media player, a gaming device, or the like. The apparatus 3600 may include a plurality of IC devices 3602 and 3630 that exchange data and control information through a communications link 3620. The communications link 3620 may be used to connect the IC devices 3602 and 3630, which may be located in close proximity to one another or physically located in different parts of the apparatus 3600. In one example, the communications link 3620 may be provided on a chip carrier, substrate or circuit board that carries the IC devices 3602 and 3630. In another example, a first IC device 3602 may be located in a keypad section of a flip-phone while a second IC device 3630 may be located in a display section of the flip-phone. A portion of the communications link 3620 may include a cable or an optical connection.

The communications link 3620 may include multiple channels 3622, 3624 and 3626. One or more channel 3626 may be bidirectional, and may operate in half-duplex mode and/or full-duplex mode. One or more channels 3622, 3624 may be unidirectional. The communications link 3620 may be asymmetrical, providing higher bandwidth in one direction. In one example described herein, a first communications channel 3622 may be referred to as a forward link 3622 while a second communications channel 3624 may be referred to as a reverse link 3624. The first IC device 3602 may be designated as a host, master and/or transmitter, while the second IC device 3630 may be designated as a client, slave and/or receiver, even if both IC devices 3602 and 3630 are configured to transmit and receive on the communications link 3620. In one example, the forward link 3622 may operate at a higher data rate when communicating data from a first IC device 3602 to a second IC device 3630, while the reverse link 3624 may operate at a lower data rate when communicating data from the second IC device 3630 to the first IC device 3602.

The IC devices 3602 and 3630 may each include a processor or other processing and/or computing circuit or device 3606, 3636. In one example, the first IC device 3602 may perform core functions of the apparatus 3600, including maintaining communications through a transceiver 3604 and an antenna 3614, while the second IC device 3630 may support a user interface that manages or operates a display controller 3632, and may control operations of a camera or video input device using a camera controller 3634. Other features supported by one or more of the IC devices 3602 and 3630 may include a keyboard, a voice-recognition component, and other input or output devices. The display controller 3632 may include circuits and software drivers that support a display such as a liquid crystal display (LCD) panel, a touch-screen display, an indicator and so on. The storage media 3608 and 3638 may include transitory and/or non-transitory storage devices adapted to maintain instructions and data used by the respective processing circuits 3606 and 3636, and/or other components of the IC devices 3602 and 3630. Communication between each processing circuit 3606, 3636 and its corresponding storage media 3608 and 3638 and other modules and circuits may be facilitated by one or more buses 3612 and 3642, respectively.

The reverse link 3624 may be operated in the same manner as the forward link 3622. The forward link 3622 and the reverse link 3624 may be capable of transmitting at comparable speeds or at different speeds, where speed may be expressed as a data transfer rate and/or a clocking rate. The forward and reverse data rates may be substantially the same or may differ by orders of magnitude, depending on the application. In some applications a single bidirectional link 3626 may support communications between the first IC device 3602 and the second IC device 3630. The forward link 3622 and/or the reverse link 3624 may be configurable to operate in a bidirectional mode when, for example, the forward and reverse links 3622 and 3624 share the same physical connections and operate in a half-duplex manner.

In certain examples, the reverse link 3624 derives a clocking signal from the forward link 3622 for synchronization purposes, for control purposes, to facilitate power management and/or for simplicity of design. The clocking signal may have a frequency that is obtained by dividing the frequency of a symbol clock used to transmit signals on the forward link 3622. The symbol clock may be superimposed or otherwise encoded in symbols transmitted on the forward link 3622. The use of a clocking signal that is a derivative of the symbol clock allows fast synchronization of transmitters and receivers (transceivers 3610, 3640) and enables fast start and stop of data signals without the need for framing to enable training and synchronization.

In certain examples, a single bidirectional link 3626 may support communications between first processing device 3602 and the second processing device 3630. In some instances, the first processing device 3602 and the second processing device 3630 provide encoding and decoding of data, address and control signals transmitted between a processing device and memory devices such as dynamic random access memory (DRAM).

In one example, one or more of buses 3612 and/or 3642 may provide access to double data rate (DDR) SDRAM using M-wire, N-Phase encoding technique. N-Phase polarity encoding devices 3610 and/or 3640 can encode multiple bits per transition, and multiple sets of wires can be used to transmit and receive data from the SDRAM, control signals, address signals, and so on.

In another example, the communication link 3620 includes a high-speed digital interface, such as a mobile display digital interface (MDDI), and one or more data links 3622, 3624 and 3626 may use N-Phase polarity encoding. Transceivers 3610 and 3640 may encode and decode data transmitted on the communications link 3620. The use of N-Phase polarity encoding provides for high speed data transfer and may consume half or less of the power of other interfaces because fewer drivers are active in N-Phase polarity encoded data links 3620. N-Phase polarity encoding devices 3610 and/or 3640 can encode multiple bits per transition on the interface, which may include a bus. In one example, a combination of 3-Phase and polarity encoding may be used to support a wide video graphics array (WVGA) 80 frames per second LCD driver IC without a frame buffer, delivering pixel data at 810 Mbps for display refresh.

According to certain aspects disclosed herein, characteristics of an M-wire, N-Phase polarity communications link may be dynamically modified to accommodate changing operational requirements and circumstances. For example, the number of wires used to transmit an N-Phase signal may be increased to obtain a higher available bandwidth and/or the number of wires used to transmit an N-Phase signal may be decreased to reduce power consumption by the IC devices 3602 and 3630. The number of wires used to transmit an N-Phase signal in one direction may be adapted independently of the number of wires used to transmit an N-Phase signal in the other direction. Receiving circuits and transmitting circuits in the physical layer drivers 3610 and 3640 may be configured using control information transmitted when the communications link 3620 is activated after hibernation or power-on. The control information may be transmitted according to a predefined protocol, whereby a minimum number of wires are activated to carry a control message specifying the configuration of the communications link 3620, for example. The control message may alternatively or additionally be transmitted with a shutdown command, a wakeup command, and/or in a preamble preceding each transmission. In some examples, the configuration of the communications link 3620 may be determined during a training and/or synchronization sequence, whereby the receiving physical layer drivers 3610 or 3640 monitors the available wires or other conductors for transitions corresponding to an N-Phase signal, in order to determine which wires are active.

Figure 37:
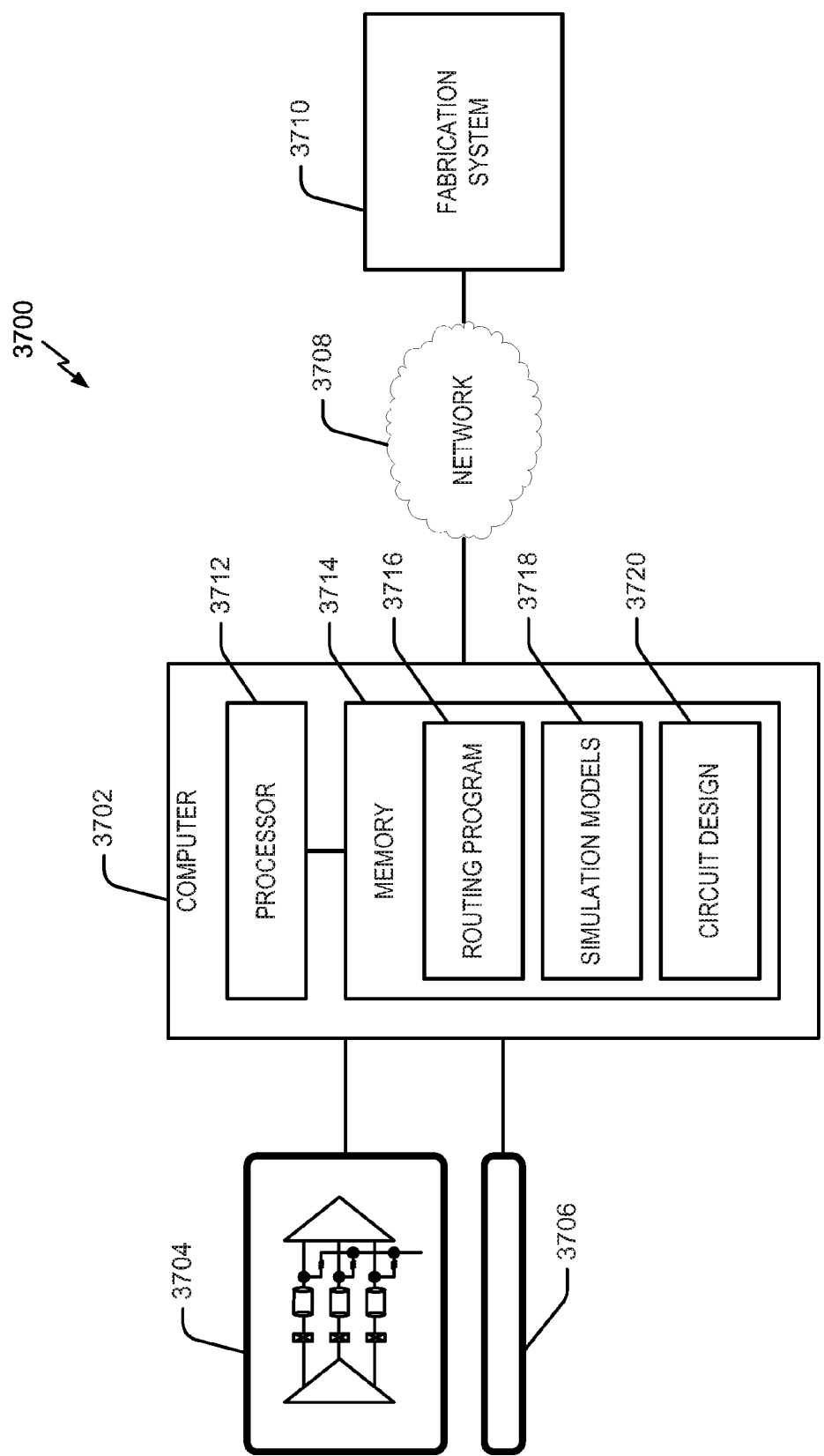
FIG. 37 is a block diagram illustrating an example of a circuit design system in which one or more aspects of the disclosure may find application.

FIG. 37 illustrates an example of a circuit design system 3700 in which one or more aspects of the disclosure may find application. The system 3700 includes a computer 3702 (e.g., a workstation) communicatively coupled to a user display device 3704 and user input devices 3706. The computer 3702 is also communicatively coupled to a network 3708 to enable design data generated by the computer 3702 to be transferred to a fabrication system 3710 that manufactures PCBs, ICs, or the like.

The computer 3702 includes a processor 3712 and a memory 3714. The processor 3712 may be any suitable type of processing unit, such as a central processing unit (CPU), a co-processor, an arithmetic processing unit, a graphics processing unit (GPU), a digital signal processor (DSP), etc. The memory 3714 may include any suitable type of memory technology such a RAM, ROM, FLASH, disk drives, and the like.

A routing program 3716 and simulation models 3718 stored in the memory 3714 and/or implemented by the processor 3712 enable a user to generate circuit designs in accordance with the teachings herein. For example, a user may use the display device 3704 and the user input devices to position circuit components on at least one substrate (e.g., of an IC or a PCB), route wires between the circuit components, and add delay as taught herein. The user may then send a circuit design 3720 to the fabrication system 3710 to produce the desired circuit component.

Exemplary Device and Method for Multi-Wire Signaling

Figure 38:
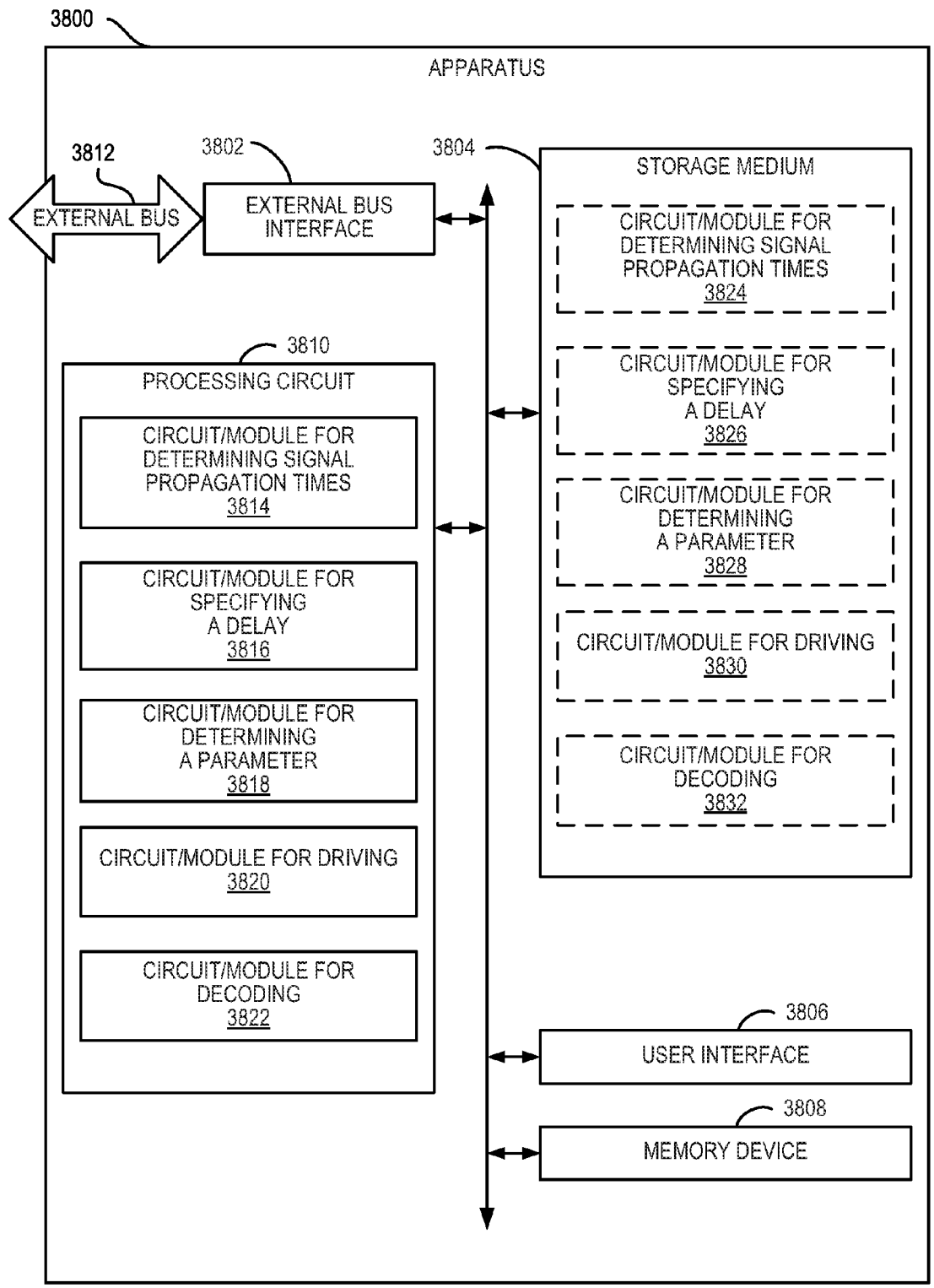
FIG. 38 is a block diagram illustrating select components of an apparatus configured to provide functionality in accordance with some aspects of the disclosure.

Turning now to FIG. 38, a block diagram is shown illustrating select components of an apparatus 3800 according to at least one example of the disclosure. The apparatus 3800 includes an external bus interface 3802, a storage medium 3804, a user interface 3806, a memory device 3808, and a processing circuit 3810. The processing circuit is coupled to or placed in electrical communication with each of the external bus interface 3802, the storage medium 3804, the user interface 3806, and the memory device 3808.

The external bus interface 3802 provides an interface for the components of the apparatus 3800 to an external bus 3812. The external bus interface 3802 may include, for example, one or more of: signal driver circuits, signal receiver circuits, amplifiers, signal filters, signal buffers, or other circuitry used to interface with a signaling bus or other types of signaling media.

The processing circuit 3810 is arranged to obtain, process and/or send data, control data access and storage, issue commands, and control other desired operations. The processing circuit 3810 may include circuitry adapted to implement desired programming provided by appropriate media in at least one example. In some instances, the processing circuit 3810 may include circuitry adapted to perform a desired function, with or without implementing programming. By way of example, the processing circuit 3810 may be implemented as one or more processors, one or more controllers, and/or other structure configured to execute executable programming and/or perform a desired function. Examples of the processing circuit 3810 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 3810 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 3810 are for illustration and other suitable configurations within the scope of the disclosure are also contemplated.

The processing circuit 3810 is adapted for processing, including the execution of programming, which may be stored on the storage medium 3804. As used herein, the terms "programming" or "instructions" shall be construed broadly to include without limitation instruction sets, instructions, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 3810 may include one or more of: a circuit/module for determining signal propagation times 3814, a circuit/module for specifying a delay 3816, a circuit/module for determining a parameter 3818, a circuit/module for driving 3820, or a circuit/module for decoding 3822.

The circuit/module for determining signal propagation times 3814 may include circuitry and/or programming (e.g., a circuit/module for determining signal propagation times 3824 stored on the storage medium 3804) adapted to collect information about signal propagation times. For example, in some implementations, the information is retrieved from the memory device 3808 or collected by activating a process that estimates or measures signal propagation times. An indication of the signal propagation times is then output (e.g., stored in the memory device 3808 or passed to another component).

The circuit/module for specifying a delay 3816 may include circuitry and/or programming (e.g., a circuit/module for specifying a delay 3826 stored on the storage medium 3804) adapted to acquire information used to specify a delay. For example, in some implementations, the information is retrieved from the memory device 3808 (e.g., the memory device 1110 of FIG. 11) or from an active process (e.g., the active operations 1114 of FIG. 11). A delay value is then determined based on the information (e.g., as discussed above in conjunction for the delay controller 1102 of FIG. 11). An indication of the delay is then output (e.g., stored in the memory device 3808 or passed to another component).

The circuit/module for determining a parameter 3818 may include circuitry and/or programming (e.g., a circuit/module for determining a parameter 3828 stored on the storage medium 3804) adapted to acquire parameter information. For example, in some implementations, the information is retrieved from the memory device 3808 (e.g., the memory device 1110 of FIG. 11) or from an active process (e.g., the active operations 1114 of FIG. 11).

The circuit/module for driving 3820 may include circuitry and/or programming (e.g., a circuit/module for driving 3830 stored on the storage medium 3804) adapted to cause data to be driven onto a multi-wire channel. For example, in some implementations, information to be sent over a channel is obtained, and the information is sent to a driver circuit.

The circuit/module for decoding 3822 may include circuitry and/or programming (e.g., a circuit/module for decoding 3832 stored on the storage medium 3804) adapted to decode information received via a multi-wire channel. For example, in some implementations, received information is decoded by comparing the signal received on different wires (e.g., as in FIG. 27).

The storage medium 3804 may represent one or more processor-readable devices for storing programming, electronic data, databases, or other digital information. The storage medium 3804 may also be used for storing data that is manipulated by the processing circuit 3810 when executing programming. The storage medium 3804 may be any available media that can be accessed by the processing circuit 3810, including portable or fixed storage devices, optical storage devices, and various other mediums capable of storing, containing and/or carrying programming. By way of example and not limitation, the storage medium 3804 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof. Thus, in some implementations, the storage medium may be a non-transitory (e.g., tangible) storage medium.

The storage medium 3804 may be coupled to the processing circuit 3810 such that the processing circuit 3810 can read information from, and write information to, the storage medium 3804. That is, the storage medium 3804 can be coupled to the processing circuit 3810 so that the storage medium 3804 is at least accessible by the processing circuit 3810, including examples where the storage medium 3804 is integral to the processing circuit 3810 and/or examples where the storage medium 3804 is separate from the processing circuit 3810.

Programming stored by the storage medium 3804, when executed by the processing circuit 3810, causes the processing circuit 3810 to perform one or more of the various functions and/or process steps described herein. For example, the storage medium 3804 may include one or more of: the circuit/module for determining signal propagation times 3824, the circuit/module for specifying a delay 3826, the circuit/module for determining a parameter 3828, the circuit/module for driving 3830, or the circuit/module for decoding 3832. Thus, according to one or more aspects of the disclosure, the processing circuit 3810 is adapted to perform (in conjunction with the storage medium 3804) any or all of the processes, functions, steps and/or routines for any or all of the apparatuses described herein. As used herein, the term "adapted" in relation to the processing circuit 3810 may refer to the processing circuit 3810 being one or more of configured, employed, implemented, and/or programmed (in conjunction with the storage medium 3804) to perform a particular process, function, step and/or routine according to various features described herein.

The memory device 3808 may represent one or more memory devices and may comprise any of the memory technologies listed above or any other suitable memory technology. The memory device 3808 may store delay-related information, along with other information used by one or more of the components of the apparatus 3800. The memory device 3808 also may be used for storing data that is manipulated by the processing circuit 3810 or some other component of the apparatus 3800. In some implementations, the memory device 3808 and the storage medium 3804 are implemented as a common memory component.

The user interface 3806 includes functionality that enables a user to interact with the apparatus 3800. For example, the user interface 3806 may interface with one or more user output devices (e.g., a display device, etc.) and one or more user input devices (e.g., a keyboard, a tactile input device, etc.).

With the above in mind, examples of operations relating to multi-wire signaling according to the disclosure will be described in more detail in conjunction with the flowcharts of FIGS. 39-42. For convenience, the operations of FIGS. 39-42 (or any other operations discussed or taught herein) may be described as being performed by specific components. It should be appreciated, however, that in various implementations these operations may be performed by other types of components and may be performed using a different number of components. It also should be appreciated that one or more of the operations described herein may not be employed in a given implementation.

Figure 39:
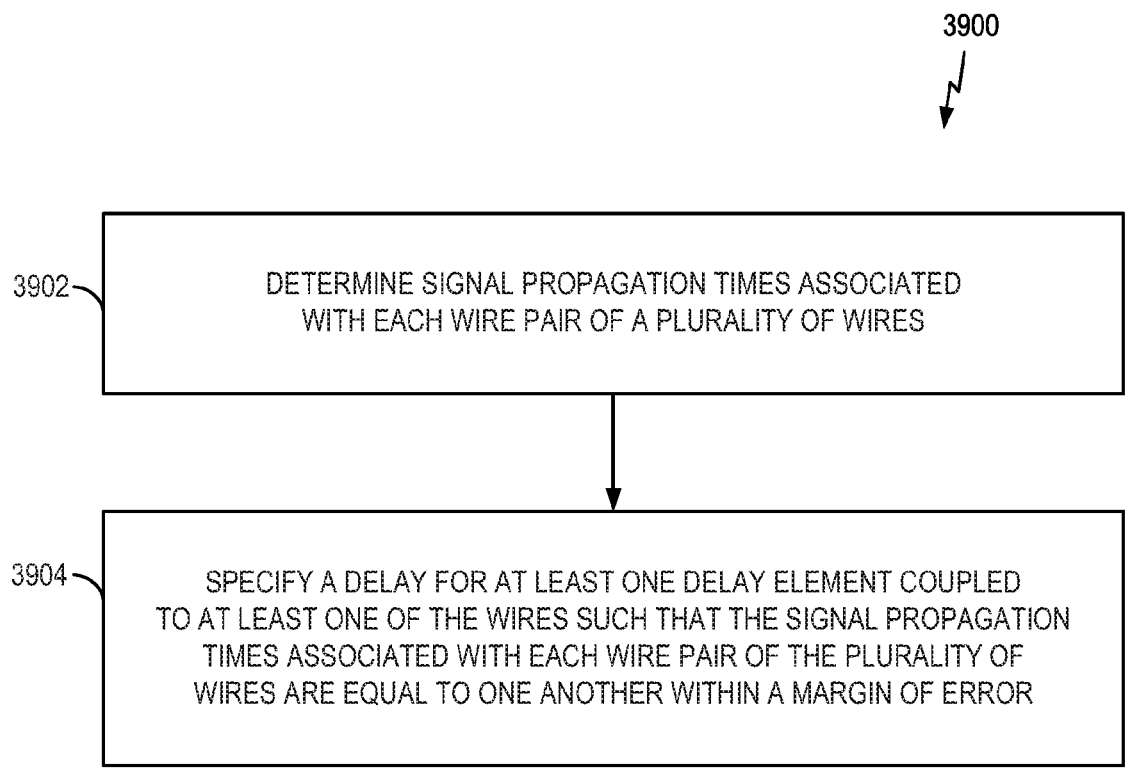
FIG. 39 is a flowchart illustrating a delay specification method in accordance with some aspects of the disclosure.

FIG. 39 illustrates a process 3900 for specifying a delay in accordance with some aspects of the disclosure. In various aspects within the scope of the disclosure, the process 3900 may be implemented by any suitable apparatus capable of supporting delay specification operations.

In some implementations, the process 3900 takes place within a processing system (e.g., the processing circuit 3810 of FIG. 38), which may be located in a communication device or some other suitable apparatus. For example, a delay controller associated with a multi-wire channel can perform the process 3900 to dynamically adjust the delay imparted on a wire of a multi-wire channel and thereby control the signal propagation times of wire pairs of the multi-wire channel.

In other implementations, the process 3900 takes place within a circuit design system (e.g., the circuit design system 3700 illustrated in FIG. 37). For example, the wires of a multi-wire channel can be designed and manufactured to have certain signal propagation times under certain operating conditions. Thus, the delay imparted on a wire of a multi-wire channel can be specified during the design process and thereby control the signal propagation times of wire pairs of the multi-wire channel during subsequent operation.

At block 3902, the signal propagation times associated with each wire pair of a plurality of wire pairs is determined. The manner in which this determination is made may depend in some aspects on whether the process is performed during a manufacturing process or subsequent to the manufacturing process.

During the manufacturing process, a simulation tool can be used to estimate the signal propagation times of each unique differential pair for a multi-wire channel that has been created using a circuit design tool. Such a simulation tool can take various parameters into account such as, without limitation, signal frequency, signal rise times, signal fall times, dielectric constant (Er) of a substrate, distance of a wire to a ground plane, wire path discontinuities, wire width, and wire thickness.

Subsequent to the manufacturing process, a delay controller or other similar component can determine (e.g., measure) signal propagation times associated with the wires of a multi-wire channel under actual operating conditions. For example, a transmitter can send data to a receiver over the wires and the receiver can loop the data back to the transmitter. Based on the corresponding round-trip time (and, if applicable, known delays at the receiver), the transmitter can determine the signal propagation time over a given wire. As another example, a transmitter can send known data patterns to a receiver over the wires. The receiver can then determine (e.g., by sampling the received signal at a relatively high rate) whether certain wires have a longer signal propagation time than other wires.

At block 3904, a delay is specified for at least one delay element coupled to at least one of the wires such that the signal propagation times associated with each wire pair of the plurality of wires are equal to one another within a margin of error. In some implementations where the plurality of wires consists of three wires and three wire pairs, the at least one delay element consists of a delay element coupled to a middle wire of the three wires. As discussed herein, however, a delay element can be placed in various locations along a multi-wire bus and different numbers of delay elements can be used in different implementations.

A delay to be imparted on a given wire can be specified (e.g., selected) according to the signal propagations times of the other wires (as determined at block 3902). For example, using signal characterization techniques, the signal propagation time for a given differential pair can be determined based on signal propagation times (or associated characteristic impedance) of the individual wires. Accordingly, the value of a delay to be added to a given wire to ensure that all wire pairs have the substantially the same signal propagation times can be determined.

In practice, the signal propagation times for the different wire pair might not be precisely equal. Rather, the delay may be specified such that the signal propagation times for the different wire pair are all within a defined margin of error. Such a margin of error may be defined in different ways in different implementations. For example, in some implementations, the margin of error is defined as a percentage (e.g., 1%, 2%, and so on). Thus, in this case, the delay(s) may be specified such that the signal propagation times of the different wire pairs all fall within a defined percentage of one another. As another example, in some implementations, the margin of error is defined as a discrete time (e.g., 1 ps, 2 ps, and so on). Thus, in this case, the delay(s) may be specified such that the signal propagation times of the different wire pairs all fall within a defined time range.

In some implementations, the specification of the delay involves controlling a delay element. For example, in implementations where each delay element has a programmable delay, the specification of the delay involves controlling the programmable delay of each delay element.

In some implementations, the specification of the delay comprises specifying a physical characteristic of each delay element. For example, a length of a wire segment can be specified such that the resulting delay imparted on the wire ensures that all wire pairs of a corresponding multi-wire channel have the substantially the same signal propagation times Accordingly, during some implementations of a circuit design process, the specification of the delay involves generating a circuit description representative of the physical characteristic. For example, a design tool can specify one of more of the length, thickness, or width of a wire.

During some implementations of a manufacturing process, the specification of the delay involves generating a circuit (e.g., on a PCB or an IC die) embodying the physical characteristic. For example, a fabrication system can generate a circuit having a wire that has one of more of a specified length, thickness, or width.

Figure 40:
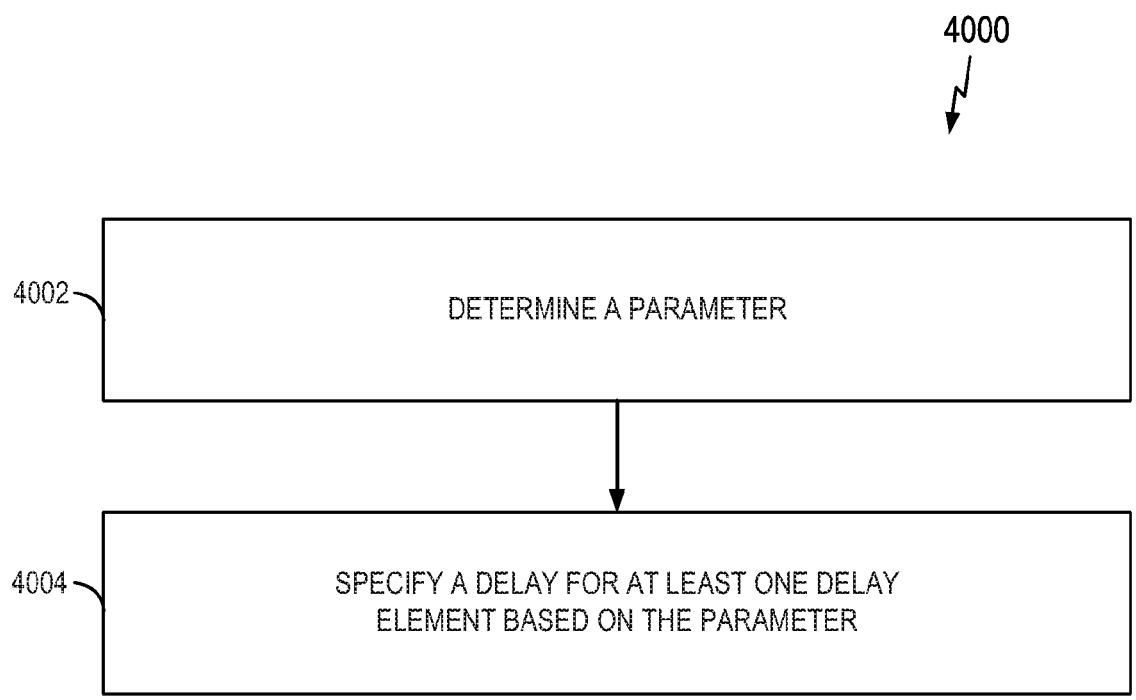
FIG. 40 is a flowchart illustrating a delay specification method in accordance with some aspects of the disclosure.

FIG. 40 illustrates a process 4000 for specifying a delay in accordance with some additional aspects of the disclosure. The process 4000 may take place within a processing circuit 3810 (FIG. 38), which may be located in a communication device or some other suitable apparatus. For example, a delay controller associated with a multi-wire channel can perform the process 4000 in conjunction with the process 3900 of FIG. 39. Of course, in various aspects within the scope of the disclosure, the process 4000 may be implemented by any suitable apparatus capable of supporting delay specification operations.

At block 4002, a parameter is determined. For example, a parameter may be retrieved from memory or generated during an active process (e.g., a parameter measurement process). The parameter may take different forms in different implementations. In some implementations, the parameter is at least one of: lengths of the wires, signal propagation times associated with the wire pairs, a signal frequency of signals carried by the wires, an application for which signals are transmitted over the wires, or a process, voltage, and temperature (PVT) condition.

At block 4004, a delay for at least one delay element is specified based on the parameter determined at block 4002. For example, using signal characterization techniques, the signal propagation time for a given differential pair can be determined based on the parameter (e.g., by deriving signal propagation times or associated characteristic impedance of the individual wires based at least in part on the parameter). Accordingly, the value of a delay to be added to a given wire to ensure that all wire pairs have the substantially the same signal propagation times can be determined.

Figure 41:
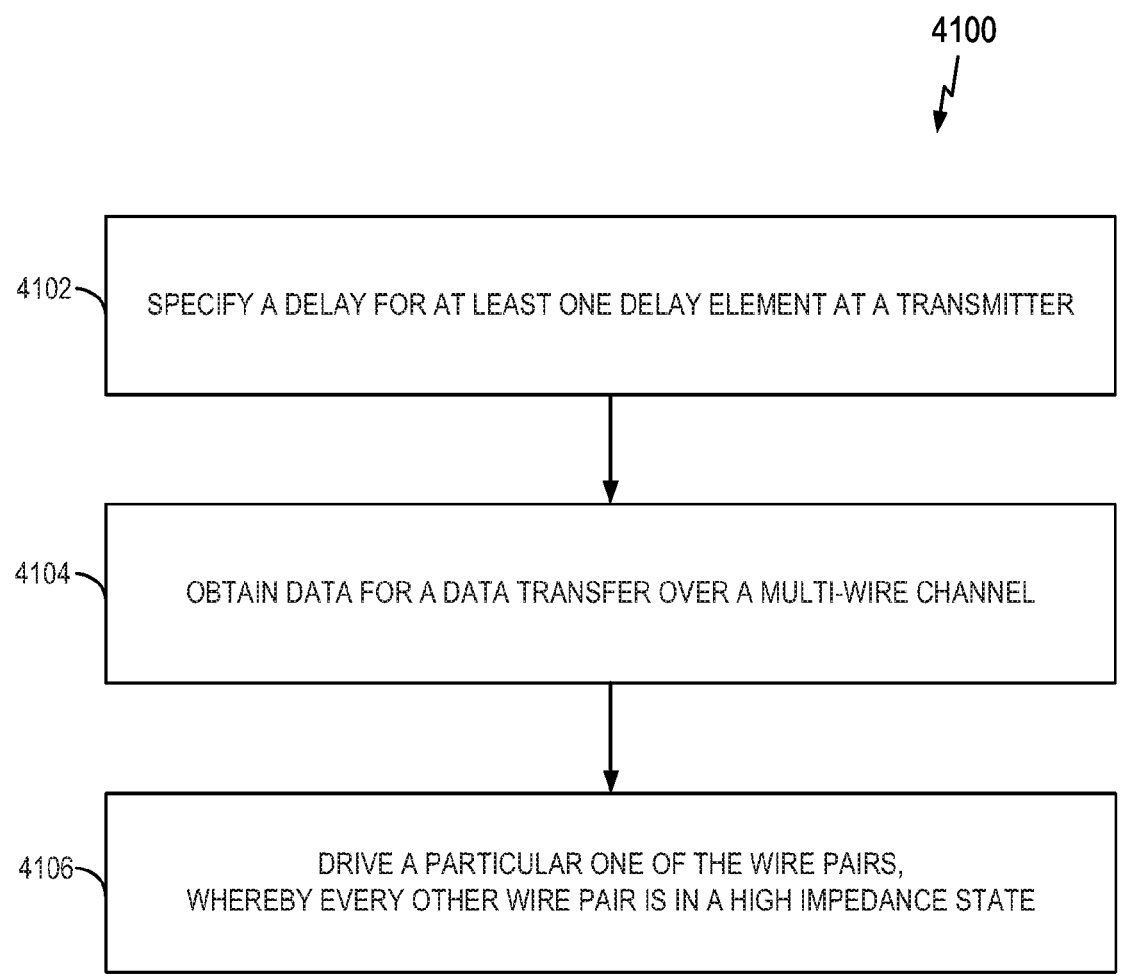
FIG. 41 is a flowchart illustrating a method for driving a multi-wire channel in accordance with some aspects of the disclosure.

FIG. 41 illustrates a process 4100 for driving a multi-wire channel in accordance with some aspects of the disclosure. The process 4100 may take place within a processing circuit 3810 (FIG. 38), which may be located in a communication device or some other suitable apparatus. In particular, the process 4100 can be performed by an apparatus that transmits data over a multi-wire channel. Of course, in various aspects within the scope of the disclosure, the process 4100 may be implemented by any suitable apparatus capable of supporting multi-wire operations.

At block 4102, a delay is specified for at least one delay element at a transmitter. In some implementations, the operations of block 4102 employ the process 3900 and/or the process 4000.

At block 4104, data is obtained for a data transfer over a multi-wire channel. For example, a transmitter can receive data from another component of a system such as a processing system, a memory device, an RF receiver, or some other component.

As used herein, the term data refers broadly to any type of information that can be communicated. Thus, data can include, without limitation, control information, application data (e.g., user data), commands, addresses, and so on.

Typically, a given data transfer involves transmitting a defined set of data during a clock cycle or in conjunction with a transition of a clock signal. For example, one or more symbols or bits can be transmitted with each clock transition in a dual data rate implementation of a multi-wire channel.

At block 4106, for a particular data transfer, a particular one of the wire pairs of the wires of the multi-wire channel is driven, whereby every other wire pair is in a high impedance state. For example, as illustrated in FIGS. 31 and 34, for a three-wire channel, two of the wires are driven and the third wire is left floating. In a four-wire channel, two of the wires are driven and the other two wires are left floating (open).

Figure 42:
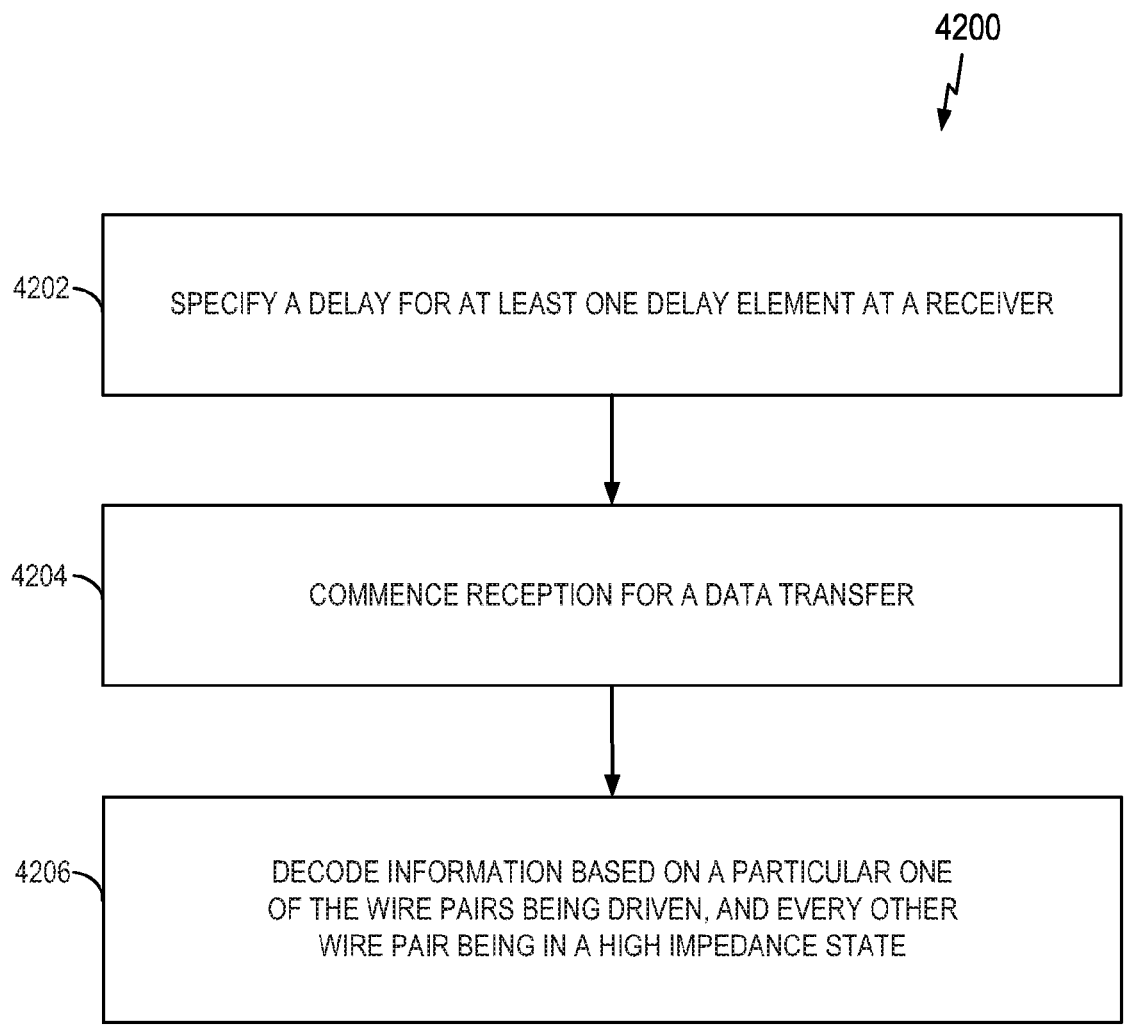
FIG. 42 is a flowchart illustrating a method for decoding multi-wire channel data in accordance with some aspects of the disclosure.

FIG. 42 illustrates a process 4200 for receiving data via a multi-wire channel in accordance with some aspects of the disclosure. The process 4200 may take place within a processing circuit 3810 (FIG. 38), which may be located in a communication device or some other suitable apparatus. In particular, the process 4200 can be performed by an apparatus that receives data over a multi-wire channel. Of course, in various aspects within the scope of the disclosure, the process 4200 may be implemented by any suitable apparatus capable of supporting multi-wire operations.

At block 4202, a delay is specified for at least one delay element at a transmitter. In some implementations, the operations of block 4202 employ the process 3900 and/or the process 4000.

At block 4204, reception for a data transfer is commenced. For example, in some implementations, a receiver receives a "write data" command from a transmitter and commences clocking in the data from the multi-wire channel. As another example, in some implementations, the receiver always receives on certain clocks cycles.

Again, as used herein, the term data refers broadly to any type of information that can be communicated. Thus, the data transfer of block 4204 can include, without limitation, receiving control information, application data (e.g., user data), commands, addresses, and so on.

At block 4206, the information received for the data transfer is decoded. Here, the information is decoded based on a particular one of the wire pairs of the plurality of wires being driven, and every other wire of the plurality of wires being in a high impedance state. For example, in some implementations, a receiver decodes information according to the mapping illustrated in FIG. 34 and/or the states illustrated in FIG. 35. A receiver can employ other types of decoding in other implementations.

Further Exemplary Description of Multi-Wire Signaling

As mentioned above, it is generally desirable to reduce the amount of jitter present in a communication system. By reducing jitter, timing margins for the system can be improved since symbols can be sampled over a wider window of time when jitter is low as opposed to when jitter is high. In a multi-wire signaling system, jitter may be reduced or mitigated by ensuring that each unique wire pair of n-wires in an n-wire channel has approximately the same signal propagation time within a threshold margin (e.g., within a margin of error).

In some aspects of the disclosure, this is achieved by reducing the delay of at least one of the wires. For example, in a three-wire system, jitter can be reduced by decreasing the length of, or facilitating negative delay on, the center wire of the three wires. Thus, to make the signal propagation time of each wire pair approximately equal (e.g., the propagation delay is the same for the wire pairs A-B, B-C, and A-C), the signal propagation time of the individual wires is made unequal (e.g., by reducing the delay of one of more of the individual wires).

Figure 43:
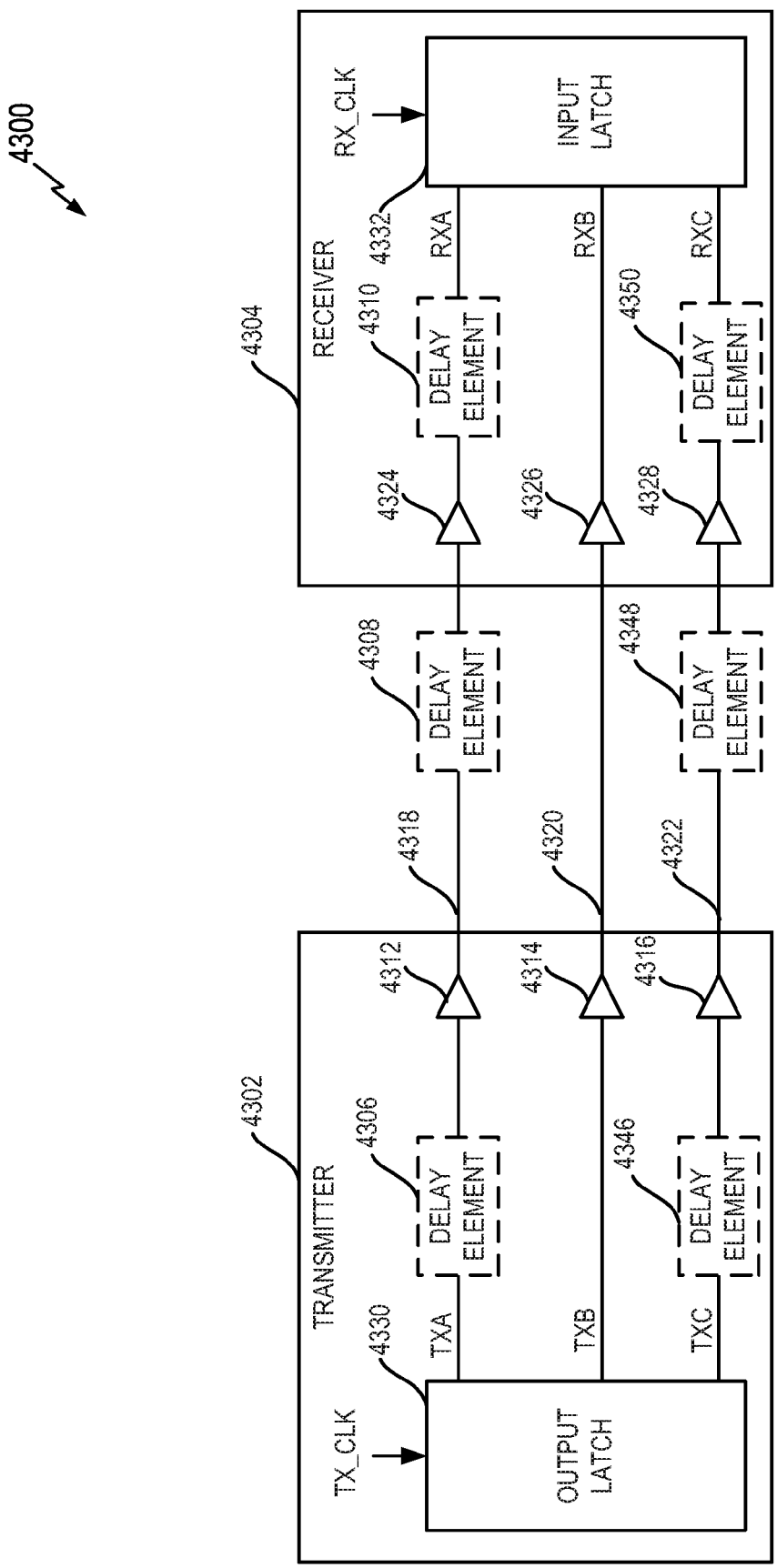
FIG. 43 is a block diagram illustrating another example of a delay element for a three-wire channel in accordance with some aspects of the disclosure.

In general, the length (or delay) of a center wire may be decreased by adding delay anywhere along an outer wire neighboring the center wire to achieve the desired balancing of the signal propagation times between wire pairs. For example, FIG. 43 illustrates a communication system 4300 including a three-wire transmitter 4302 and a three-wire receiver 4304 where a first delay element 4306 can be incorporated into the transmitter 4302, a second delay element 4308 can be incorporated into the communication medium between the transmitter 4302 and the receiver 4304, or a third delay element 4310 can be incorporated into the receiver 4304. Moreover, a fourth delay element 4346 can incorporated into the transmitter 4302, a fifth delay element 4348 can be incorporated into the communication medium between the transmitter 4302 and the receiver 4304, or a sixth delay element 4350 can be incorporated into the receiver 4304. Here, the dashed boxes for the first delay element 4306 through the third delay element 4310 and for the fourth delay element 4346 through the sixth delay element 4350 represent that each delay element is optional. That is, one or more of the first delay element 4306 through the third delay element 4310 and the fourth delay element 4346 through the sixth delay element 4350 could be used in a given implementation.

In FIG. 43, the three wires driven by the transmitter 4302 are designated as an outer top wire TXA, a center wire TXB, and an outer bottom wire TXC (e.g., corresponding to the wires A, B, and C, of FIG. 2). Similarly, the three wires over which signals are received by the receiver 4304 are designated as an outer top wire RXA, a center wire RXB, and an outer bottom wire RXC (e.g., again corresponding to the wires A, B, and C, of FIG. 2).

In implementations that employ the first delay element 4306, signals carried by the outer top wire TXA are delayed by the delay element 4306. The delayed signal carried by the outer top wire TXA, the signal carried by the center wire TXB, and the signal carried by the outer bottom wire TXC are coupled to a first driver 4312, a second driver 4314, and a third driver 4316, respectively, that drive a first wire 4318, a second wire 4320, and a third wire 4322 of an external bus.

In implementations that employ the fourth delay element 4346, signals carried by the outer bottom wire TXC are delayed by the delay element 4346. The signal carried by the outer top wire TXA, the signal carried by the center wire TXB, and the delayed signal carried by the outer bottom wire TXC are coupled to the first driver 4312, the second driver 4314, and the third driver 4316, respectively, that drive the first wire 4318, the second wire 4320, and the third wire 4322 of the external bus.

In implementations that employ the second delay element 4308, signals carried by the first wire 4318 are delayed by the delay element 4308. The delayed signal carried by the first wire 4318, the signal carried by the second wire 4320, and the signal carried by the third wire 4322 are coupled to a first receiver circuit 4324, a second receiver circuit 4326, and a third receiver circuit 4328, respectively, of the receiver 4304.

In implementations that employ the fifth delay element 4348, signals carried by the third wire 4322 are delayed by the delay element 4348. The signal carried by the first wire 4318, the signal carried by the second wire 4320, and the delayed signal carried by the third wire 4322 are coupled to the first receiver circuit 4324, the second receiver circuit 4326, and the third receiver circuit 4328, respectively, of the receiver 4304.

In implementations that employ the third delay element 4310, signals output by the first receiver circuit 4324 are delayed by the delay element 4310. Thus, the delayed signal driven by the first receiver circuit 4324, the signal driven by the second receiver circuit 4326, and the signal driven by the third receiver circuit 4328 are coupled to an input latch 4332 of the receiver 4304.

In implementations that employ the sixth delay element 4350, signals output by the third receiver circuit 4328 are delayed by the delay element 4350. Thus, the signal driven by the first receiver circuit 4324, the signal driven by the second receiver circuit 4326, and the delayed signal driven by the third receiver circuit 4328 are coupled to an input latch 4332 of the receiver 4304.

In the example of FIG. 43, the signal propagation time of interest for a given wire corresponds to the time that a signal on the wire is clocked out of an output latch 4330 at the transmitter 4302 (according to a transmit clock TX_CLK) to the time the signal is clocked into the input latch 4332 at the receiver 4304 (according to a receive clock RX_CLK). Thus, in this case, a delay element can be incorporated anywhere along the path of an outer wire between the output latch 4330 and the input latch 4332. The delay element may be a stand-alone component or embodied in another component. As an example of the latter case, a delay element can be embodied in an input/output (I/O) circuit such as a driver or receiver circuit.

Figure 44:
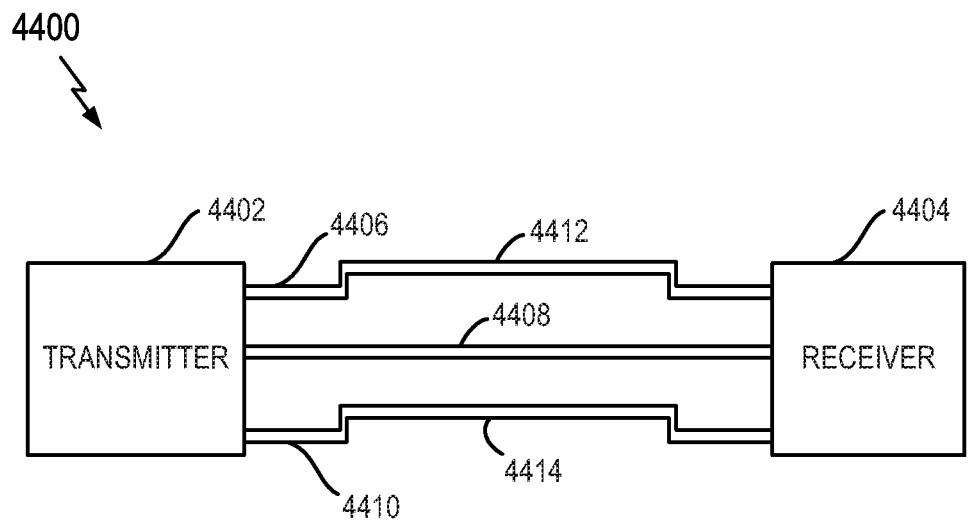
FIG. 44 illustrates an example of a multi-wire system that incorporates passive delay elements on outer wires to decrease a delay on a center wire.

FIG. 44 illustrates an example of a multi-wire system 4400 that incorporates passive delay elements on outer wires to decrease a delay on a center wire. A transmitter 4402 communicates with a receiver 4404 via a first wire 4406, a second wire 4408, and a third wire 4410. The first wire 4406 has been configured with a first wire segment 4412 to increase the overall length of the first wire 4406. Similarly, the third wire 4410 has been configured with a second wire segment 4414 to increase the overall length of the third wire 4410. Thus, the first wire segment 4412 is a form of passive delay element since the additional length imparts delay on the first wire 4406. That is, incorporation of the first wire segment 4412 increases the overall signal transmission time from one end of the first wire 4406 to the other end. Similarly, the second wire segment 4414 on the third wire 4410 is a form of passive delay element since the additional length increases the overall signal transmission time from one end of the third wire 4410 to the other end.

Figure 45:
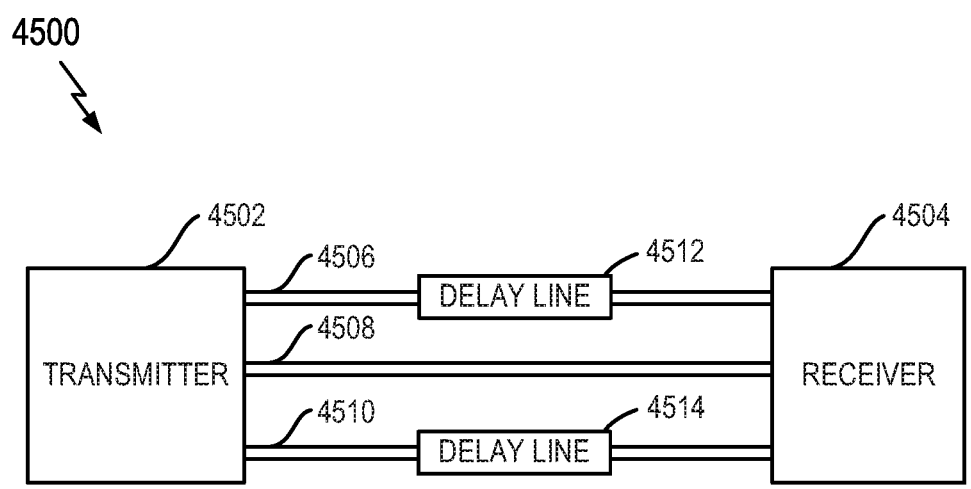
FIG. 45 illustrates an example of a multi-wire system that incorporates delay lines on outer wires to decrease a delay on a center wire.

FIG. 45 illustrates an example of a multi-wire system 4500 that incorporates delay lines on outer wires to decrease a delay on a center wire. A transmitter 4502 communicates with a receiver 4504 via a first wire 4506, a second wire 4508, and a third wire 4510. A first delay line 4512 is in-line with the first wire 4506 and a second delay line 4514 is in-line with the third wire 4510. The first delay line 4512 and the second delay line 4514 may be passive or active, and impart additional delay on the first wire 4506 and the third wire 4510, respectively. Accordingly, incorporation of the first delay line 4512 increases the overall signal transmission time from one end of the first wire 4506 to the other end, and incorporation of the second delay line 4514 increases the overall signal transmission time from one end of the third wire 4510 to the other end.

Figure 46:
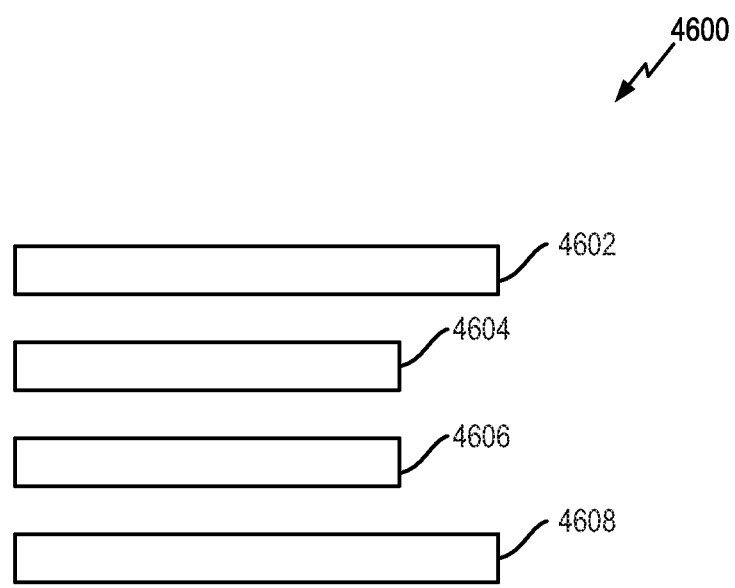
FIG. 46 is a diagram illustrating another example of wire lengths for a four-wire channel.

As mentioned above, the teachings herein are applicable to multi-wire channels that employ more than three wires. FIG. 46 illustrates, in a simplified manner, a circuit 4600 that includes four wires (e.g., transmission lines) 4602, 4604, 4606, and 4608. As shown in this single layer example, the two outer wires 4602 and 4608 are of the same length, but longer than the two center wires 4604 and 4606. By adding delay to the outer wires 4602 and 4608 in this manner, the signal propagation times of each of the six unique wire pairs in the circuit 4600 can be matched in accordance with the teachings herein. It should be appreciated that in other implementations delay can be added to the outer wires 4602 and 4608 using one or more of the other techniques described herein (e.g., active delay elements, changing other physical characteristics of the wires, using multiple layers, and so on).

Figure 47:
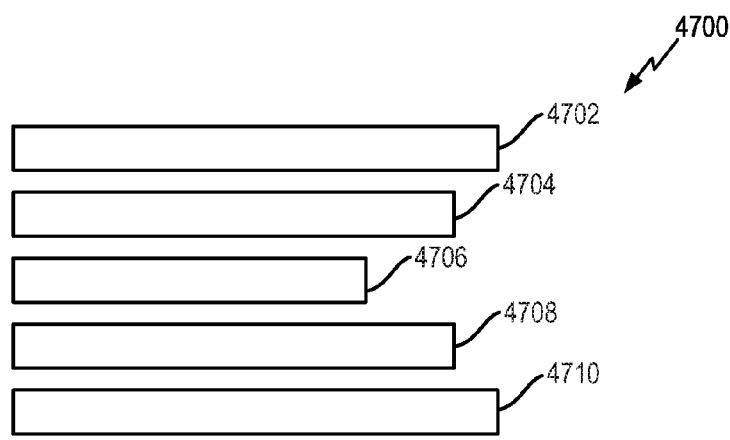
FIG. 47 is a diagram illustrating a fourth example of wire lengths for a five-wire channel.
Figure 48:
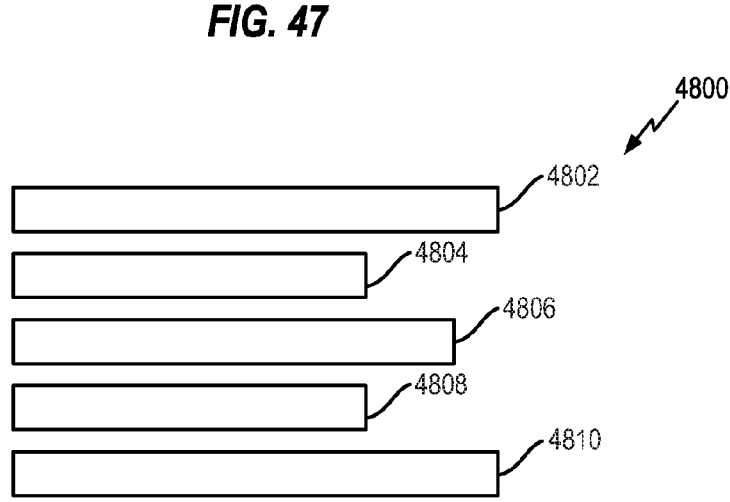
FIG. 48 is a diagram illustrating a fifth example of wire lengths for a five-wire channel.
Figure 49:
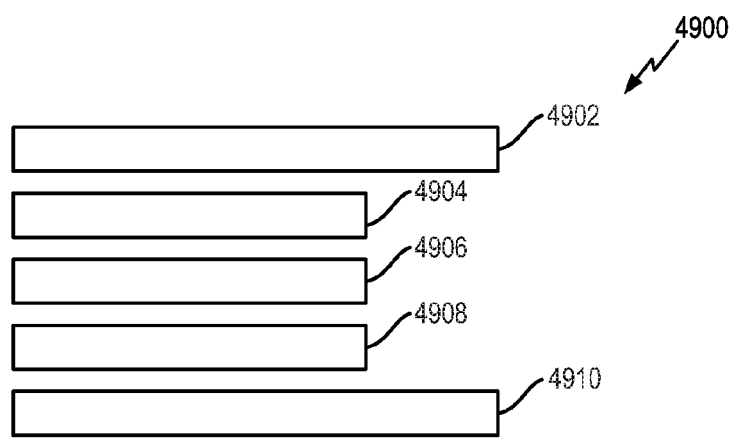
FIG. 49 is a diagram illustrating a sixth example of wire lengths for a five-wire channel.

FIGS. 47-49 illustrate simplified examples of circuits 4700-4900, respectively, that include five wires (e.g., transmission lines). For the five-wire scenario utilizing a single layer, delay may be added to any of the wires so that signal propagation times of each of the unique wire pairs in a given one of the circuits 4700-4900 can be matched in accordance with the teachings herein. The exact amount by which the wires are made longer can be determined, for example, by simulation. It should be appreciated that in other implementations delay can be added to the wires using one or more of the other techniques described herein (e.g., active delay elements, changing other physical characteristics of the wires, using multiple layers, and so on). FIGS. 47-49 illustrate three different examples with different relative lengths added to the wires.

The circuit 4700 of FIG. 47 includes wires 4702, 4704, 4706, 4708, and 4710. In this case, the outer wires 4702 and 4710 have the same length and are longer than the center wires 4704, 4706, and 4708. The center wires 4704 and 4708 have the same length, are shorter than the outer wires 4702 and 4710, and longer than the center wire 4706. The center wire 4706 is shorter than the center wires 4704 and 4708 and the outer wires 4702 and 4710.

The circuit 4800 of FIG. 48 includes wires 4802, 4804, 4806, 4808, and 4810. In this case, the outer wires 4802 and 4810 have the same length and are longer than the center wires 4804, 4806, and 4808. The center wires 4804 and 4808 have the same length and are shorter than the outer wires 4802 and 4810 and the center wire 4806. The center wire 4806 is longer than the center wires 4804 and 4808 and shorter than the outer wires 4802 and 4810.

The circuit 4900 of FIG. 49 includes wires 4902, 4904, 4906, 4908, and 4910. In this case, the two outer wires 4902 and 4910 have the same length and are longer than the center wires 4904, 4906, and 4908. All of the center wires 4904, 4906, and 4908 are of the same length.

Figure 50:
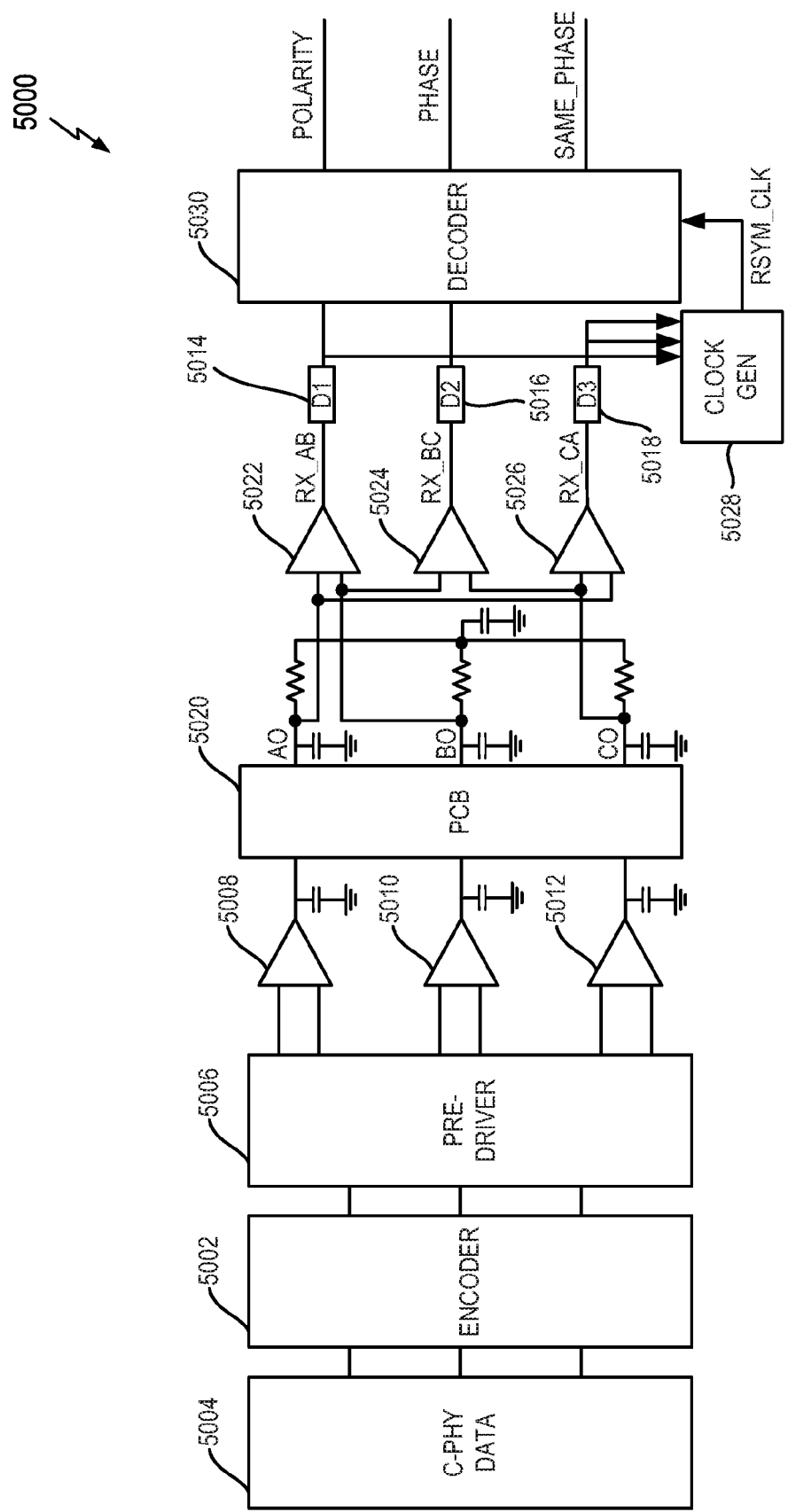
FIG. 50 is a block diagram illustrating another system employing a three-wire channel.

FIG. 50 is a diagram of a system 5000 illustrating transmitter components, channel components, and receiver components associated with another sample implementation of a three-wire channel. An encoder 5002 encodes C-PHY data 5004 and sends the encoded data to a pre-driver 5006. The pre-driven signals are driven onto an external bus by driver I/O circuits 5008, 5010, and 5012. Corresponding pad capacitances (Cp) are indicated for each wire of the external bus. A PCB delay 5020 corresponding to a delay imparted on wires A, B, and C of the three-wire channel and implemented in a PCB is represented. At the receive section, corresponding pad capacitances (Cp) are again indicated for each wire of the bus, as well as the termination resistors and common capacitance (Ccomm) for the termination circuit. Drivers (differential receivers) 5022, 5024, and 5026 correspond to the respective OP amps 2702, 2704, and 2706 of FIG. 27. Delays D1 5014, D2 5016, and D3 5018 may be applied to the outputs of the drivers (differential receivers) 5022, 5024, and 5026, respectively. By adding delay to one or more of the outputs of the drivers 5022, 5024, and 5026, the signal propagation times of each of the three unique wire pairs (i.e., wire pair A-B, wire pair B-C, and wire pair A-C) in the three-wire channel can be matched in accordance with the teachings herein. It should be appreciated that in other implementations delay can be added to the outputs of the drivers 5022, 5024, and 5026 using one or more of the other techniques described herein (e.g., active delay elements, changing other physical characteristics of the wires, using multiple layers, and so on). A clock generator 5028 derives a clock signal RSYM_CLK from the signals output by the drivers 5022, 5024, and 5026. A decoder 5030 then generates signals (POLARITY, PHASE, AND SAME_PHASE) corresponding to the C-PHY data transmitted by the transmit side.

Further Exemplary Device and Method for Multi-Wire Signaling

Figure 51:
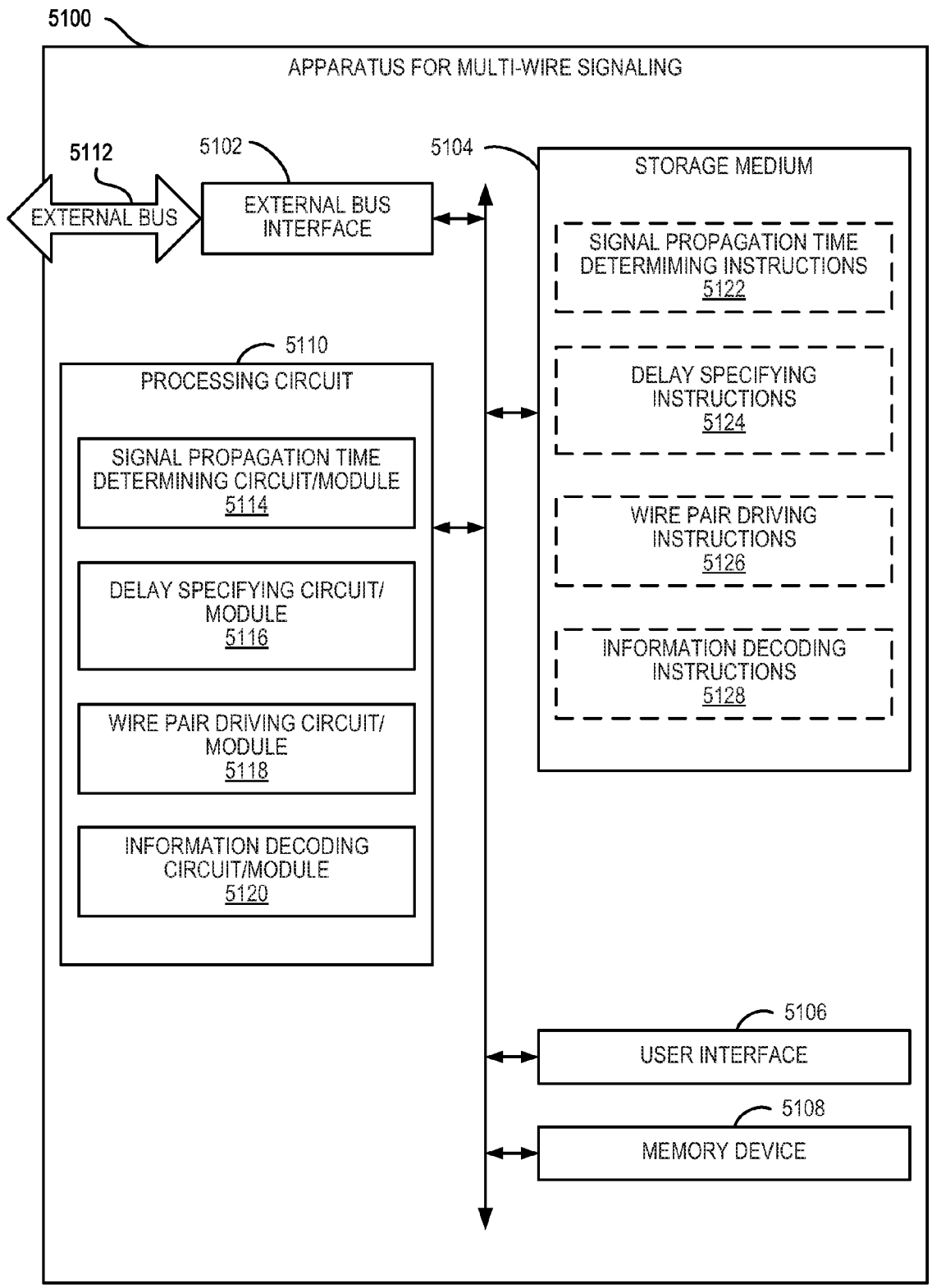
FIG. 51 is block diagram illustrating select components of an apparatus according to at least one example of the disclosure.

FIG. 51 is block diagram illustrating select components of an apparatus 5100 according to at least one example of the disclosure. The apparatus 5100 includes an external bus interface (or communication interface circuit) 5102, a storage medium 5104, a user interface 5106, a memory device 5108, and a processing circuit 5110. The processing circuit is coupled to or placed in electrical communication with each of the external bus interface 5102, the storage medium 5104, the user interface 5106, and the memory device 5108.

The external bus interface 5102 provides an interface for the components of the apparatus 5100 to an external bus 5112. The external bus interface 5102 may include, for example, one or more of: signal driver circuits, signal receiver circuits, amplifiers, signal filters, signal buffers, or other circuitry used to interface with a signaling bus or other types of signaling media.

The processing circuit 5110 is arranged to obtain, process and/or send data, control data access and storage, issue commands, and control other desired operations. The processing circuit 5110 may include circuitry adapted to implement desired programming provided by appropriate media in at least one example. In some instances, the processing circuit 5110 may include circuitry adapted to perform a desired function, with or without implementing programming. By way of example, the processing circuit 5110 may be implemented as one or more processors, one or more controllers, and/or other structure configured to execute executable programming and/or perform a desired function. Examples of the processing circuit 5110 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 5110 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 5110 are for illustration and other suitable configurations within the scope of the disclosure are also contemplated.

The processing circuit 5110 is adapted for processing, including the execution of programming, which may be stored on the storage medium 5104. As used herein, the terms "programming" or "instructions" shall be construed broadly to include without limitation instruction sets, instructions, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 5110 may include one or more of: a signal propagation time determining circuit/module 5114, a delay specifying circuit/module 5116, a wire pair driving circuit/module 5118, or an information decoding circuit/module 5120.

The signal propagation time determining circuit/module 5114 may include circuitry and/or instructions (e.g., signal propagation time determining instructions 5122 stored on the storage medium 5104) adapted to determine signal propagation times associated with wire pairs of a plurality of wires, the plurality of wires including at least one middle wire, a first outer wire located adjacent to one side of the at least one middle wire, and a second outer wire located adjacent to another side of the at least one middle wire. For example, in some implementations, the information is retrieved from the memory device 5108 or collected by activating a process that estimates or measures signal propagation times. An indication of the signal propagation times is then output (e.g., stored in the memory device 5108 or passed to another component).

The delay specifying circuit/module 5116 may include circuitry and/or instructions (e.g., delay specifying instructions 5124 stored on the storage medium 5104) adapted to specify a delay for at least one delay element coupled to at least one of the plurality of wires, wherein the at least one delay element provides an amount of signal delay such that a signal propagation time associated with the at least one middle wire is less than a signal propagation time associated with at least one of the first outer wire or the second outer wire and the signal propagation times associated with the wire pairs of the plurality of wires are equal to one another within a margin of error. For example, in some implementations, the information is retrieved from the memory device 5108 or from an active process. A delay value is then determined based on the information. An indication of the delay is then output (e.g., stored in the memory device 5108 or passed to another component).

The wire pair driving circuit/module 5118 may include circuitry and/or instructions (e.g., wire pair driving instructions 5126 stored on the storage medium 5104) adapted to cause data to be driven onto a multi-wire channel, for example, by driving a particular one of the wire pairs of the plurality of wires for a particular data transfer, whereby every other wire of the plurality of wires is in a high impedance state. For example, in some implementations, information to be sent over a channel is obtained, and the information is sent to a driver circuit.

The information decoding circuit/module 5120 may include circuitry and/or instructions (e.g., information decoding instructions 5128 stored on the storage medium 5104) adapted to decode information received via a multi-wire channel, for example, by decoding information for a particular data transfer based on a particular one of the wire pairs of the plurality of wires being driven, and every other wire of the plurality of wires being in a high impedance state. For example, in some implementations, received information is decoded by comparing the signal received on different wires (e.g., as in FIG. 27).

The storage medium 5104 may represent one or more processor-readable devices for storing programming, electronic data, databases, or other digital information. The storage medium 5104 may also be used for storing data that is manipulated by the processing circuit 5110 when executing programming. The storage medium 5104 may be any available media that can be accessed by the processing circuit 5110, including portable or fixed storage devices, optical storage devices, and various other mediums capable of storing, containing and/or carrying programming. By way of example and not limitation, the storage medium 5104 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof. Thus, in some implementations, the storage medium may be a non-transitory (e.g., tangible) storage medium.

The storage medium 5104 may be coupled to the processing circuit 5110 such that the processing circuit 5110 can read information from, and write information to, the storage medium 5104. That is, the storage medium 5104 can be coupled to the processing circuit 5110 so that the storage medium 5104 is at least accessible by the processing circuit 5110, including examples where the storage medium 5104 is integral to the processing circuit 5110 and/or examples where the storage medium 5104 is separate from the processing circuit 5110.

Programming/instructions stored by the storage medium 5104, when executed by the processing circuit 5110, causes the processing circuit 5110 to perform one or more of the various functions and/or process steps described herein. For example, the storage medium 5104 may include one or more of: the signal propagation time determining instructions 5122, the delay specifying instructions 5124, the wire pair driving instructions 5126, or the information decoding instructions 5128. Thus, according to one or more aspects of the disclosure, the processing circuit 5110 is adapted to perform (in conjunction with the storage medium 5104) any or all of the processes, functions, steps and/or routines for any or all of the apparatuses described herein. As used herein, the term "adapted" in relation to the processing circuit 5110 may refer to the processing circuit 5110 being one or more of configured, employed, implemented, and/or programmed (in conjunction with the storage medium 5104) to perform a particular process, function, step and/or routine according to various features described herein.

The memory device 5108 may represent one or more memory devices and may comprise any of the memory technologies listed above or any other suitable memory technology. The memory device 5108 may store delay-related information, along with other information used by one or more of the components of the apparatus 5100. The memory device 5108 also may be used for storing data that is manipulated by the processing circuit 5110 or some other component of the apparatus 5100. In some implementations, the memory device 5108 and the storage medium 5104 are implemented as a common memory component.

The user interface 5106 includes functionality that enables a user to interact with the apparatus 5100. For example, the user interface 5106 may interface with one or more user output devices (e.g., a display device, etc.) and one or more user input devices (e.g., a keyboard, a tactile input device, etc.).

With the above in mind, examples of operations relating to multi-wire signaling according to the disclosure will be described in more detail in conjunction with the flowchart of FIG. 52. For convenience, the operations of FIG. 52 (or any other operations discussed or taught herein) may be described as being performed by specific components. It should be appreciated, however, that in various implementations these operations may be performed by other types of components and may be performed using a different number of components. It also should be appreciated that one or more of the operations described herein may not be employed in a given implementation.

Figure 52:
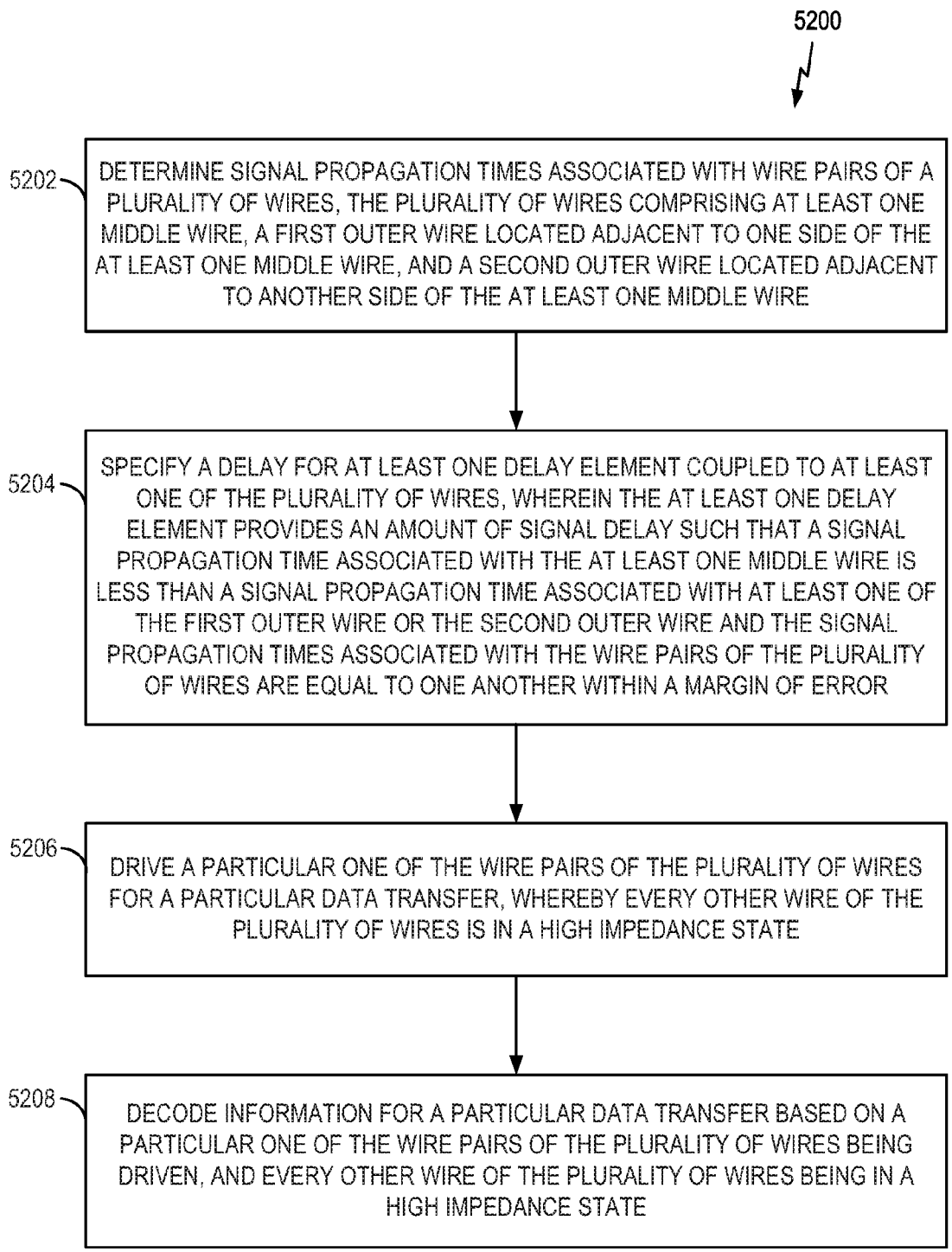
FIG. 52 illustrates a process for specifying a delay in accordance with some aspects of the disclosure.

FIG. 52 illustrates a process 5200 for specifying a delay in accordance with some aspects of the disclosure. In various aspects within the scope of the disclosure, the process 5200 may be implemented by any suitable apparatus capable of supporting delay specification operations.

In some implementations, the process 5200 takes place within a processing system (e.g., the processing circuit 5110 of FIG. 51), which may be located in a communication device or some other suitable apparatus. For example, a delay controller associated with a multi-wire channel can perform the process 5200 to dynamically adjust the delay imparted on a wire of a multi-wire channel and thereby control the signal propagation times of wire pairs of the multi-wire channel.

In other implementations, the process 5200 takes place within a circuit design system (e.g., the circuit design system 3700 illustrated in FIG. 37). For example, the wires of a multi-wire channel can be designed and manufactured to have certain signal propagation times under certain operating conditions. Thus, the delay imparted on a wire of a multi-wire channel can be specified during the design process and thereby control the signal propagation times of wire pairs of the multi-wire channel during subsequent operation.

At block 5202, the signal propagation times associated with wire pairs of a plurality of wires are determined. The plurality of wires include at least one middle wire, a first outer wire located adjacent to one side of the at least one middle wire, and a second outer wire located adjacent to another side of the at least one middle wire. In an aspect of the disclosure, the at least one middle wire includes two or more middle wires.

The manner in which the determination is made may depend in some aspects on whether the process is performed during a manufacturing process or subsequent to the manufacturing process. During the manufacturing process, a simulation tool can be used to estimate the signal propagation times of each unique differential pair for a multi-wire channel that has been created using a circuit design tool. Such a simulation tool can take various parameters into account such as, without limitation, signal frequency, signal rise times, signal fall times, dielectric constant (Er) of a substrate, distance of a wire to a ground plane, wire path discontinuities, wire width, and wire thickness.

Subsequent to the manufacturing process, a delay controller or other similar component can determine (e.g., measure) signal propagation times associated with the wires of a multi-wire channel under actual operating conditions. For example, a transmitter can send data to a receiver over the wires and the receiver can loop the data back to the transmitter. Based on the corresponding round-trip time (and, if applicable, known delays at the receiver), the transmitter can determine the signal propagation time over a given wire. As another example, a transmitter can send known data patterns to a receiver over the wires. The receiver can then determine (e.g., by sampling the received signal at a relatively high rate) whether certain wires have a longer signal propagation time than other wires.

At block 5204, a delay for at least one delay element coupled to at least one of the plurality of wires is specified. The at least one delay element provides an amount of signal delay such that a signal propagation time associated with the at least one middle wire is less than a signal propagation time associated with at least one of the first outer wire or the second outer wire and the signal propagation times associated with the wire pairs of the plurality of wires are equal to one another within a margin of error. In an aspect of the disclosure, the at least one delay element includes a delay element coupled to the first outer wire and/or the second outer wire. As discussed herein, however, a delay element can be placed in various locations along a multi-wire bus and different numbers of delay elements can be used in different implementations.

A delay to be imparted on a given wire can be specified (e.g., selected) according to the signal propagations times of the other wires (as determined at block 5202). For example, using signal characterization techniques, the signal propagation time for a given differential pair can be determined based on signal propagation times (or associated characteristic impedance) of the individual wires. Accordingly, the value of a delay to be added to a given wire to ensure that all wire pairs have the substantially the same signal propagation times can be determined.

In practice, the signal propagation times for the different wire pair might not be precisely equal. Rather, the delay may be specified such that the signal propagation times for the different wire pair are all within a defined margin of error. Such a margin of error may be defined in different ways in different implementations. For example, in some implementations, the margin of error is defined as a percentage (e.g., 1%, 2%, and so on). Thus, in this case, the delay(s) may be specified such that the signal propagation times of the different wire pairs all fall within a defined percentage of one another. As another example, in some implementations, the margin of error is defined as a discrete time (e.g., 1 ps, 2 ps, and so on). Thus, in this case, the delay(s) may be specified such that the signal propagation times of the different wire pairs all fall within a defined time range.

In an aspect of the disclosure, the at least one delay element includes a wire of a defined length such that an overall length of the at least one middle wire is shorter than a length of the first outer wire and the second outer wire. In a further aspect of the disclosure, the at least one delay element has a programmable delay. Therefore, the specification of the delay includes controlling the programmable delay of the at least one delay element.

At block 5206, a particular one of the wire pairs of the plurality of wires may be driven for a particular data transfer, whereby every other wire of the plurality of wires is in a high impedance state.

At block 5208, information for a particular data transfer may be decoded based on a particular one of the wire pairs of the plurality of wires being driven, wherein every other wire of the plurality of wires is in a high impedance state. In an aspect of the disclosure, the information is decoded via a receiver circuit coupled to the plurality of wires. The receiver circuit may include at least one differential receiver and the at least one delay element is coupled to an output of the at least one differential receiver.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while exemplary implementations may have been discussed herein as device, system, or method implementations, it should be understood that such exemplary implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and wires that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. An apparatus for multi-wire signaling, comprising:
a plurality of wires comprising at least one middle wire, a first outer wire located adjacent to one side of the at least one middle wire, and a second outer wire located adjacent to another side of the at least one middle wire; and
at least one delay element coupled to at least one of the plurality of wires,
wherein the at least one delay element provides an amount of signal delay such that a signal propagation time associated with the at least one middle wire is less than a signal propagation time associated with at least one of the first outer wire or the second outer wire and signal propagation times associated with wire pairs of the plurality of wires are equal to one another within a margin of error.

2. The apparatus of claim 1, wherein the at least one delay element comprises a passive delay structure.

3. The apparatus of claim 1, wherein the at least one delay element comprises a wire of a defined length such that an overall length of the at least one middle wire is shorter than a length of the first outer wire and the second outer wire.

4. The apparatus of claim 1, wherein the at least one delay element comprises an active delay device.

5. The apparatus of claim 1, wherein:
the at least one delay element comprises a programmable delay device; and
the apparatus further comprises a delay controller to generate at least one control signal to control a delay of the at least one delay element.

6. The apparatus of claim 1, further comprising a driver circuit coupled to the plurality of wires and configured to, for a particular data transfer, drive a particular one of the wire pairs of the plurality of wires, whereby every other wire of the plurality of wires is in a high impedance state, wherein the driver circuit embodies the at least one delay element.

7. The apparatus of claim 1, further comprising a receiver circuit coupled to the plurality of wires and configured to decode information for a particular data transfer based on a particular one of the wire pairs of the plurality of wires being driven, and every other wire of the plurality of wires being in a high impedance state.

8. The apparatus of claim 7, wherein the receiver circuit comprises at least one differential receiver and the at least one delay element is coupled to an output of the at least one differential receiver.

9. The apparatus of claim 1, wherein the at least one delay element comprises a delay element coupled to at least one of the first outer wire or the second outer wire.

10. The apparatus of claim 1, wherein the at least one middle wire comprises at least two middle wires.

11. A method for multi-wire signaling, comprising:
determining signal propagation times associated with wire pairs of a plurality of wires, the plurality of wires comprising at least one middle wire, a first outer wire located adjacent to one side of the at least one middle wire, and a second outer wire located adjacent to another side of the at least one middle wire; and
specifying a delay for at least one delay element coupled to at least one of the plurality of wires,
wherein the at least one delay element provides an amount of signal delay such that a signal propagation time associated with the at least one middle wire is less than a signal propagation time associated with at least one of the first outer wire or the second outer wire and the signal propagation times associated with the wire pairs of the plurality of wires are equal to one another within a margin of error.

12. The method of claim 11, wherein the at least one delay element comprises a wire of a defined length such that an overall length of the at least one middle wire is shorter than a length of the first outer wire and the second outer wire.

13. The method of claim 11, wherein:
the at least one delay element has a programmable delay; and
the specification of the delay comprises controlling the programmable delay of the at least one delay element.

14. The method of claim 11, further comprising driving a particular one of the wire pairs of the plurality of wires for a particular data transfer, whereby every other wire of the plurality of wires is in a high impedance state.

15. The method of claim 11, further comprising decoding information for a particular data transfer based on a particular one of the wire pairs of the plurality of wires being driven, and every other wire of the plurality of wires being in a high impedance state.

16. The method of claim 15, wherein the information is decoded via a receiver circuit coupled to the plurality of wires, wherein the receiver circuit comprises at least one differential receiver and the at least one delay element is coupled to an output of the at least one differential receiver.

17. The method of claim 11, wherein the at least one delay element comprises a delay element coupled to at least one of the first outer wire or the second outer wire.

18. The method of claim 11, wherein the at least one middle wire comprises at least two middle wires.

19. An apparatus for multi-wire signaling, comprising:
a communication interface circuit; and
a processing circuit configured to via the communication interface circuit:
determine signal propagation times associated with wire pairs of a plurality of wires, the plurality of wires comprising at least one middle wire, a first outer wire located adjacent to one side of the at least one middle wire, and a second outer wire located adjacent to another side of the at least one middle wire, and
specify a delay for at least one delay element coupled to at least one of the plurality of wires,
wherein the at least one delay element provides an amount of signal delay such that a signal propagation time associated with the at least one middle wire is less than a signal propagation time associated with at least one of the first outer wire or the second outer wire and the signal propagation times associated with the wire pairs of the plurality of wires are equal to one another within a margin of error.

20. The apparatus of claim 19, wherein the at least one delay element comprises a wire of a defined length such that an overall length of the at least one middle wire is shorter than a length of the first outer wire and the second outer wire.

21. The apparatus of claim 19, wherein:
the at least one delay element has a programmable delay; and
the specification of the delay comprises controlling the programmable delay of the at least one delay element.

22. The apparatus of claim 19, the processing circuit further configured to drive a particular one of the wire pairs of the plurality of wires for a particular data transfer, whereby every other wire of the plurality of wires is in a high impedance state.

23. The apparatus of claim 19, the processing circuit further configured to decode information for a particular data transfer based on a particular one of the wire pairs of the plurality of wires being driven, and every other wire of the plurality of wires being in a high impedance state.

24. The apparatus of claim 23, wherein the information is decoded via a receiver circuit coupled to the plurality of wires, wherein the receiver circuit comprises at least one differential receiver and the at least one delay element is coupled to an output of the at least one differential receiver.

25. The apparatus of claim 23, wherein the at least one delay element comprises a delay element coupled to at least one of the first outer wire or the second outer wire.

26. The apparatus of claim 23, wherein the at least one middle wire comprises at least two middle wires.

27. An apparatus for multi-wire signaling, comprising:
means for determining signal propagation times associated with wire pairs of a plurality of wires, the plurality of wires comprising at least one middle wire, a first outer wire located adjacent to one side of the at least one middle wire, and a second outer wire located adjacent to another side of the at least one middle wire; and
means for specifying a delay for at least one delay element coupled to at least one of the plurality of wires,
wherein the at least one delay element provides an amount of signal delay such that a signal propagation time associated with the at least one middle wire is less than a signal propagation time associated with at least one of the first outer wire or the second outer wire and the signal propagation times associated with the wire pairs of the plurality of wires are equal to one another within a margin of error.

28. The apparatus of claim 27, wherein the at least one delay element comprises a wire of a defined length such that an overall length of the at least one middle wire is shorter than a length of the first outer wire and the second outer wire.

29. The apparatus of claim 27, further comprising means for driving a particular one of the wire pairs of the plurality of wires for a particular data transfer, whereby every other wire of the plurality of wires is in a high impedance state.

30. The apparatus of claim 27, further comprising means for decoding information for a particular data transfer based on a particular one of the wire pairs of the plurality of wires being driven, and every other wire of the plurality of wires being in a high impedance state,
wherein the information is decoded via a receiver circuit coupled to the plurality of wires, wherein the receiver circuit comprises at least one differential receiver and the at least one delay element is coupled to an output of the at least one differential receiver.

* * * * *